(12) United States Patent
Matsumoto et al.

(10) Patent No.: US 6,792,330 B1
(45) Date of Patent: Sep. 14, 2004

(54) DRIVE CONTROL SYSTEM

(75) Inventors: Kouki Matsumoto, Tokyo (JP);
Daisuke Kawai, Tokyo (JP); Shizuo Kumekawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/009,334

(22) PCT Filed: Jul. 6, 1999

(86) PCT No.: PCT/JP99/03645

§ 371 (c)(1),
(2), (4) Date: Dec. 10, 2001

(87) PCT Pub. No.: WO01/02918

PCT Pub. Date: Jan. 11, 2001

(51) Int. Cl.[7] ............................................. G06F 19/00
(52) U.S. Cl. ........................ 700/193; 700/63; 700/114
(58) Field of Search ........................... 700/193, 18, 24, 700/63, 114

(56) References Cited

U.S. PATENT DOCUMENTS

| | | | | | |
|---|---|---|---|---|---|
| 4,493,053 | A | * | 1/1985 | Thompson | 710/61 |
| 4,672,577 | A | * | 6/1987 | Hirose et al. | 365/114 |
| 4,965,793 | A | * | 10/1990 | Polzin et al. | 370/236 |
| 5,086,500 | A | * | 2/1992 | Greub | 713/401 |
| 5,123,094 | A | * | 6/1992 | MacDougall | 712/30 |
| 5,224,031 | A | * | 6/1993 | Tanaka et al. | 700/24 |
| 5,260,879 | A | * | 11/1993 | Sasaki et al. | 700/193 |
| 5,293,585 | A | * | 3/1994 | Morita | 706/45 |
| 5,331,540 | A | * | 7/1994 | Tanaka et al. | 700/18 |
| 5,410,652 | A | * | 4/1995 | Leach et al. | 370/450 |
| 5,522,045 | A | * | 5/1996 | Sandberg | 709/215 |
| 6,290,403 | B1 | * | 9/2001 | Onishi et al. | 712/200 |
| 6,566,836 | B2 | * | 5/2003 | Matsubara et al. | 318/600 |

FOREIGN PATENT DOCUMENTS

| | | |
|---|---|---|
| JP | SHO 61-208104 | 9/1986 |
| JP | SHO 63-11-8855 | 5/1988 |
| JP | A-2-205903 | 8/1990 |
| JP | HEI 3-245204 | 10/1991 |
| JP | A-4-241602 | 8/1992 |
| JP | HEI 4-290102 | 10/1992 |
| JP | HEI 5-134736 | 6/1993 |
| JP | HEI 5-227756 | 9/1993 |
| JP | HEI 6-56801 | 8/1994 |
| JP | HEI 7-200028 | 8/1995 |
| JP | HEI 7-248812 | 9/1995 |
| JP | HEI 8-6615 | 1/1996 |
| JP | HEI 8-328636 | 12/1996 |
| JP | HEI 9-269811 | 10/1997 |

* cited by examiner

*Primary Examiner*—Leo Picard
*Assistant Examiner*—Michael D. Masinick
(74) *Attorney, Agent, or Firm*—Sughrue, Mion, PLLC

(57) ABSTRACT

A drive control system having constituent devices such as control unit for drive control, servo amplifier for driving motor by receiving a command from the control unit, spindle amplifier, and input and output unit, with these constituent devices connected so as to communicate with each other, in which a memory is provided in each constituent device, the constituent devices are synchronized with each other, a communication unit is provided for transferring memory data between arbitrary constituent devices, and the memory is shared between arbitrary constituent devices.

12 Claims, 49 Drawing Sheets

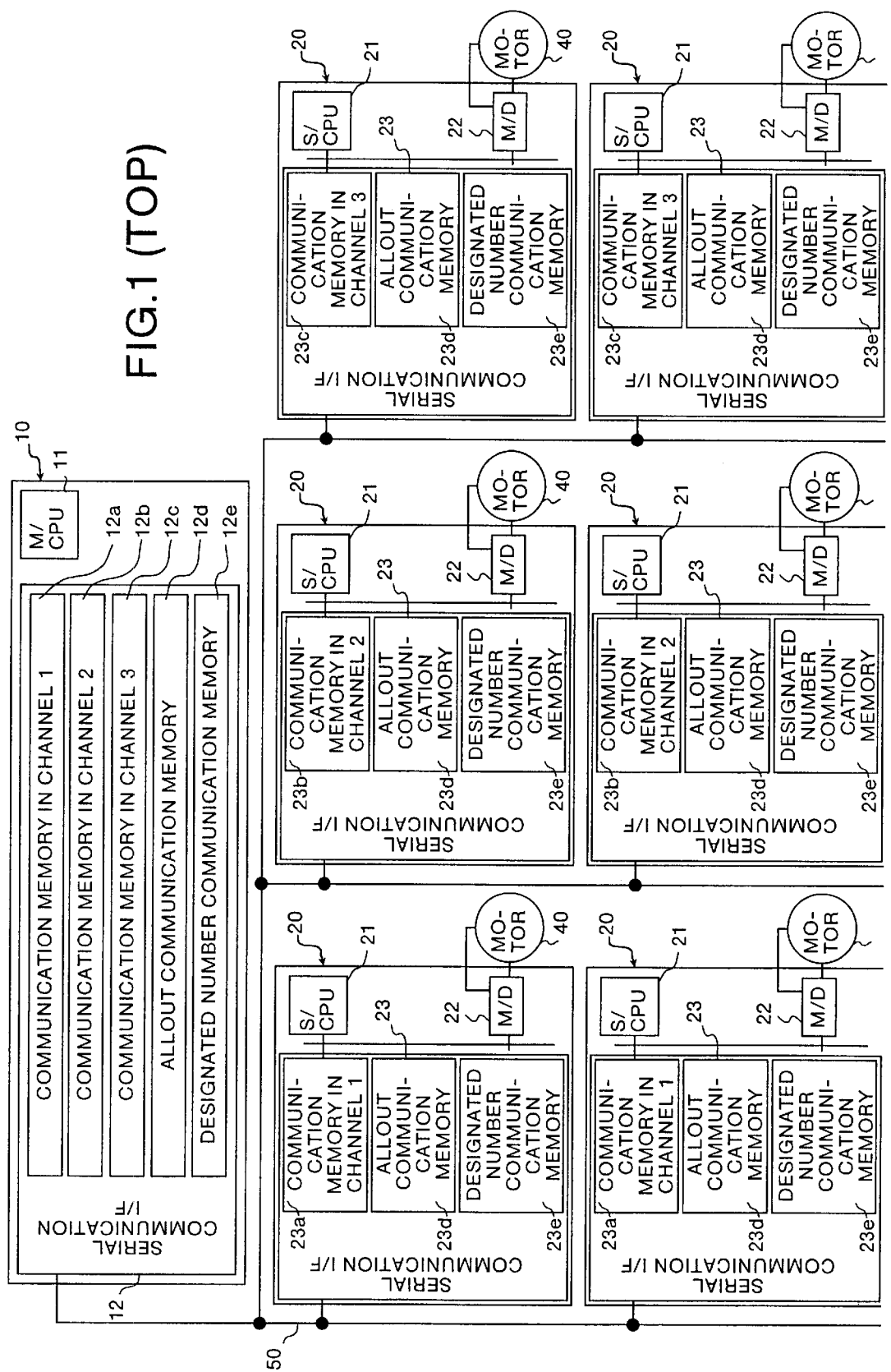

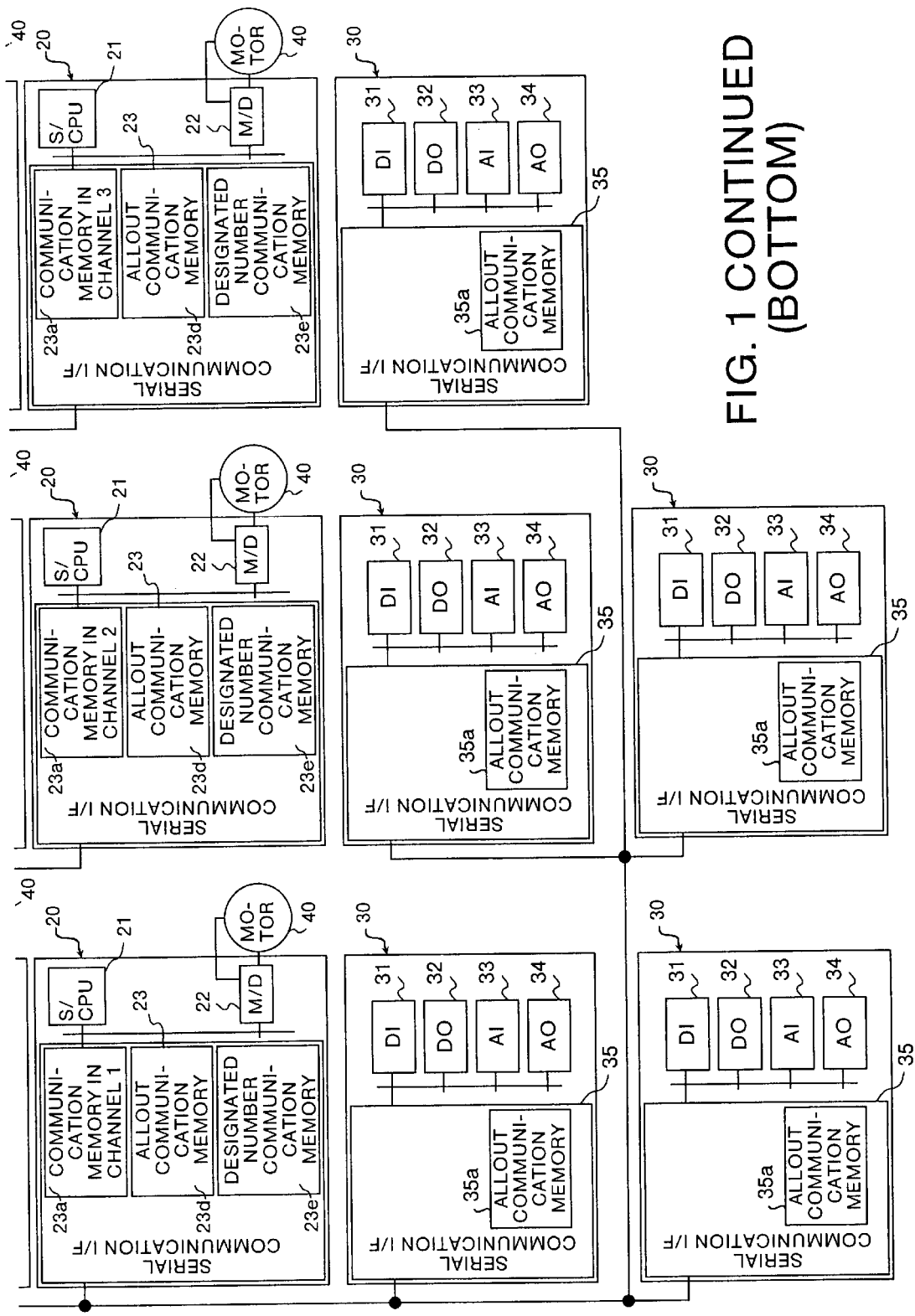
FIG. 1 CONTINUED (BOTTOM)

| (a) SYNCHRONOUS PACKET | (b) IN-CHANNEL COMMUNICATION PACKET | (c) ALLOUT COMMUNICATION PACKET | (d) DESIGNATED DESTINATION COMMUNICATION PACKET |
|---|---|---|---|
| SYNC CODE/MODE 0 | MODE 1 | MODE 2 | MODE 3 |
| ORIGIN NUMBER | ORIGIN NUMBER | ORIGIN NUMBER | ORIGIN NUMBER |
| CHANNEL DESIGNATION 1 | CHANNEL DESIGNATION 1 | BROADCAST DESIGNATION | DESTINATION NUMBER |
| ADDRESS DESIGNATION 11 | ADDRESS DESIGNATION 11 | ADDRESS DESIGNATION | ADDRESS DESIGNATION |
| DATA LENGTH | DATA LENGTH | DATA LENGTH | DATA LENGTH |
| DATA | DATA | CHANGE DATA LENGTH | DATA |
| ADDRESS DESIGNATION 12 | ADDRESS DESIGNATION 12 | PREVIOUS DATA | : |
| DATA LENGTH | DATA LENGTH | REWRITE DATA | : |
| DATA | DATA | REDUNDANCY CODE | REDUNDANCY CODE |
| ADDRESS DESIGNATION 13 | ADDRESS DESIGNATION 13 | | |
| DATA LENGTH | DATA LENGTH | | |
| DATA | DATA | | |
| CHANNEL DESIGNATION 2 | REDUNDANCY CODE | | |
| ADDRESS DESIGNATION 21 | | | |
| DATA LENGTH | | | |
| DATA | | | |
| ADDRESS DESIGNATION 22 | | | |
| DATA LENGTH | | | |
| DATA | | | |
| ADDRESS DESIGNATION 23 | | | |
| DATA LENGTH | | | |
| DATA | | | |
| CHANNEL DESIGNATION 3 | | | |
| ADDRESS DESIGNATION 31 | | | |
| DATA LENGTH | | | |
| DATA | | | |
| ADDRESS DESIGNATION 32 | | | |
| DATA LENGTH | | | |
| DATA | | | |
| ADDRESS DESIGNATION 33 | | | |
| DATA LENGTH | | | |
| DATA | | | |
| REDUNDANCY CODE | | | |

FIG.3

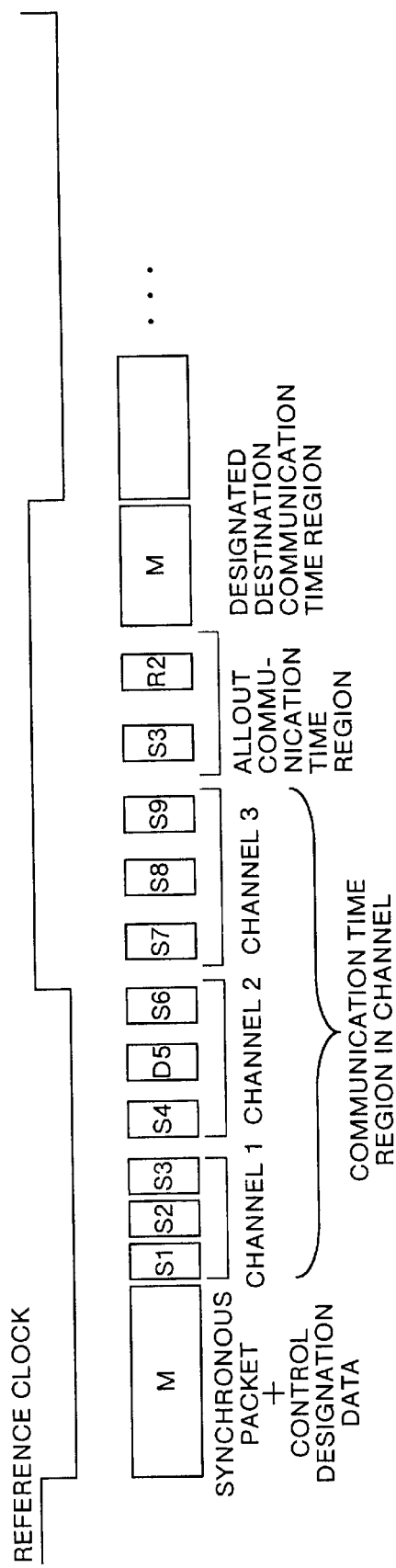

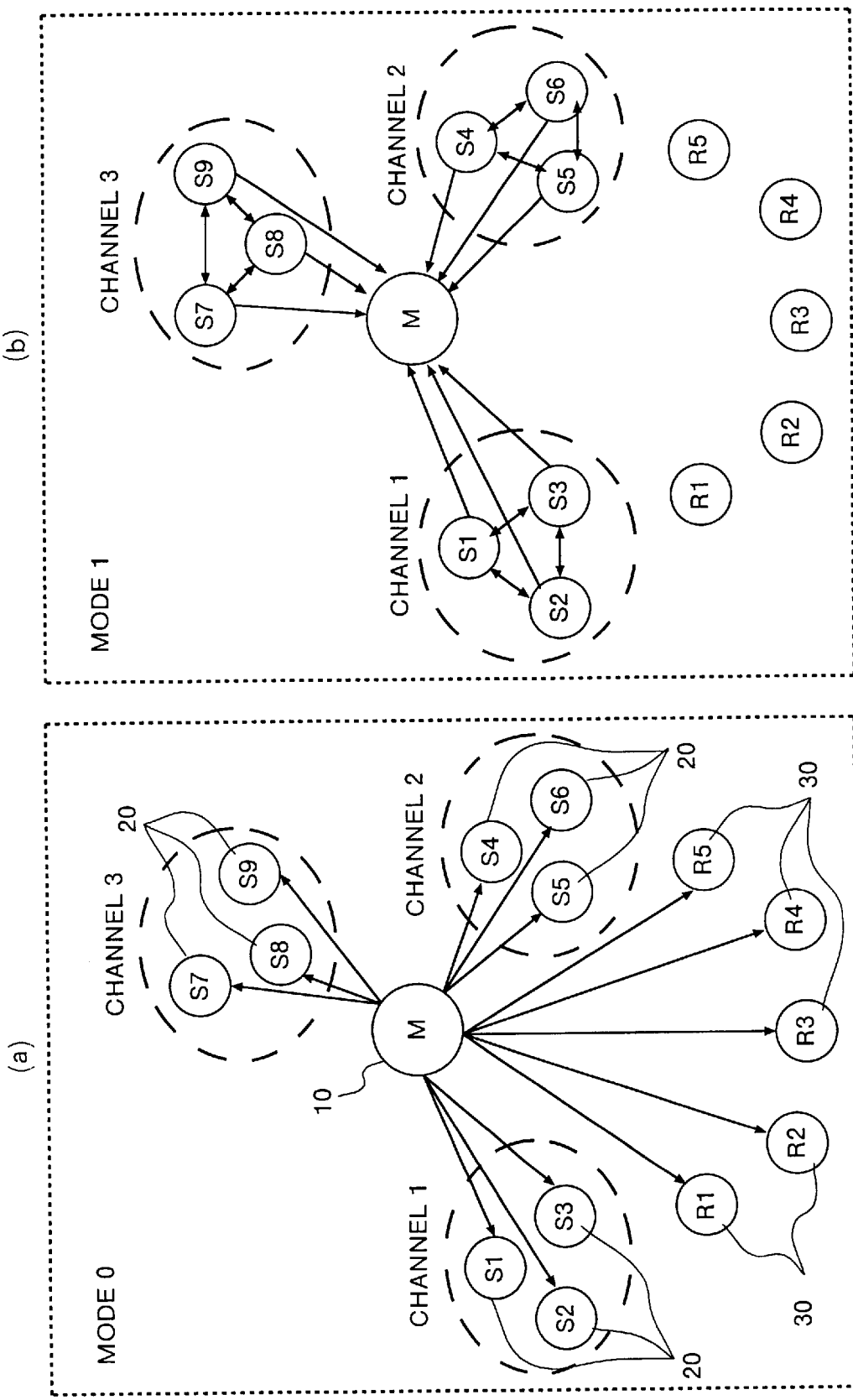
FIG. 5 (TOP)

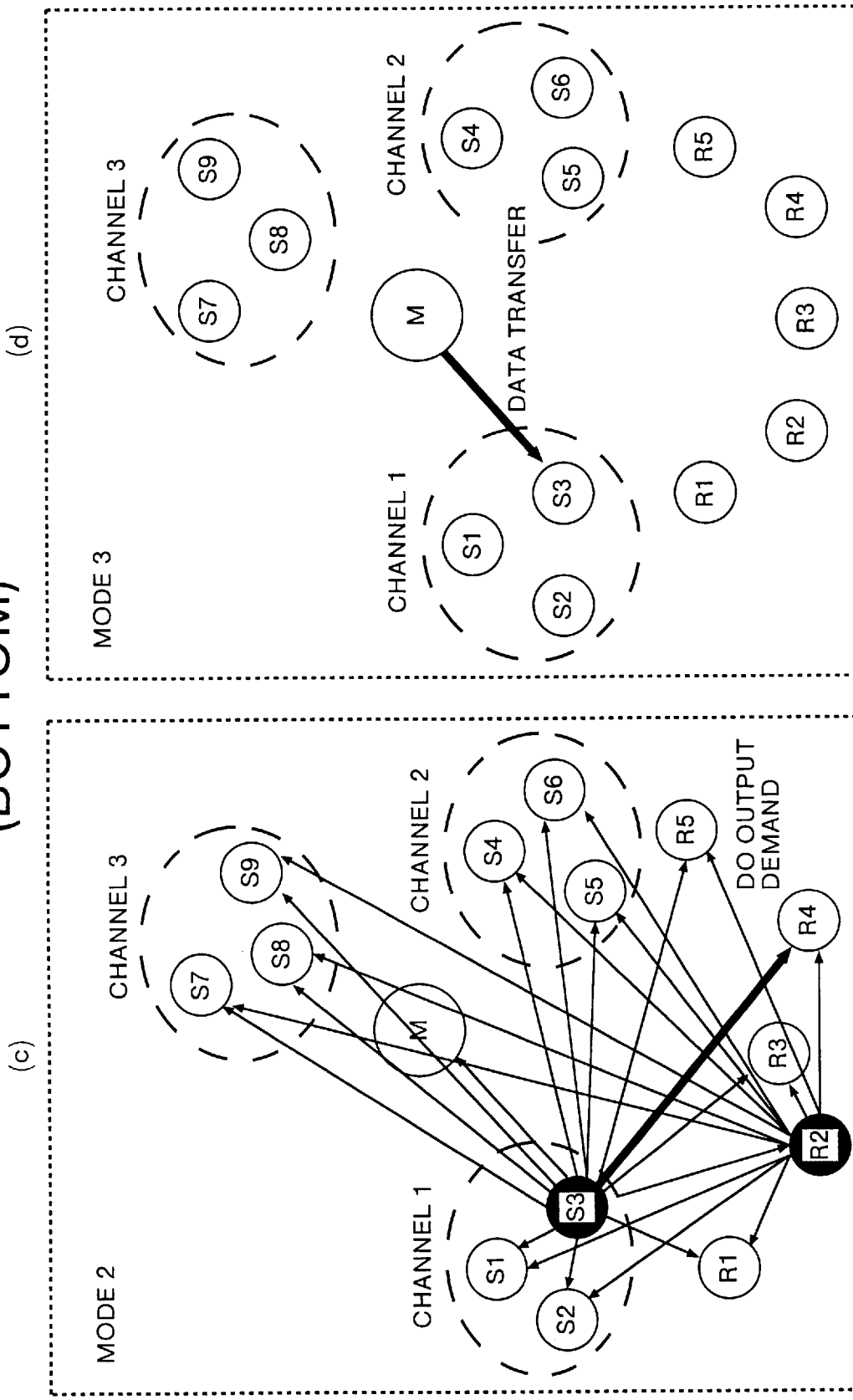
FIG. 5 CONTINUED (BOTTOM)

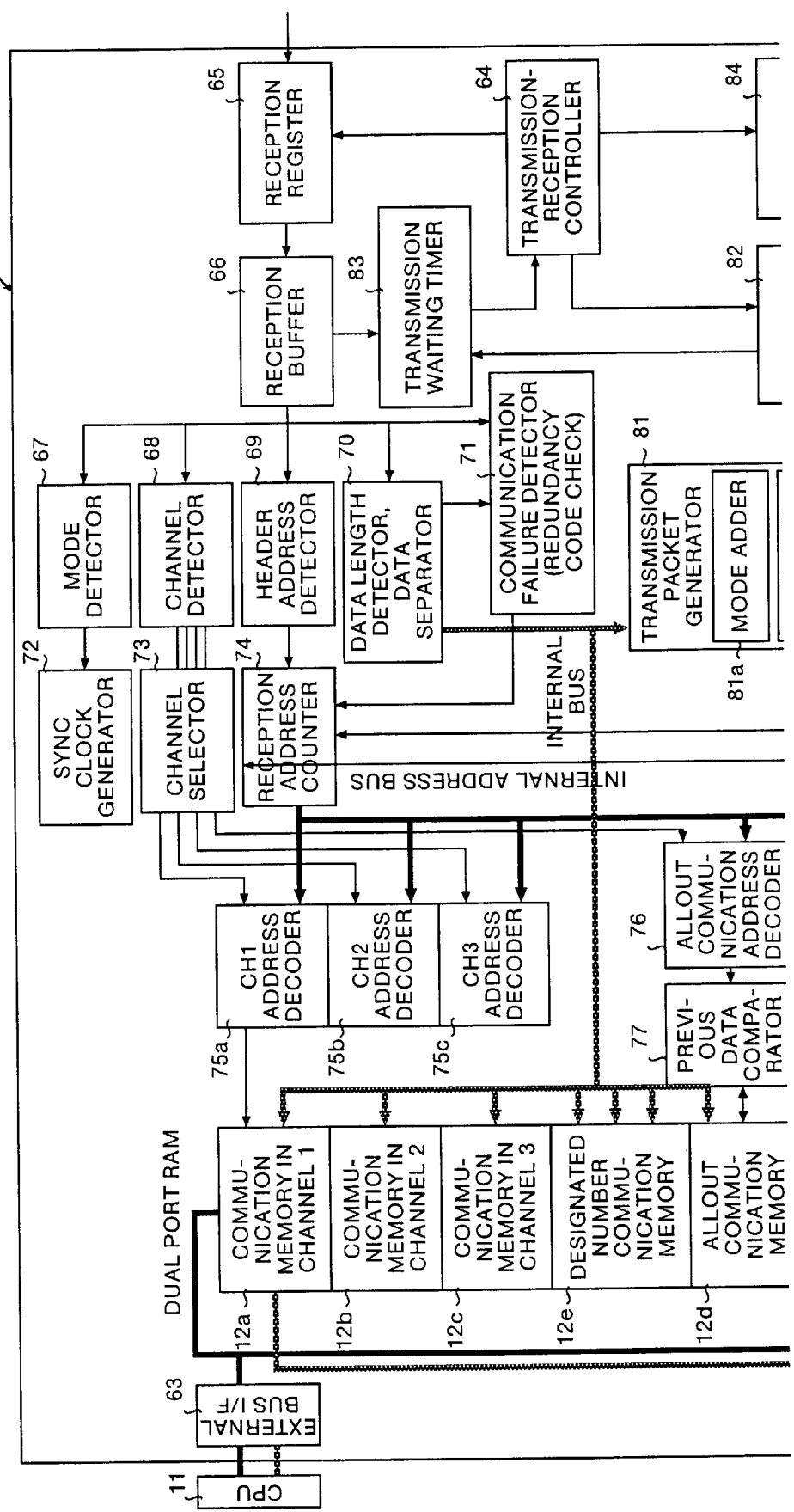
FIG. 6 (TOP)

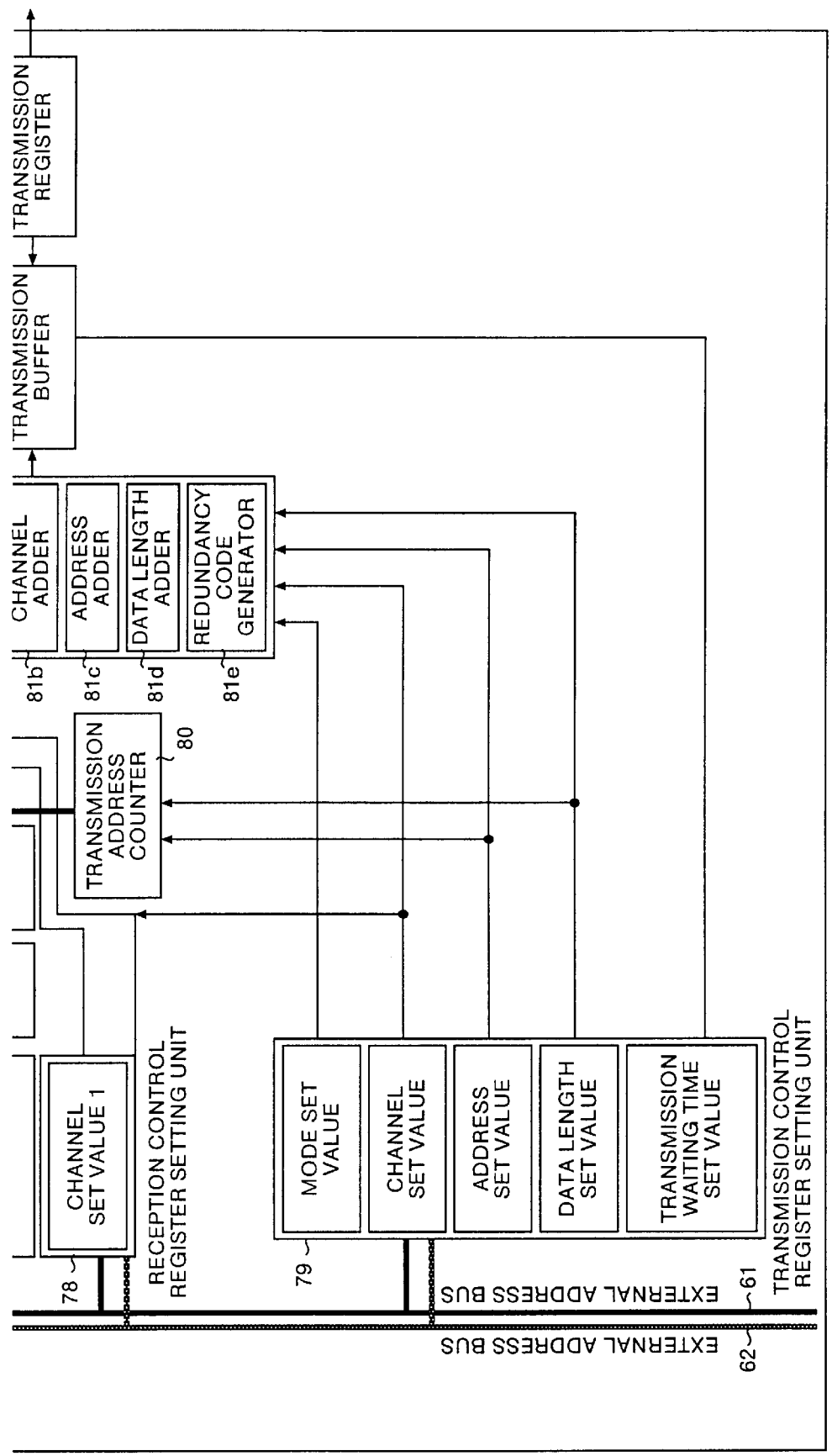
FIG. 6 CONTINUED (BOTTOM)

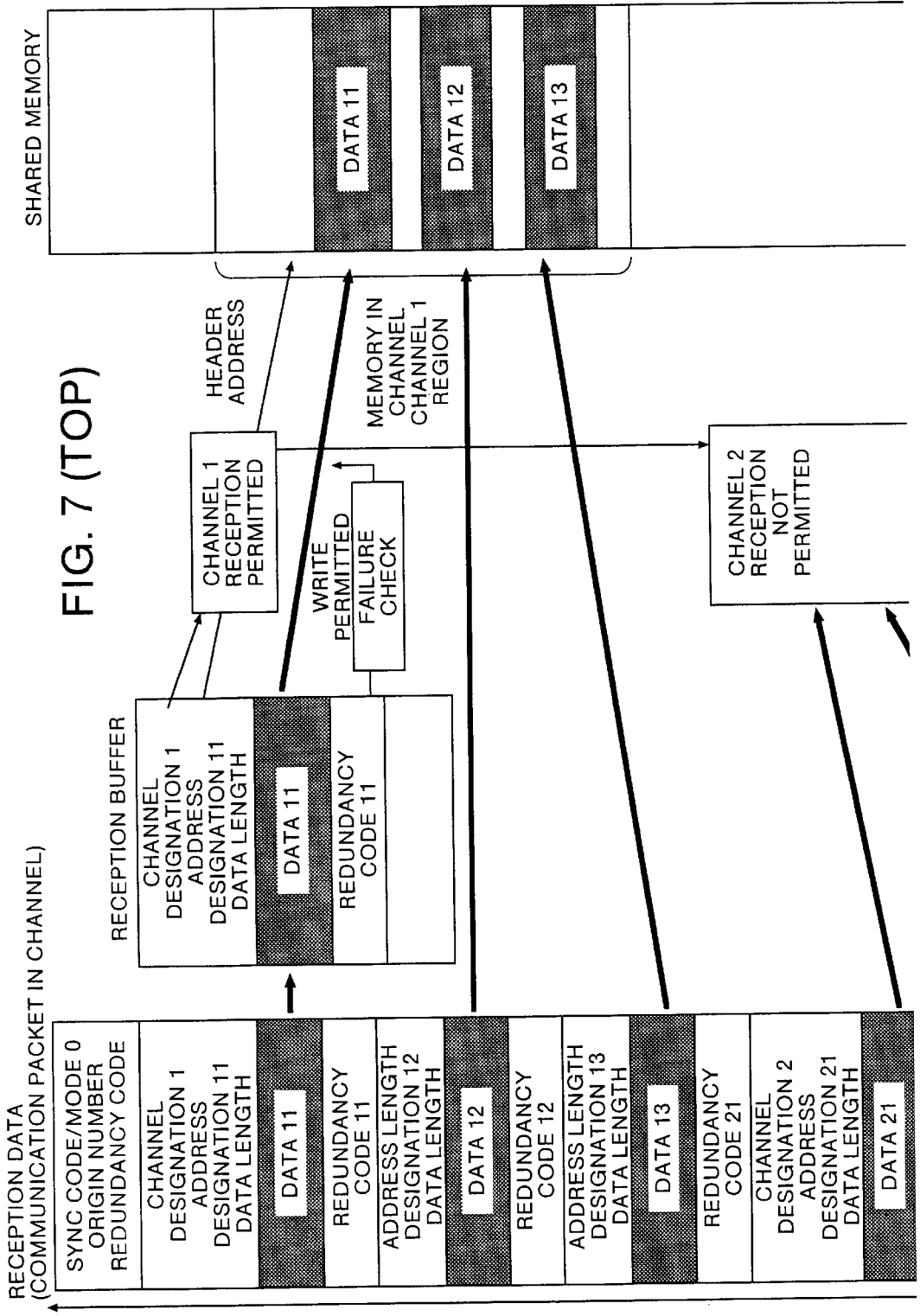
FIG. 7 (TOP)

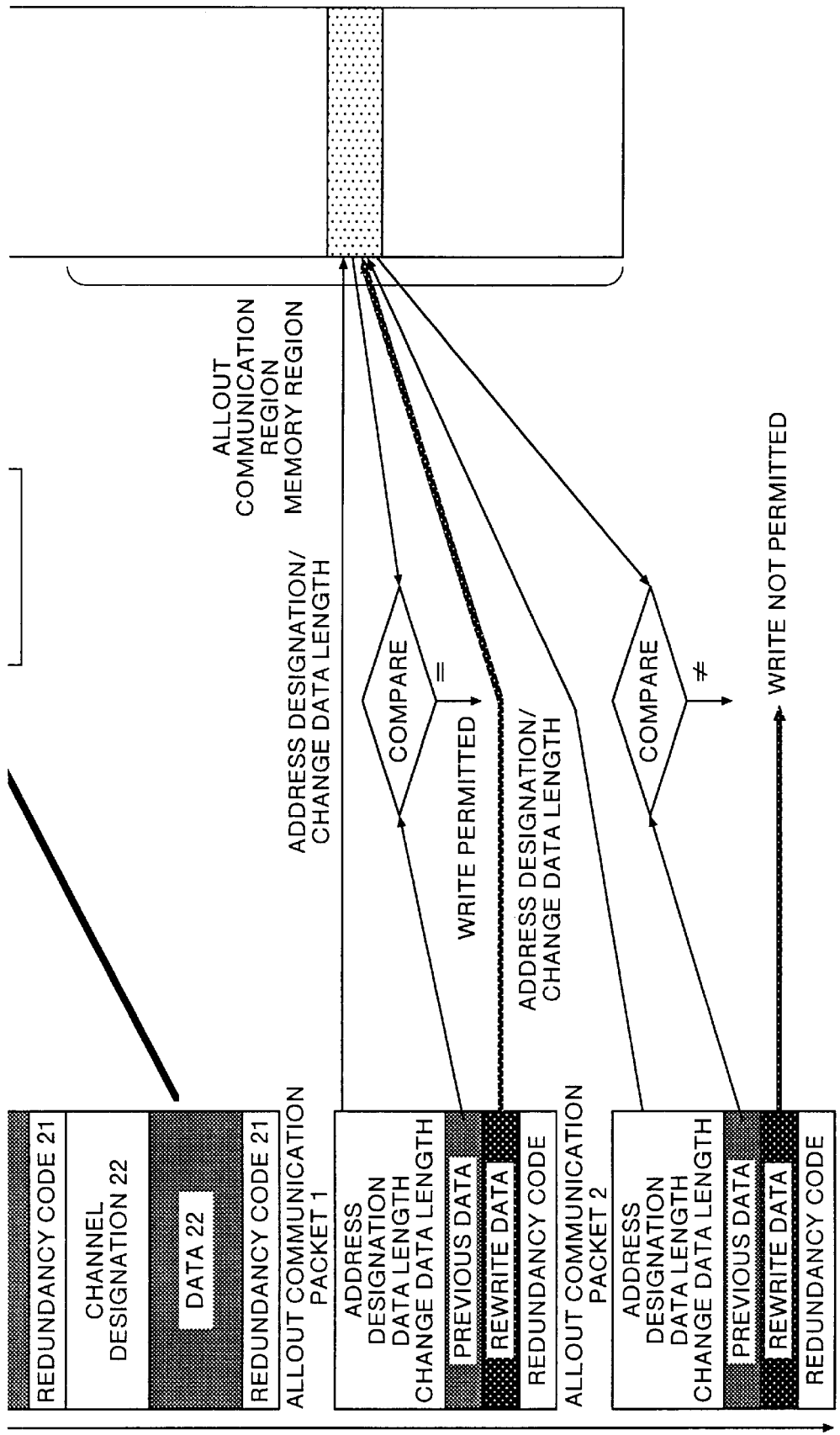

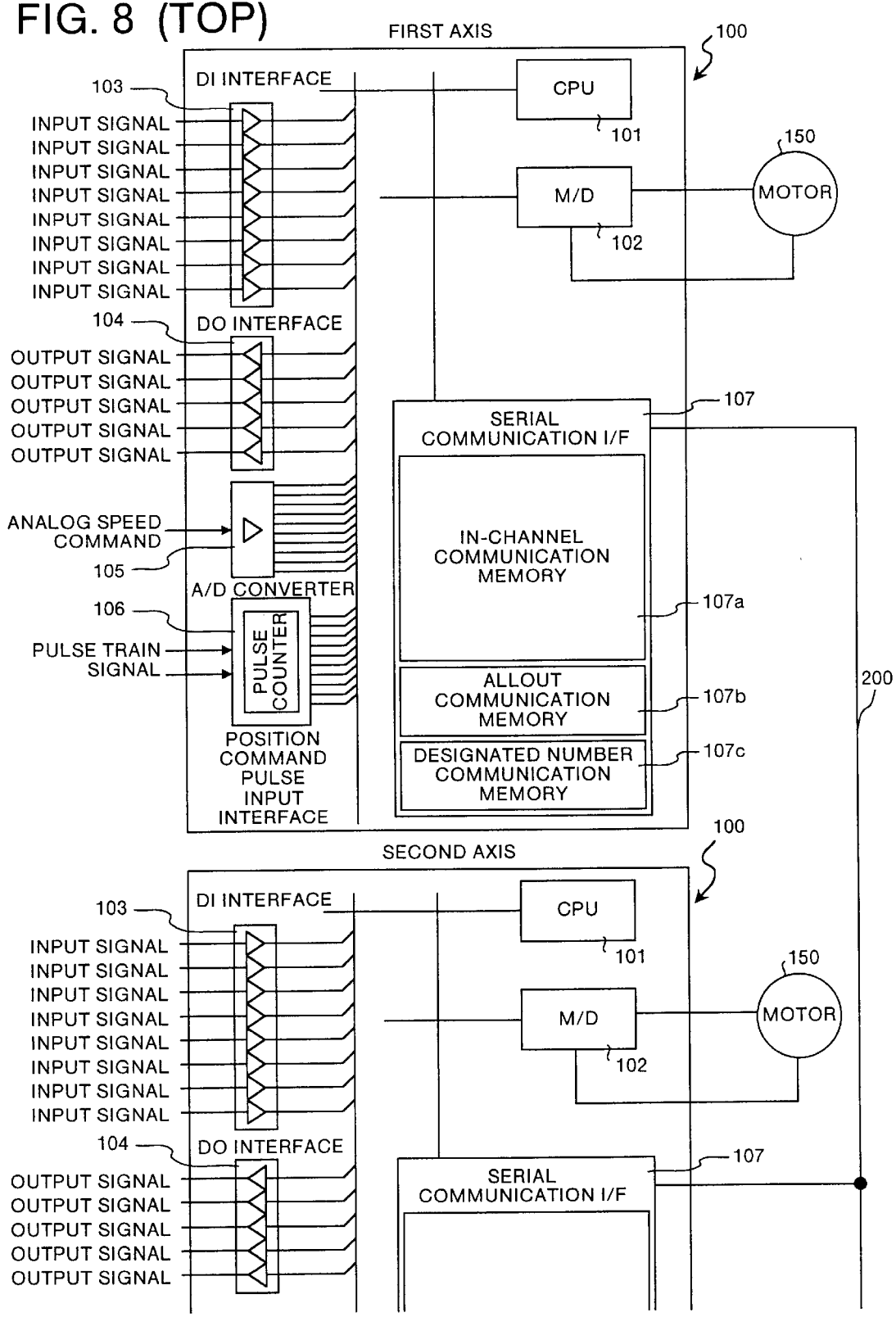
FIG. 8 (TOP)

FIG. 8 CONTINUED(BOTTOM)
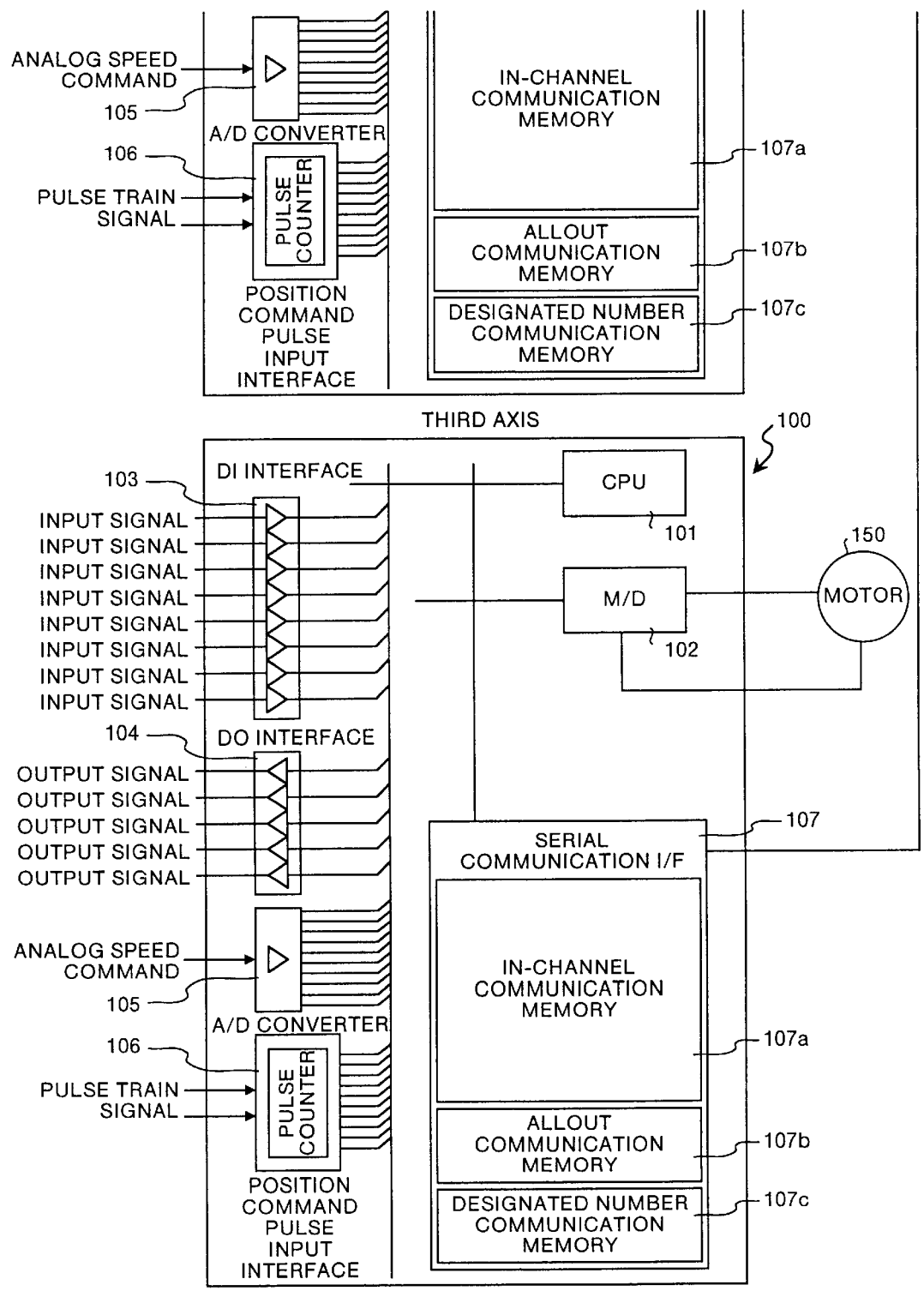

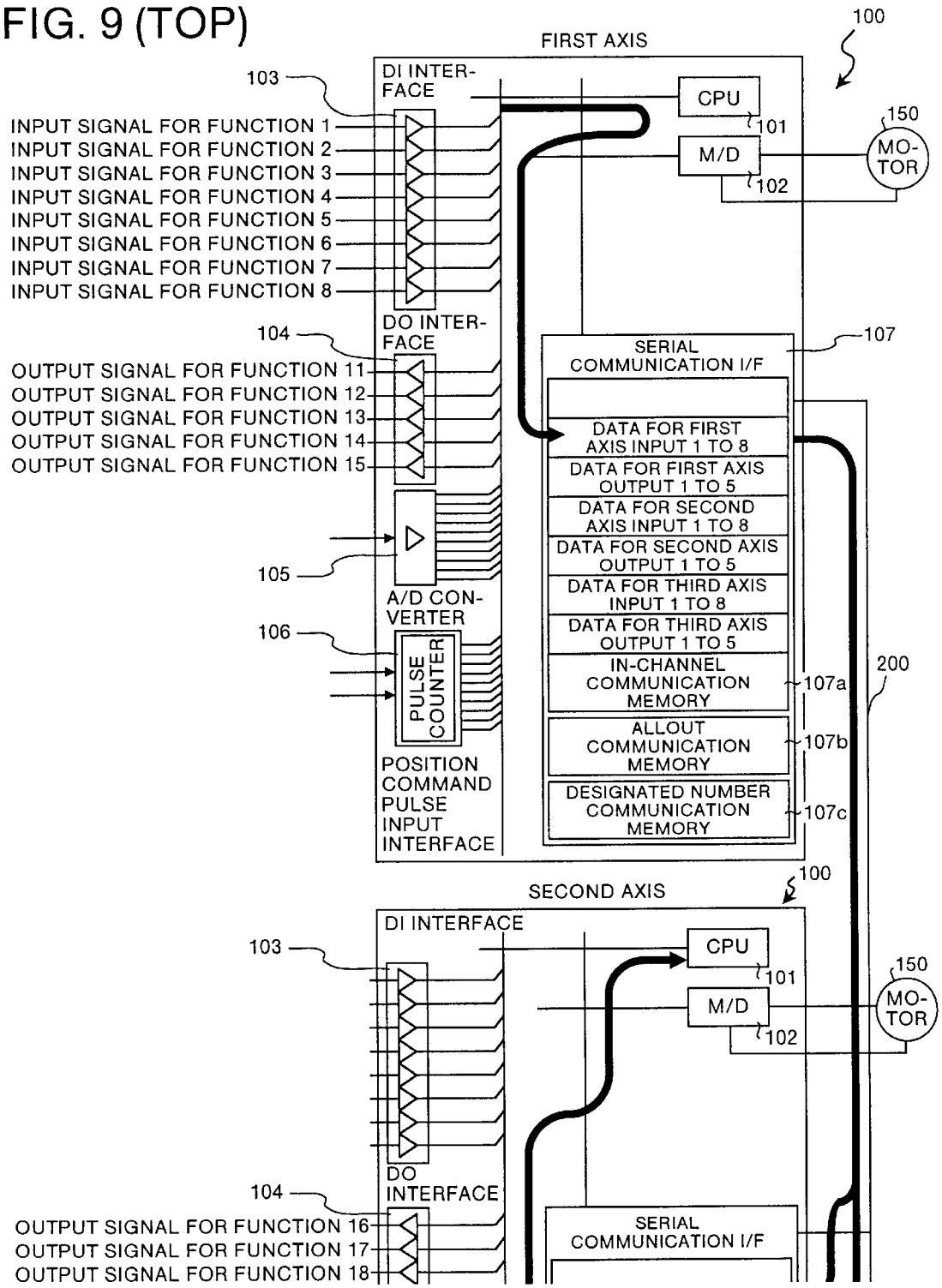
FIG. 9 (TOP)

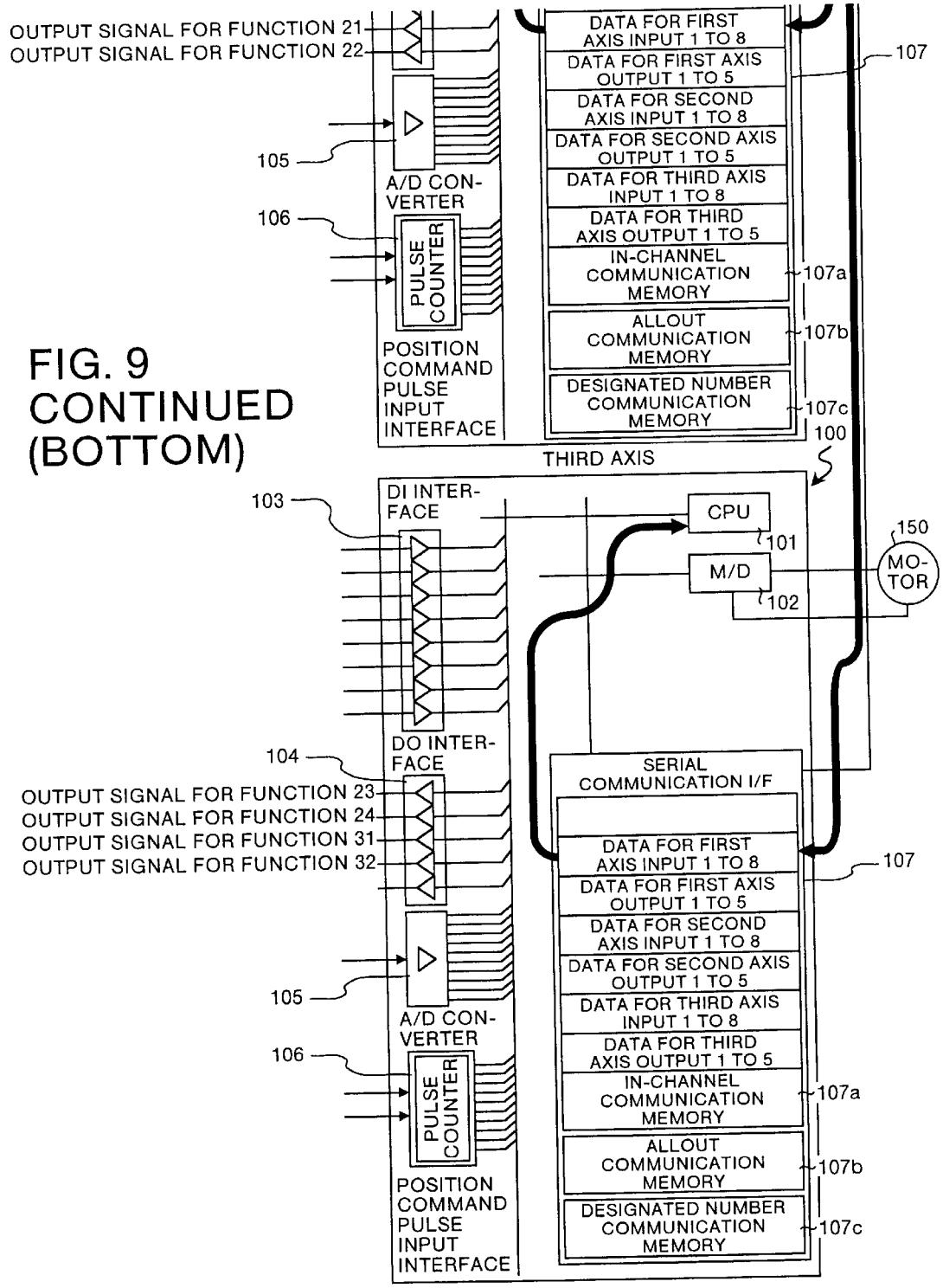

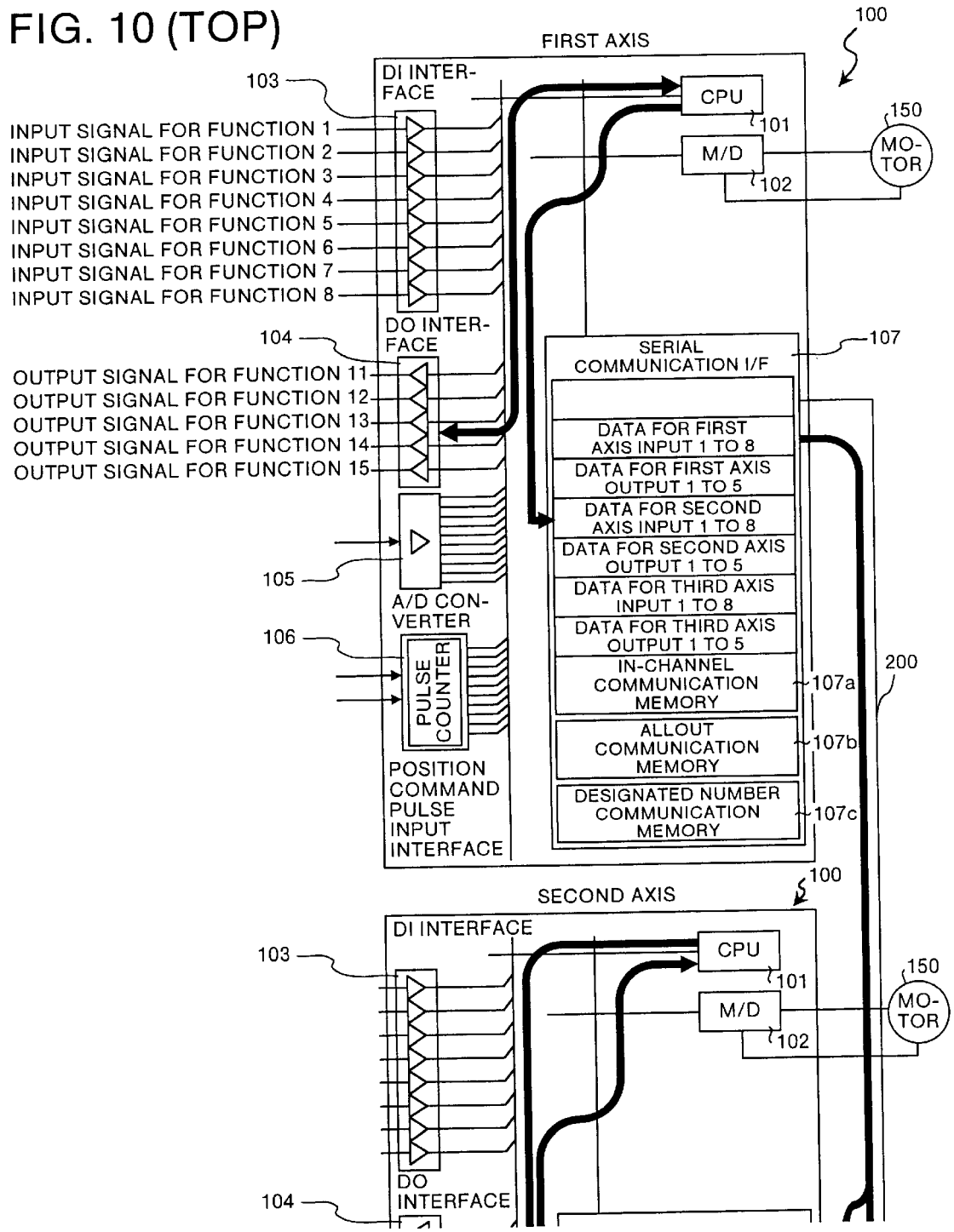
FIG. 10 (TOP)

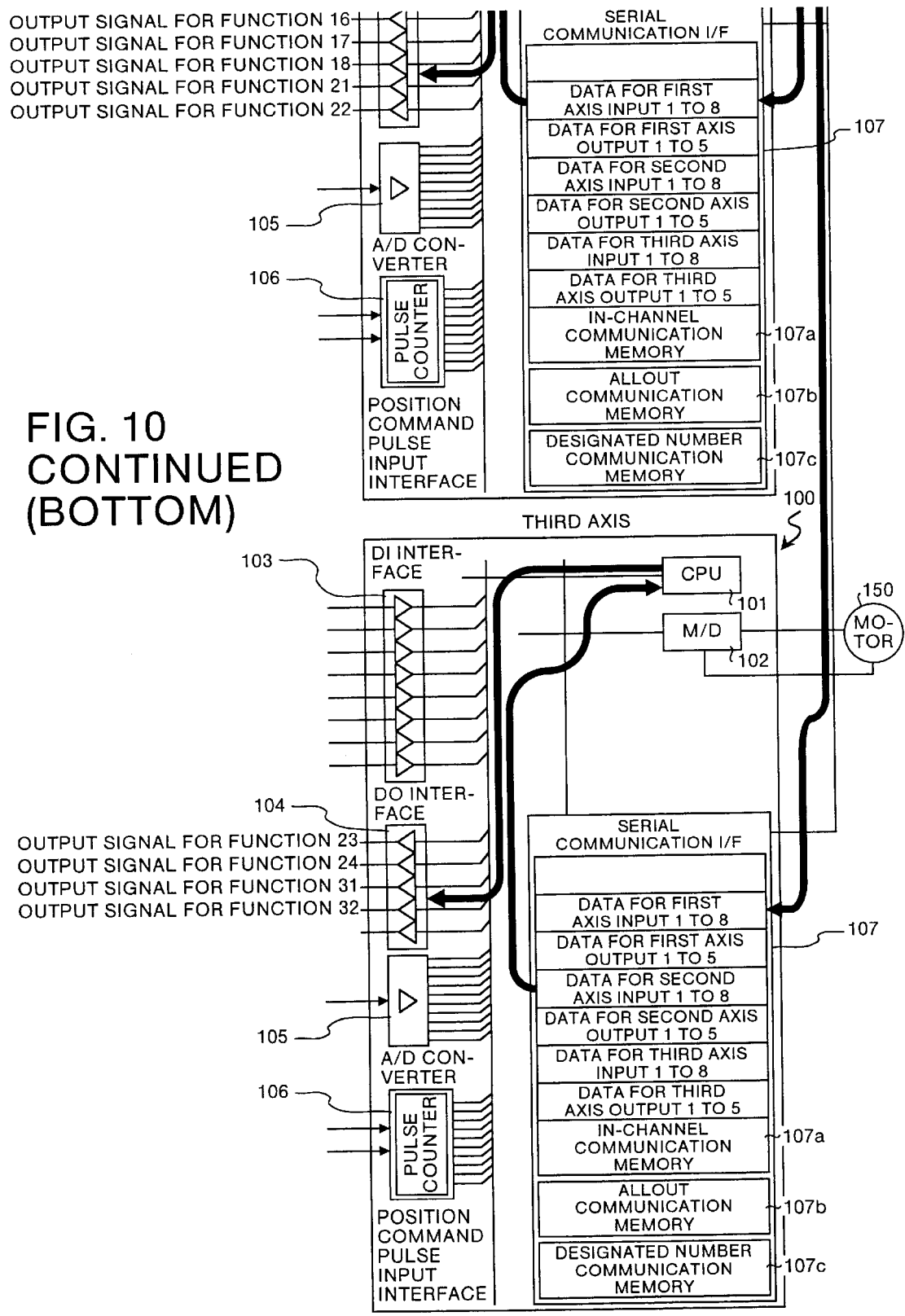

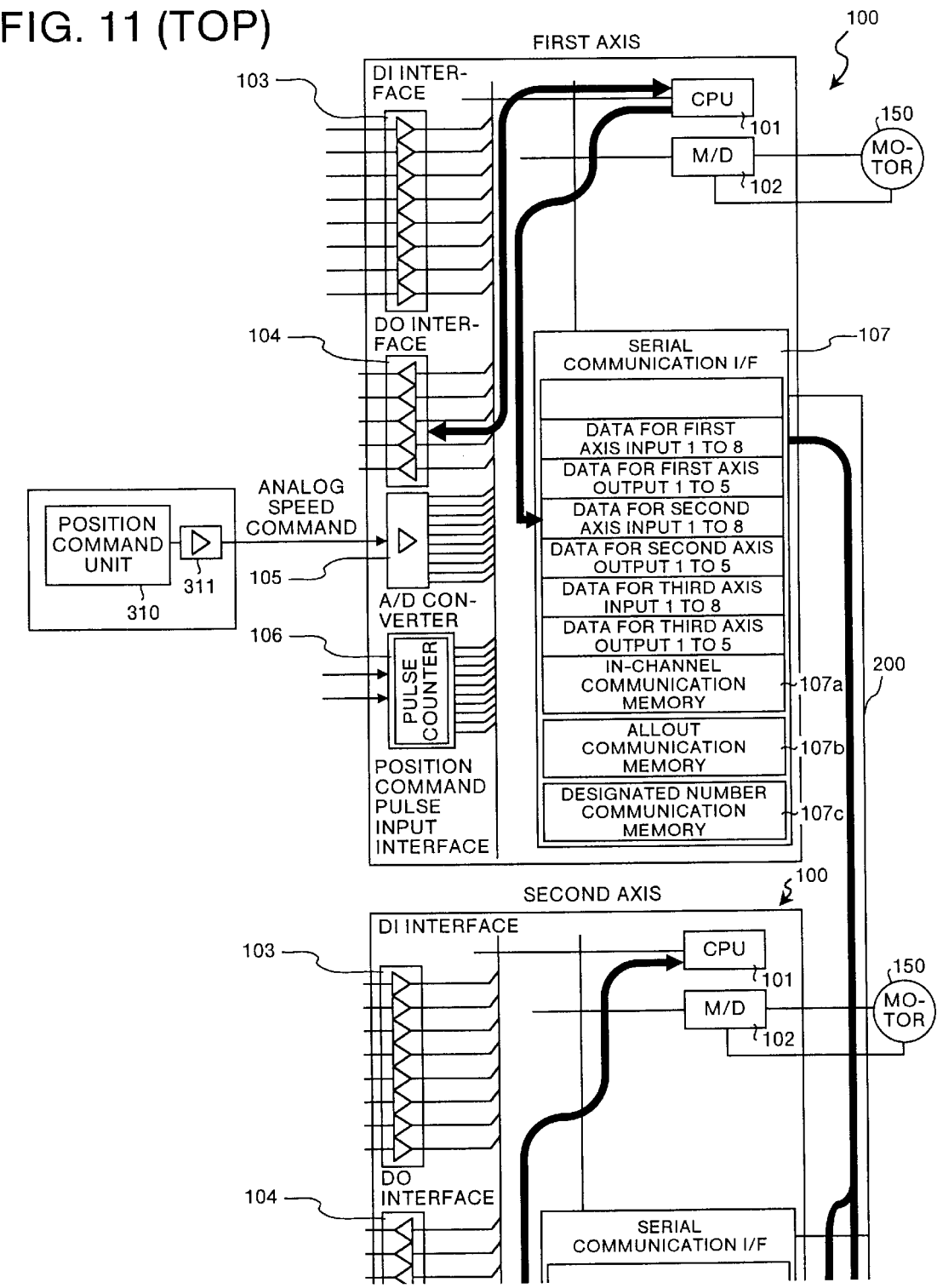
FIG. 11 (TOP)

FIG. 11 CONTINUED (BOTTOM)
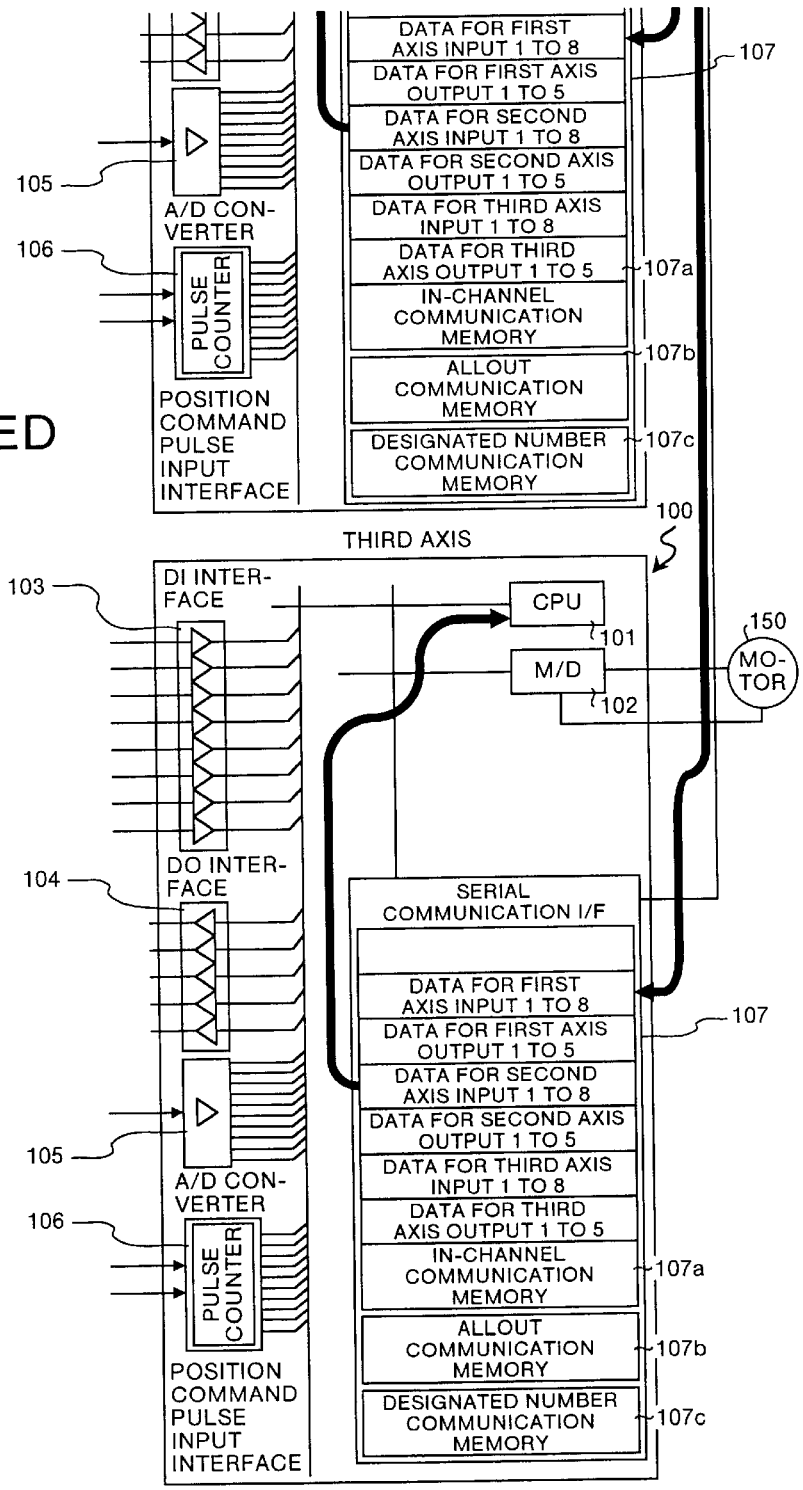

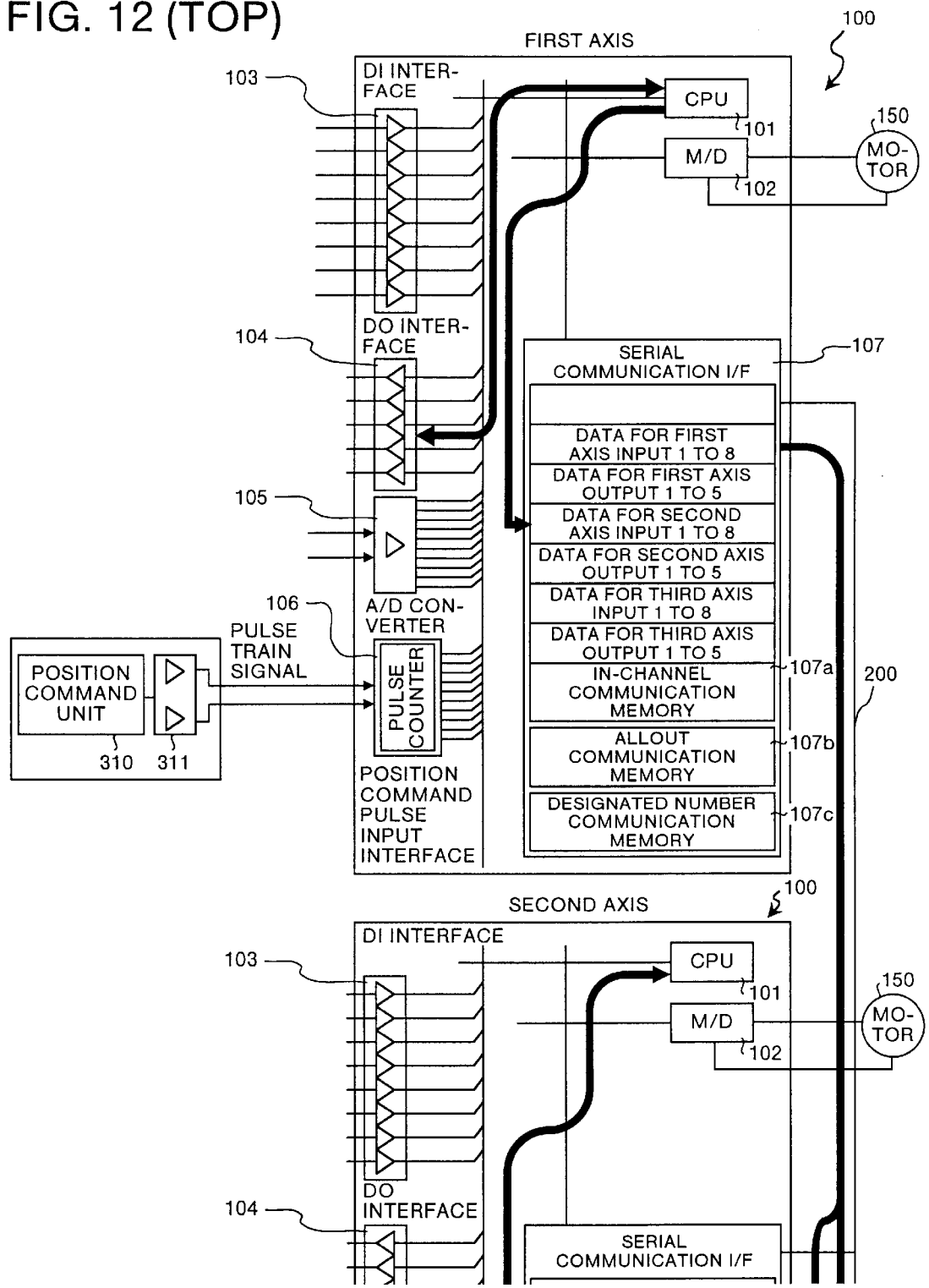
FIG. 12 (TOP)

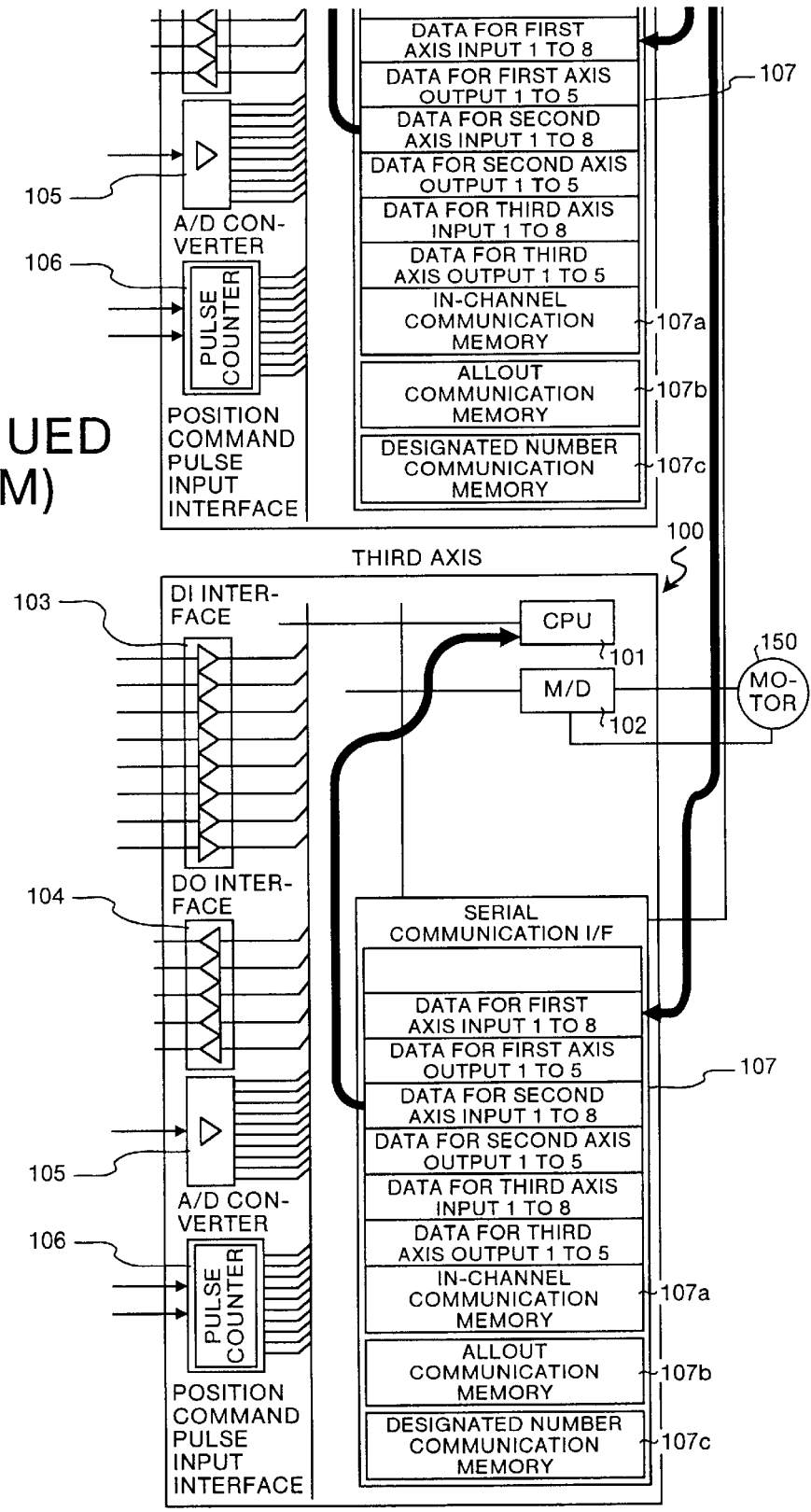
FIG. 12 CONTINUED (BOTTOM)

FIG. 13 (TOP LEFT)
(a)
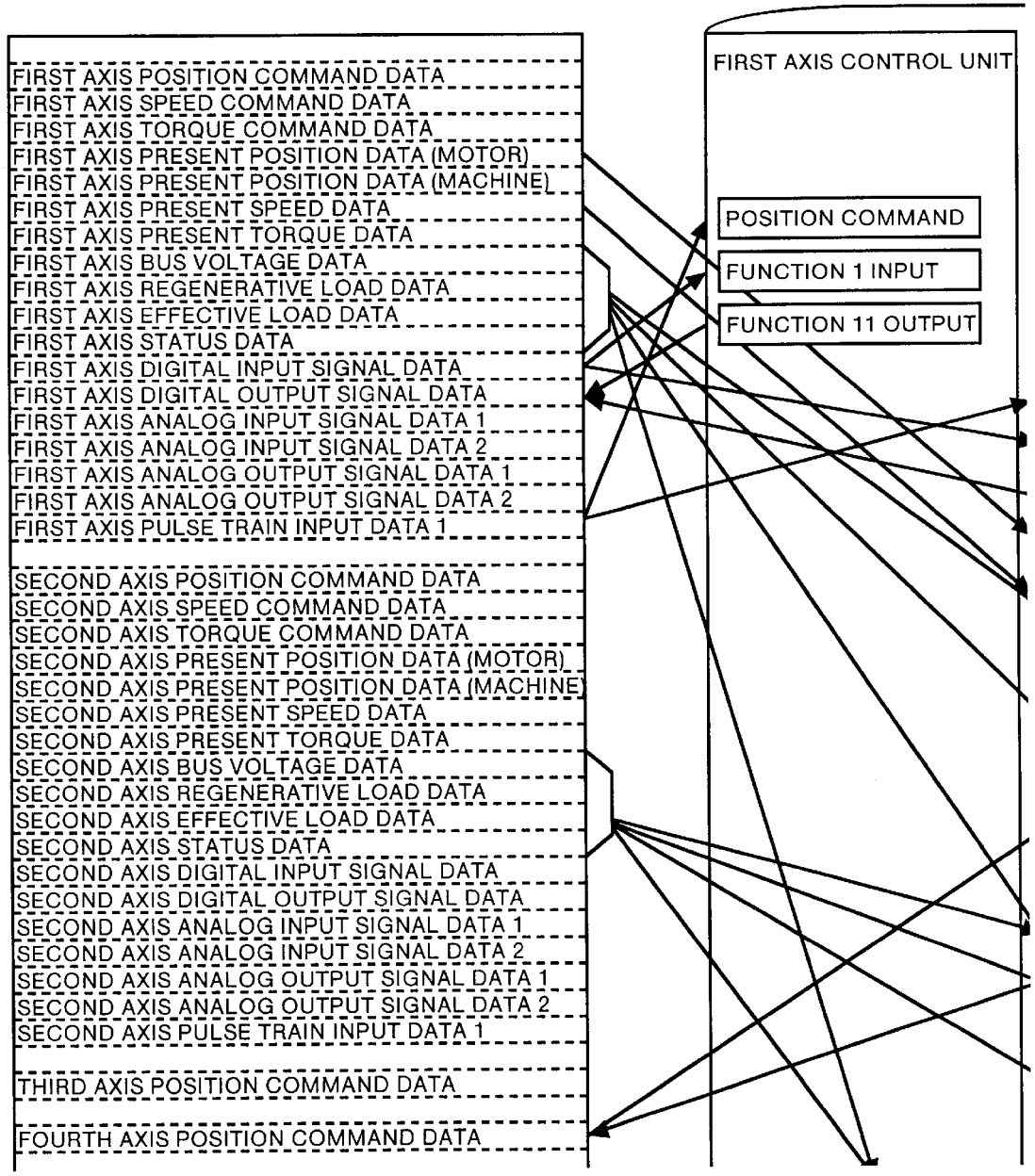

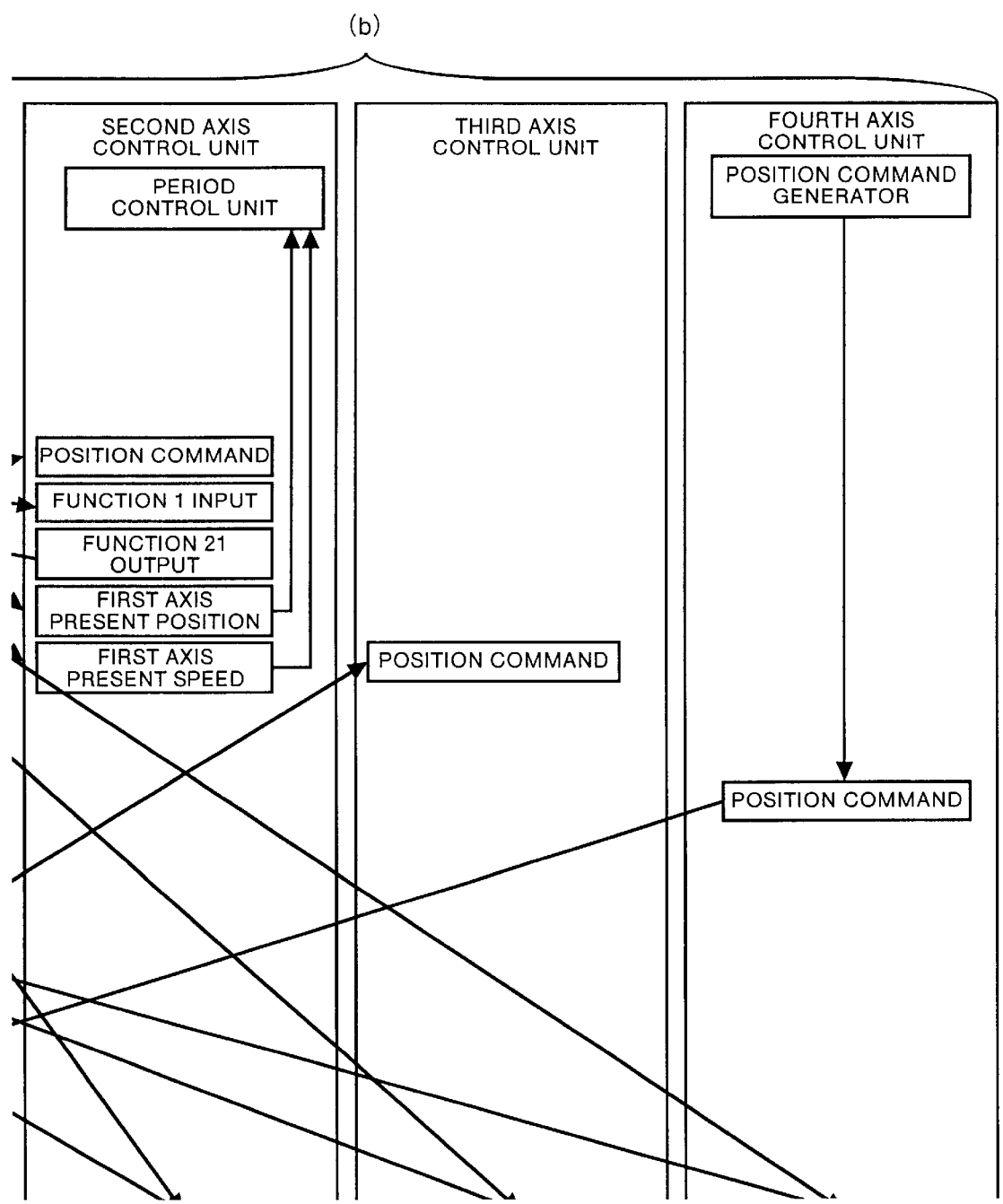
FIG. 13 CONTINUED (TOP RIGHT)

FIG. 13 CONTINUED (BOTTOM LEFT)
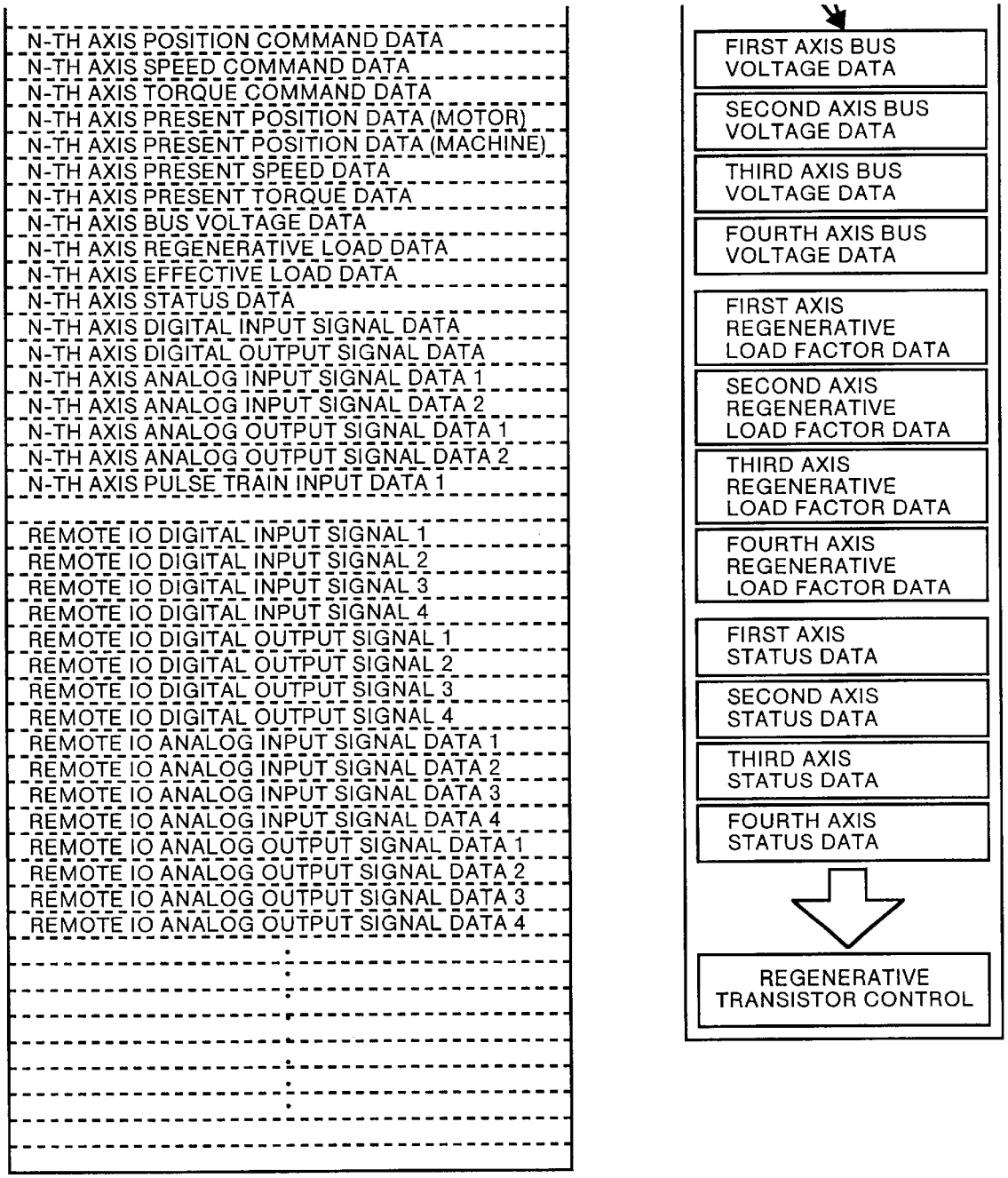

FIG. 13 CONTINUED (BOTTOM RIGHT)
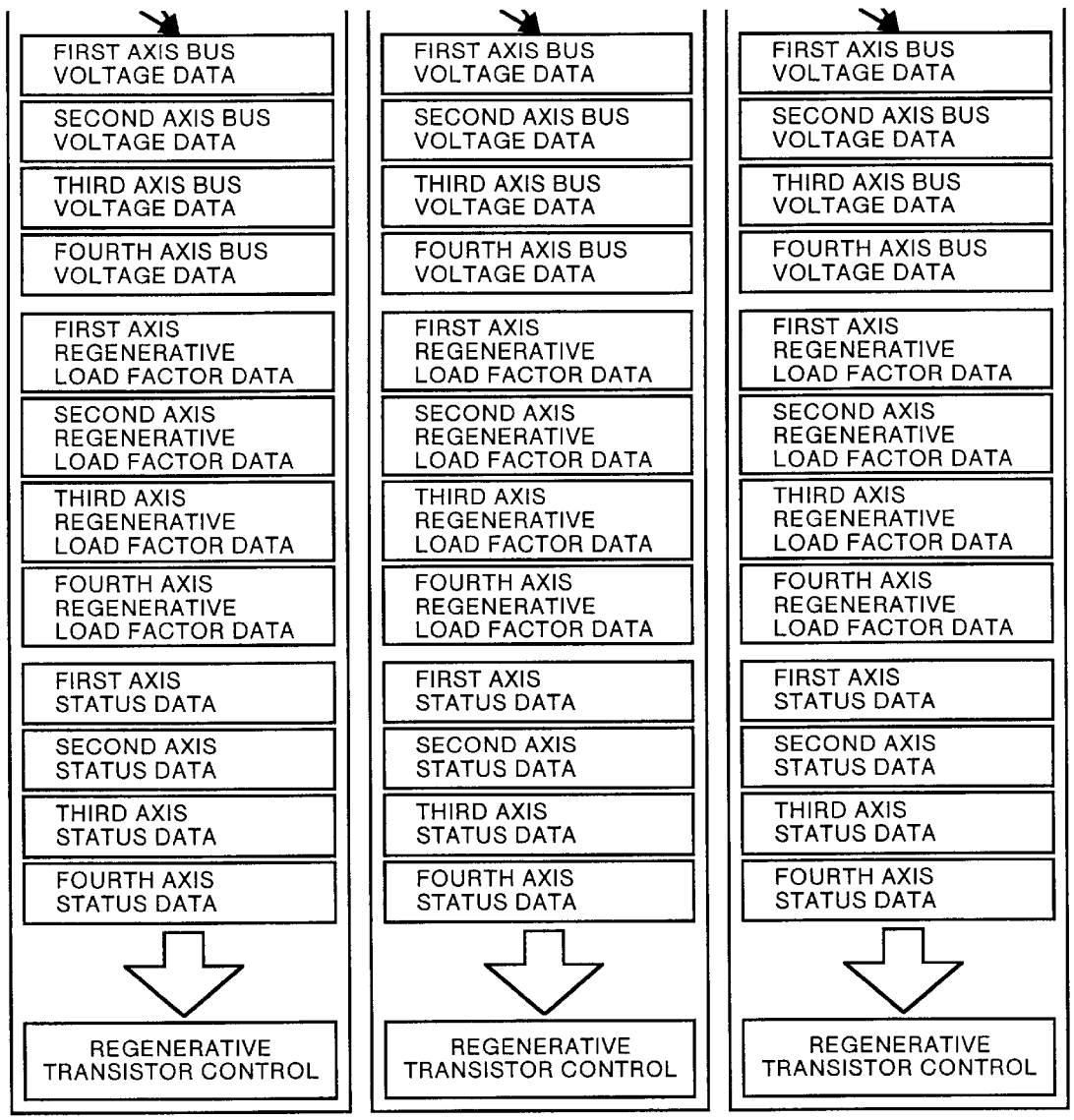

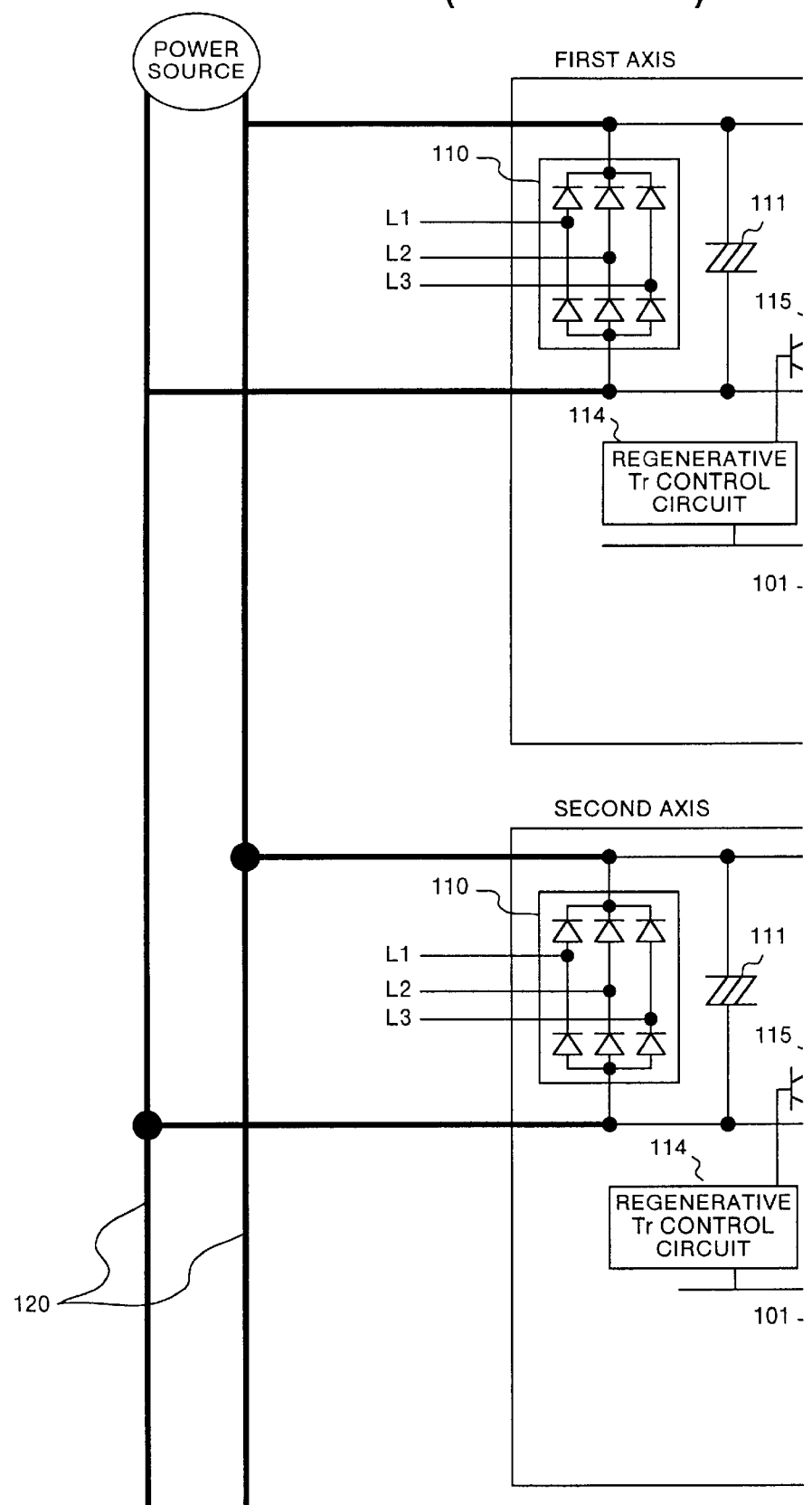
FIG. 14 (TOP LEFT)

FIG. 14 CONTINUED (TOP RIGHT)
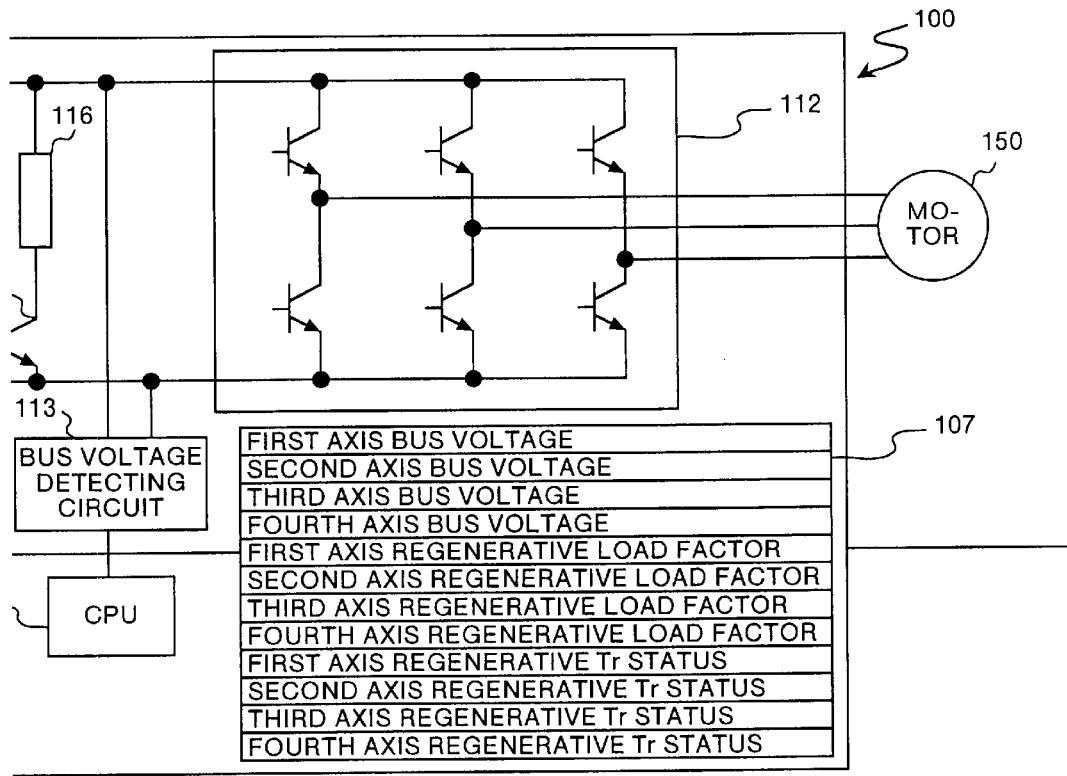
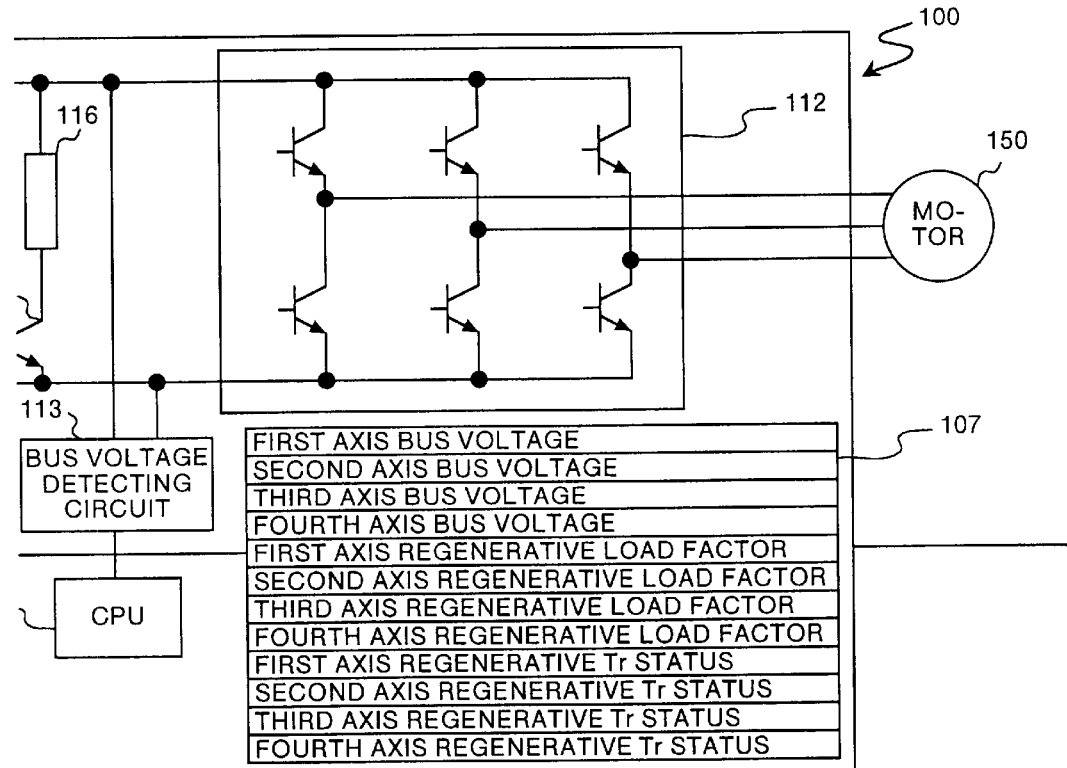

FIG. 14 CONTINUED (BOTTOM LEFT)
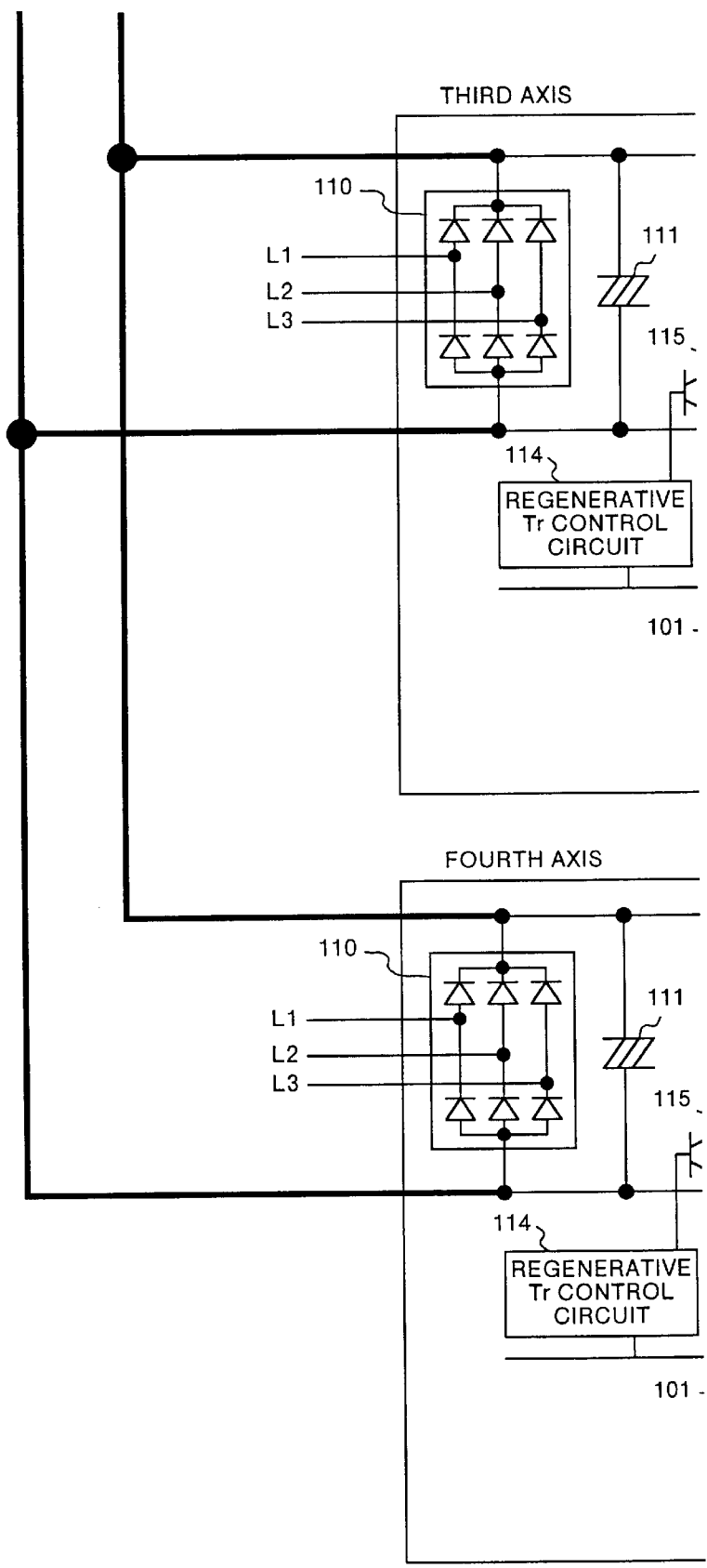

FIG. 14 CONTINUED (BOTTOM RIGHT)
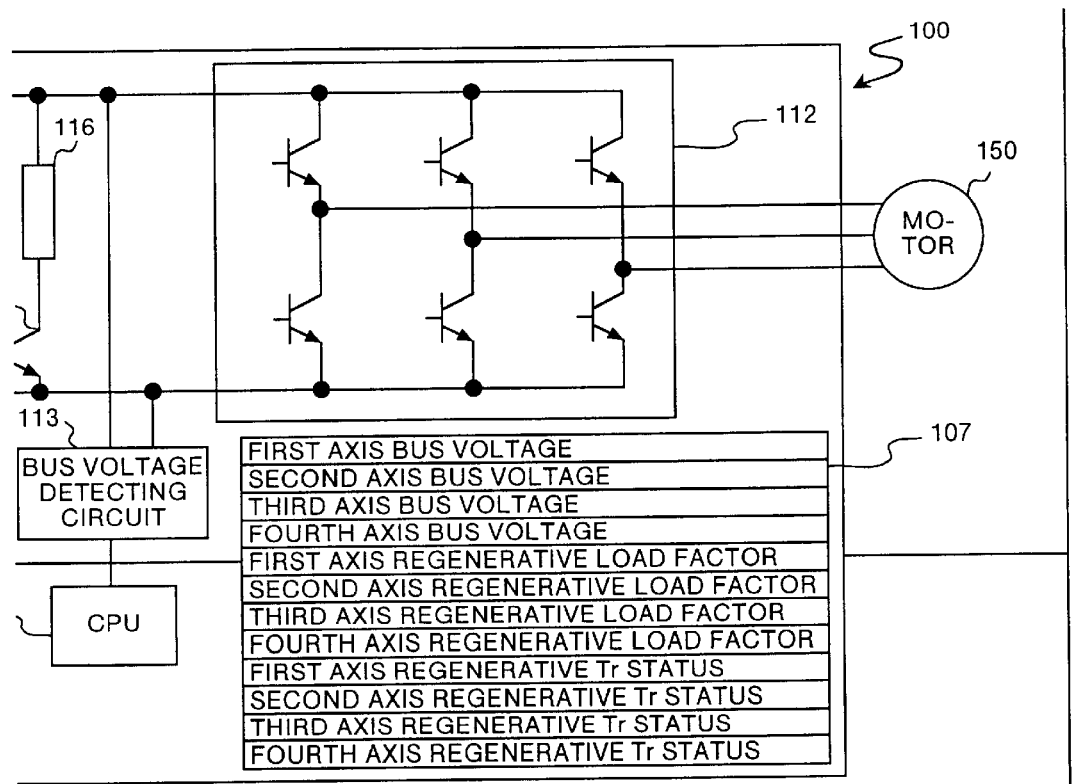
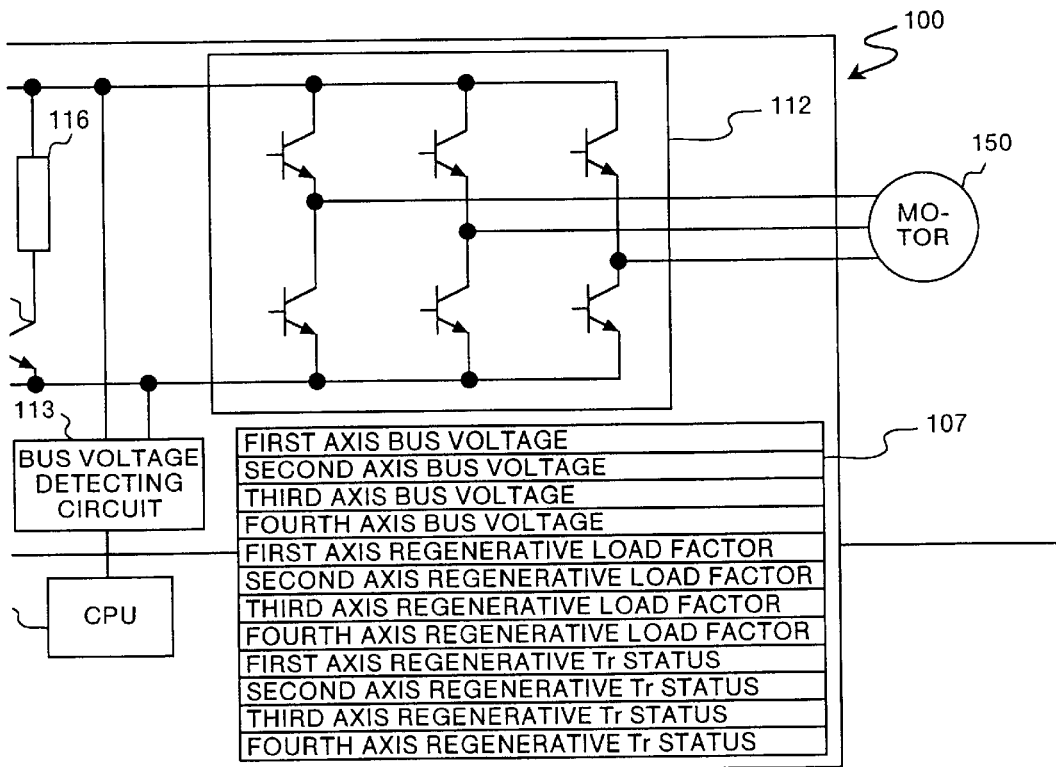

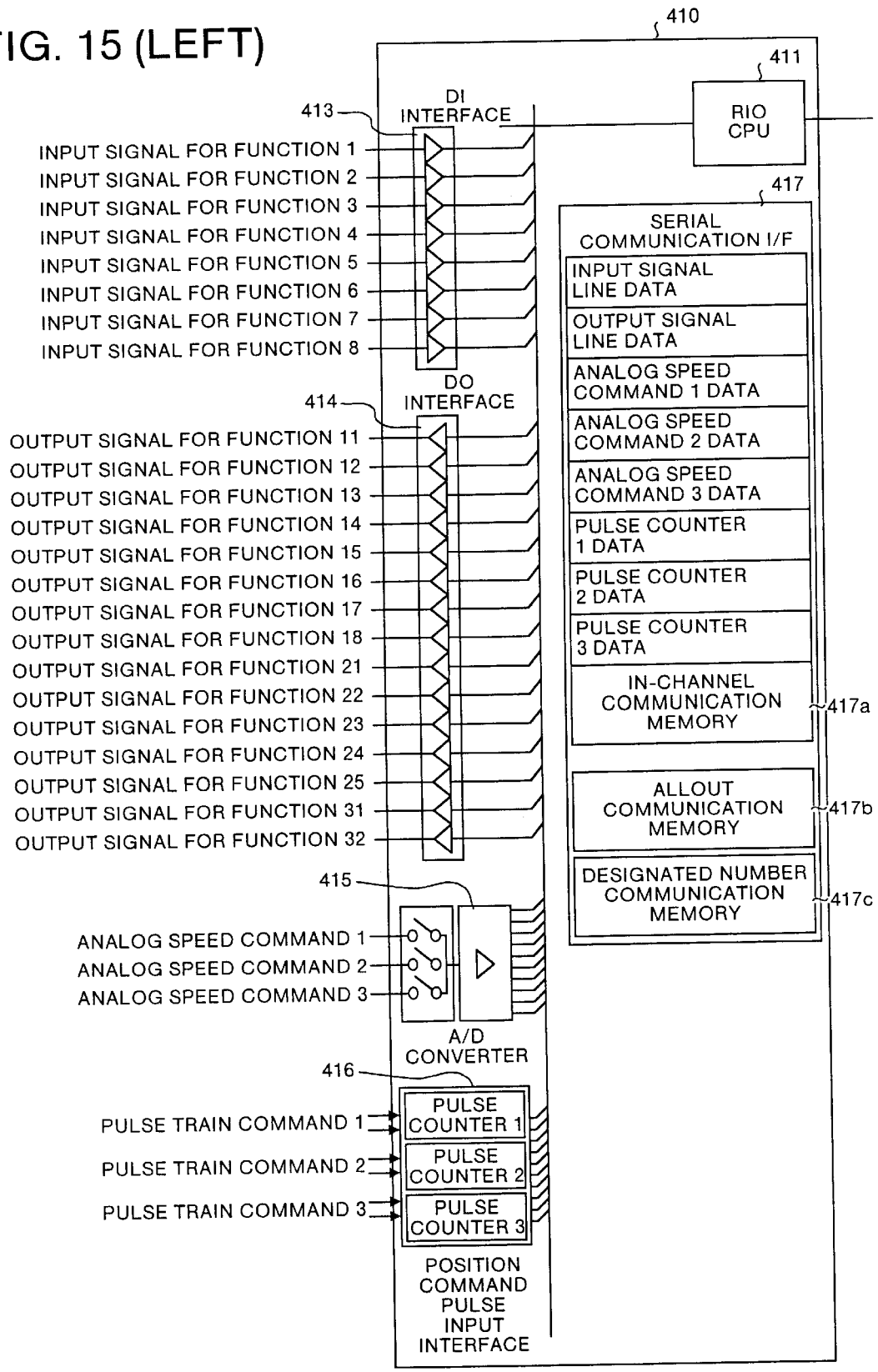
FIG. 15 (LEFT)

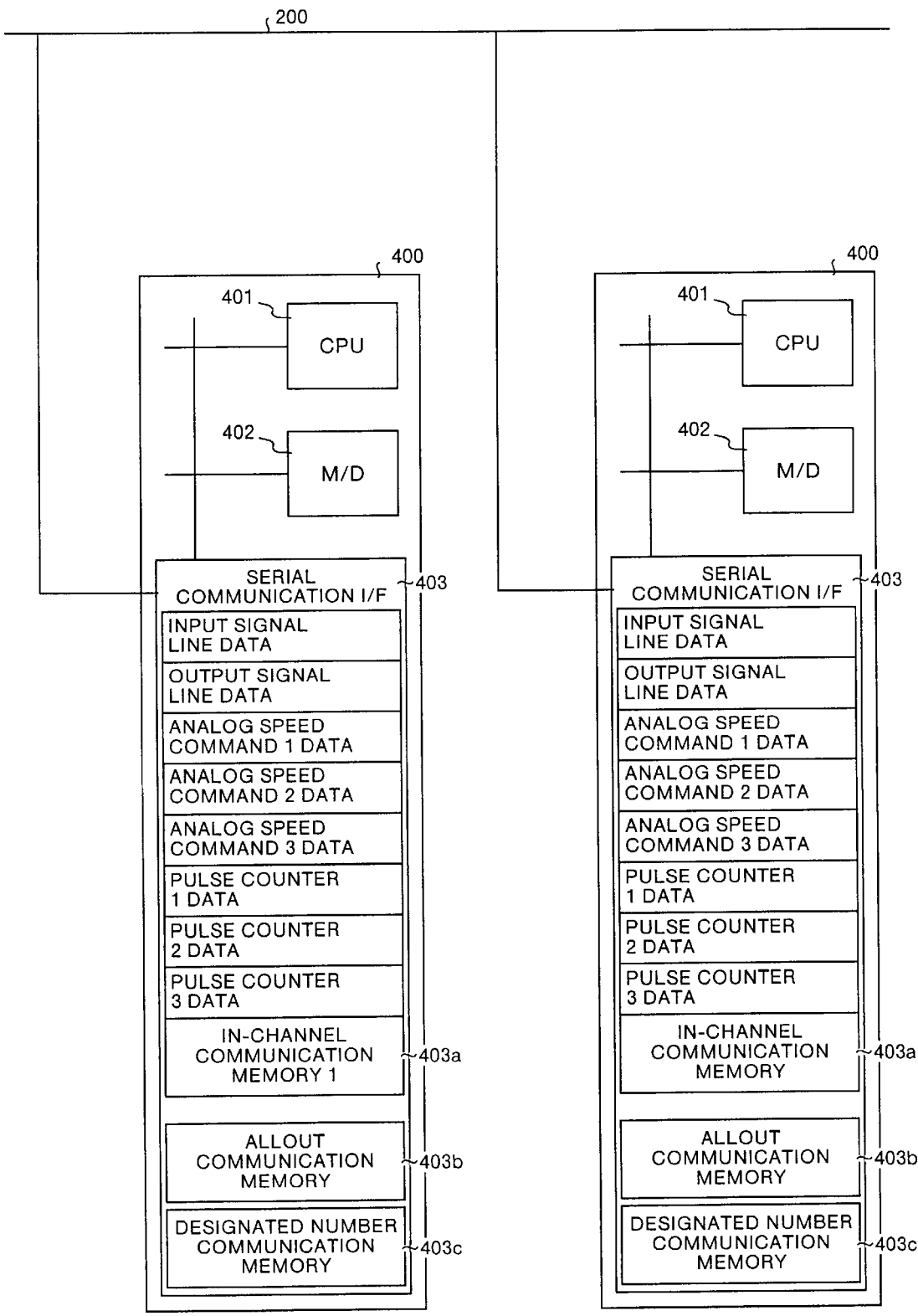
FIG. 15 CONTINUED (MIDDLE)

FIG. 15 CONTINUED (RIGHT)
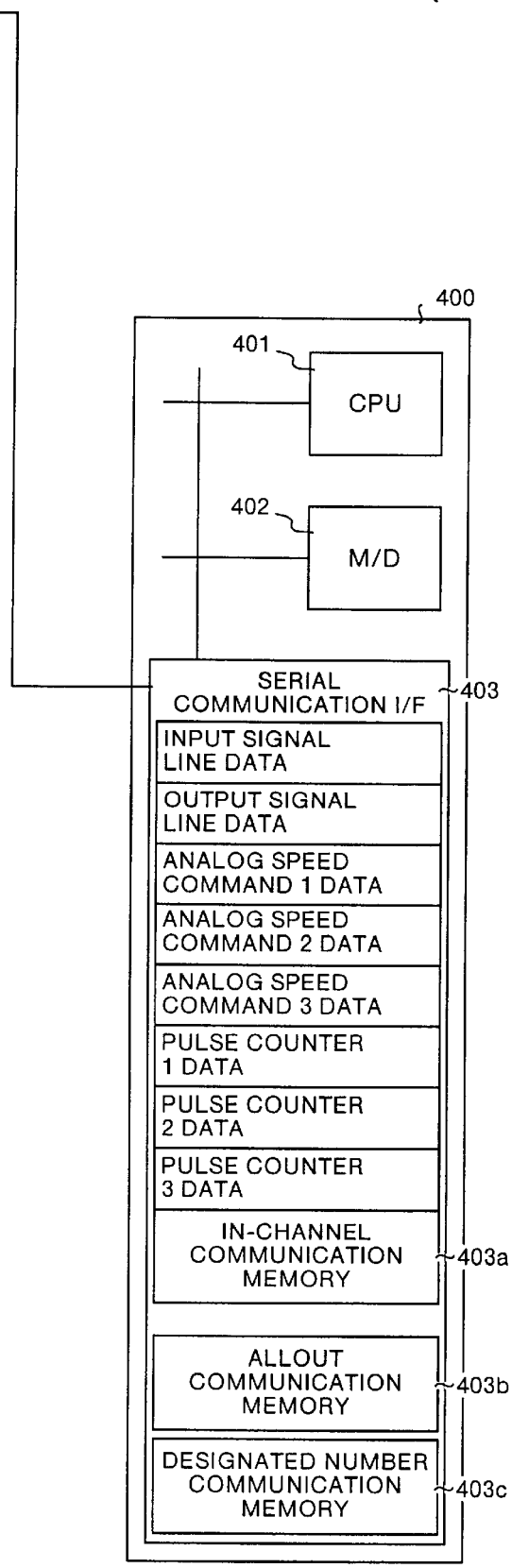

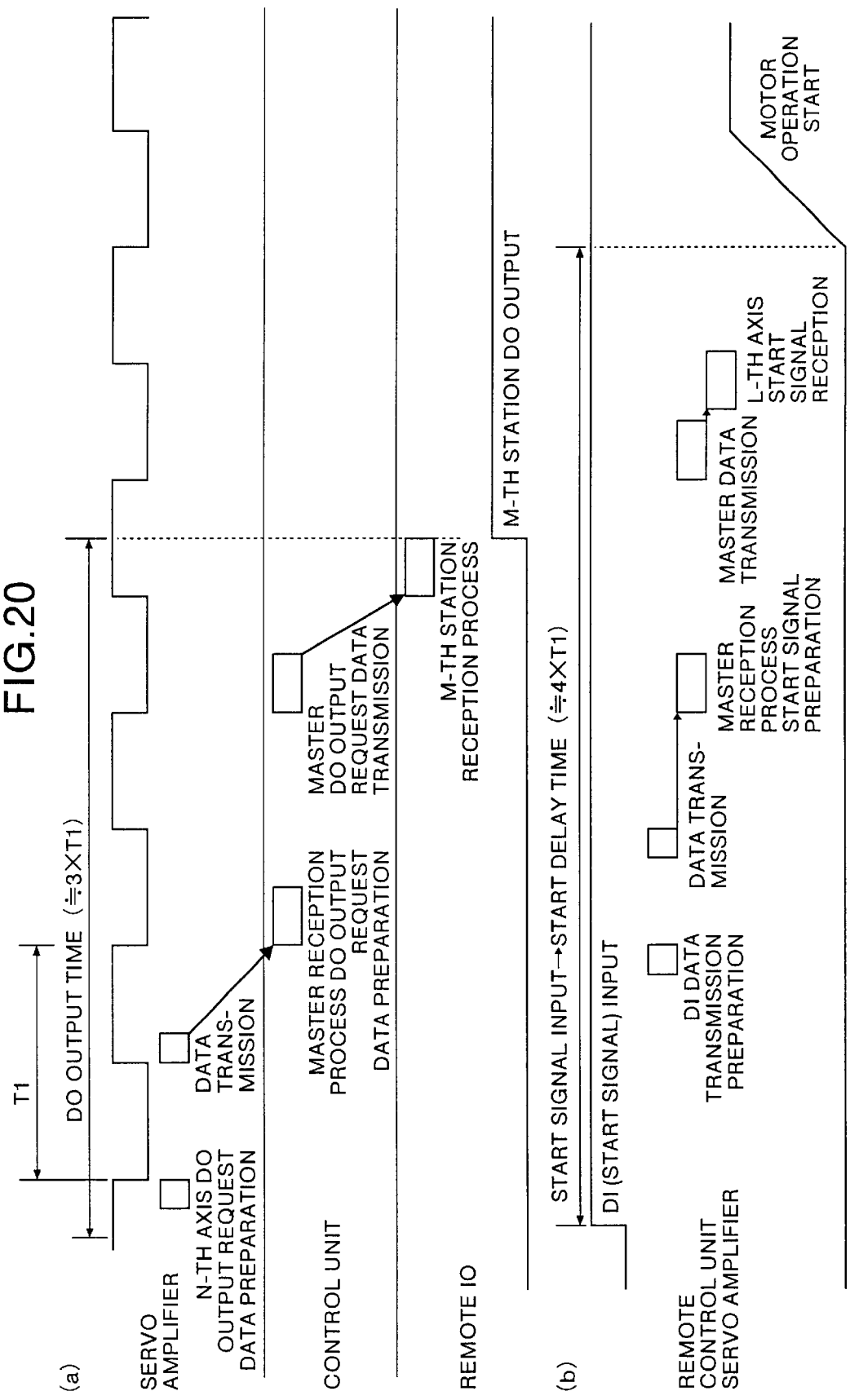

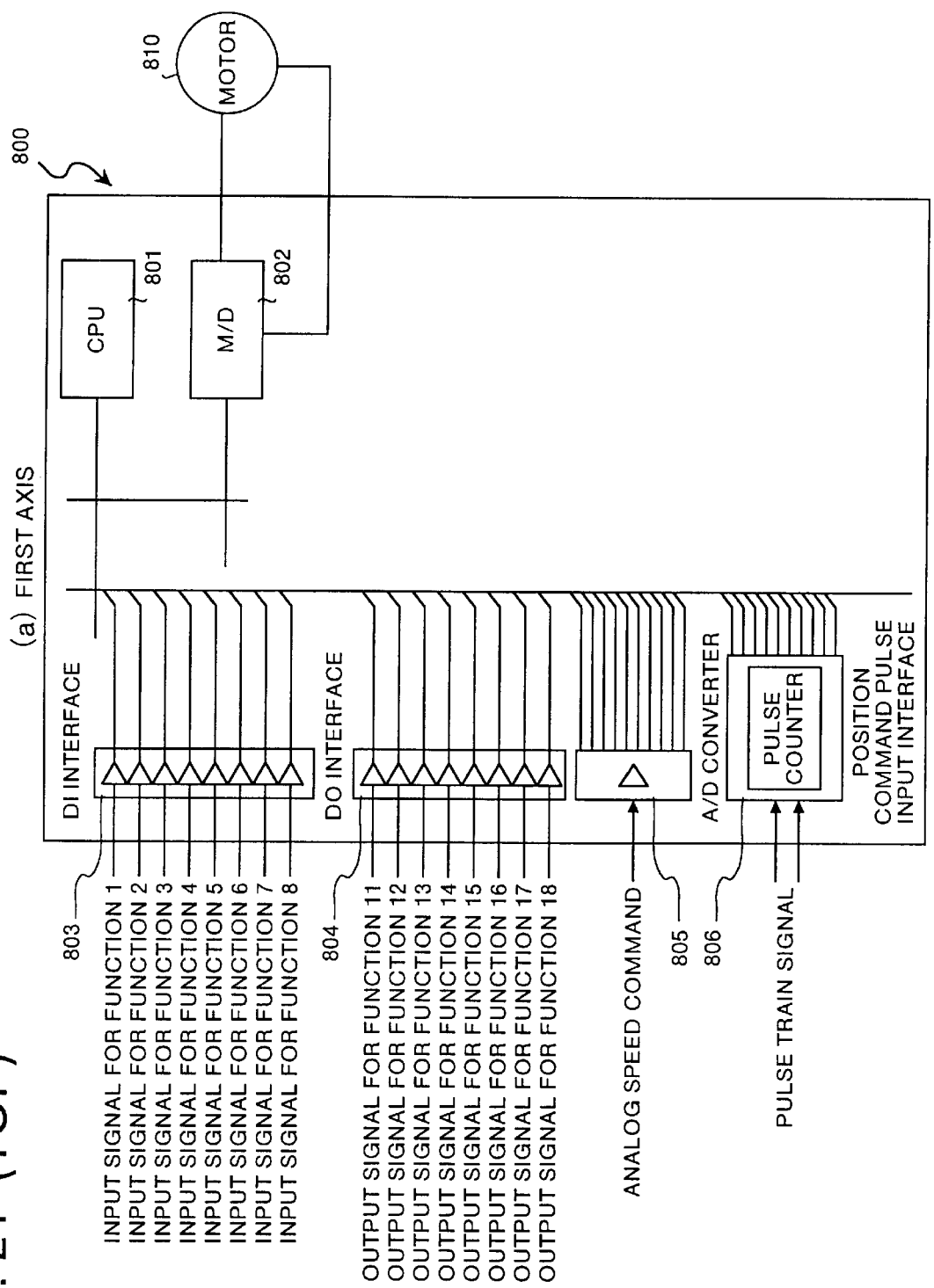
FIG. 21 (TOP)

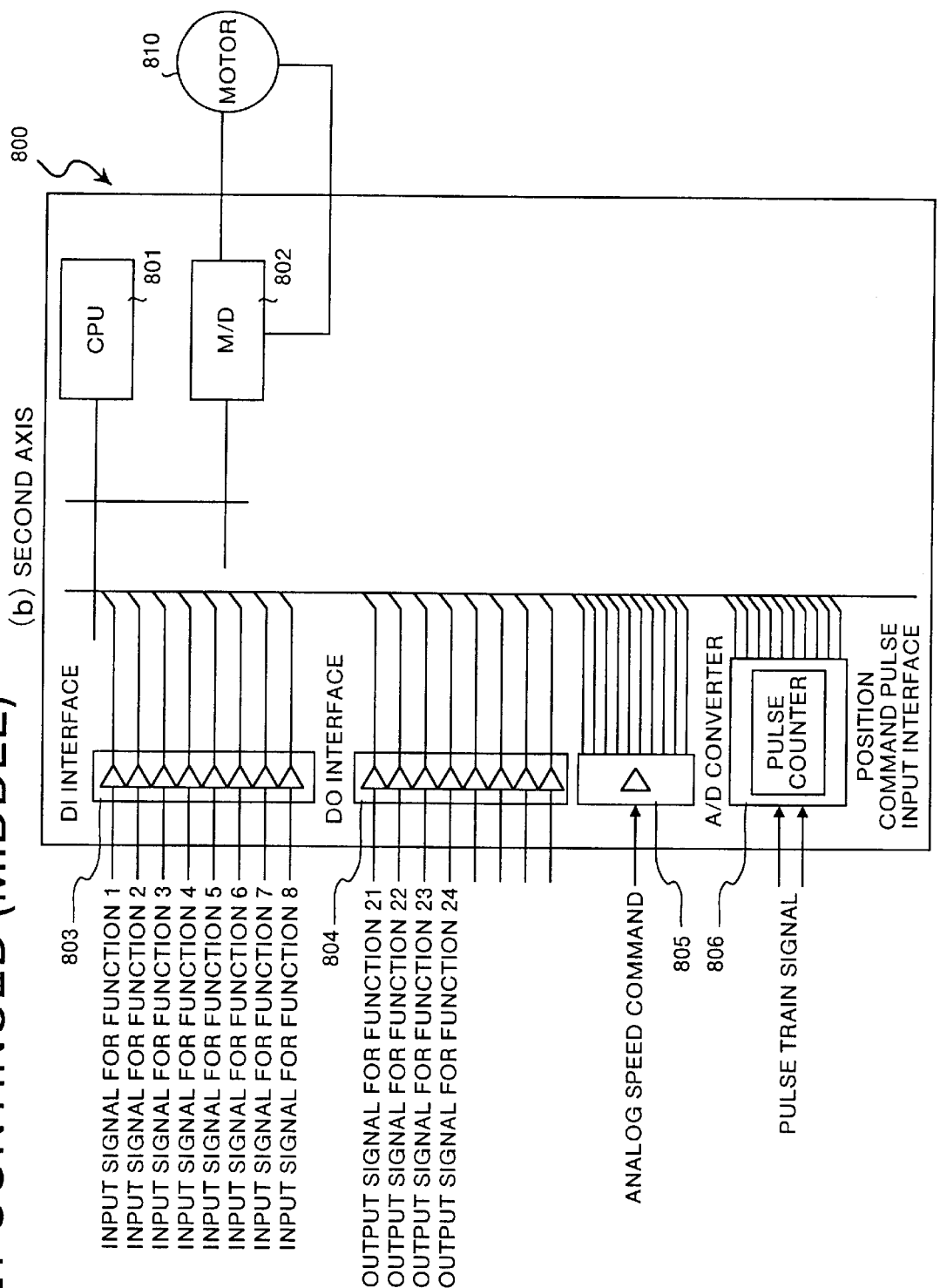
FIG. 21 CONTINUED (MIDDLE)

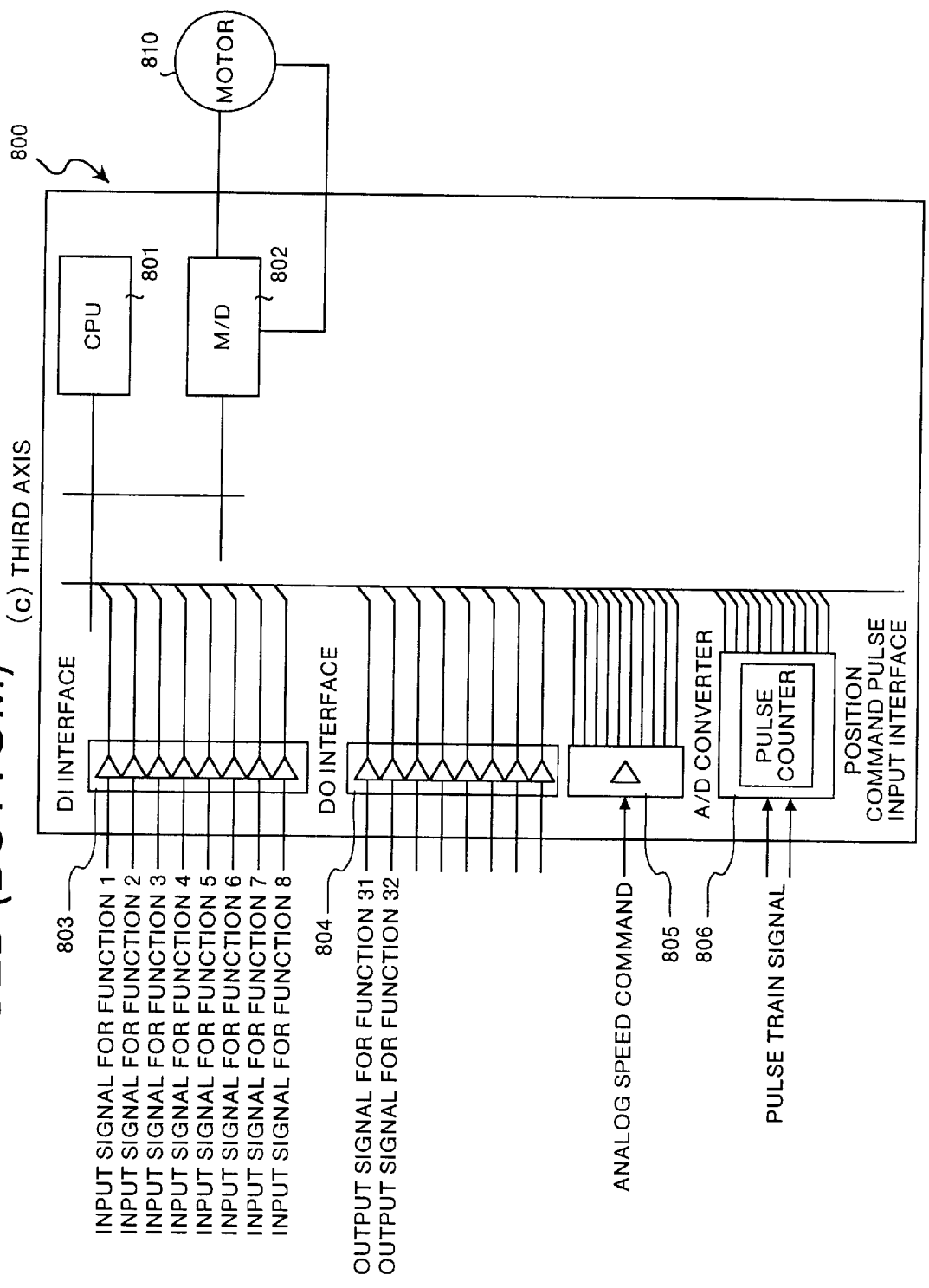
FIG. 21 CONTINUED (BOTTOM)

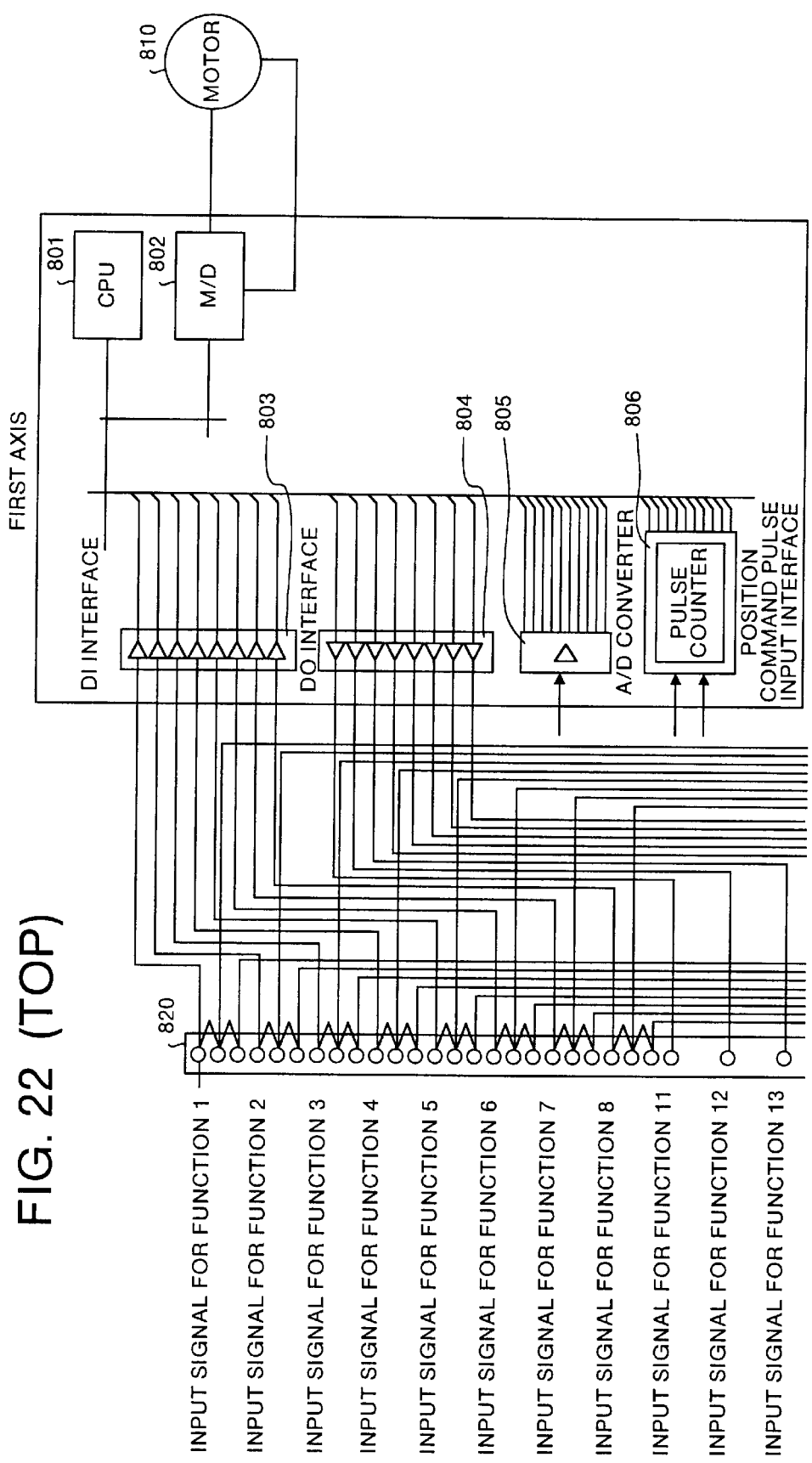
FIG. 22 (TOP)

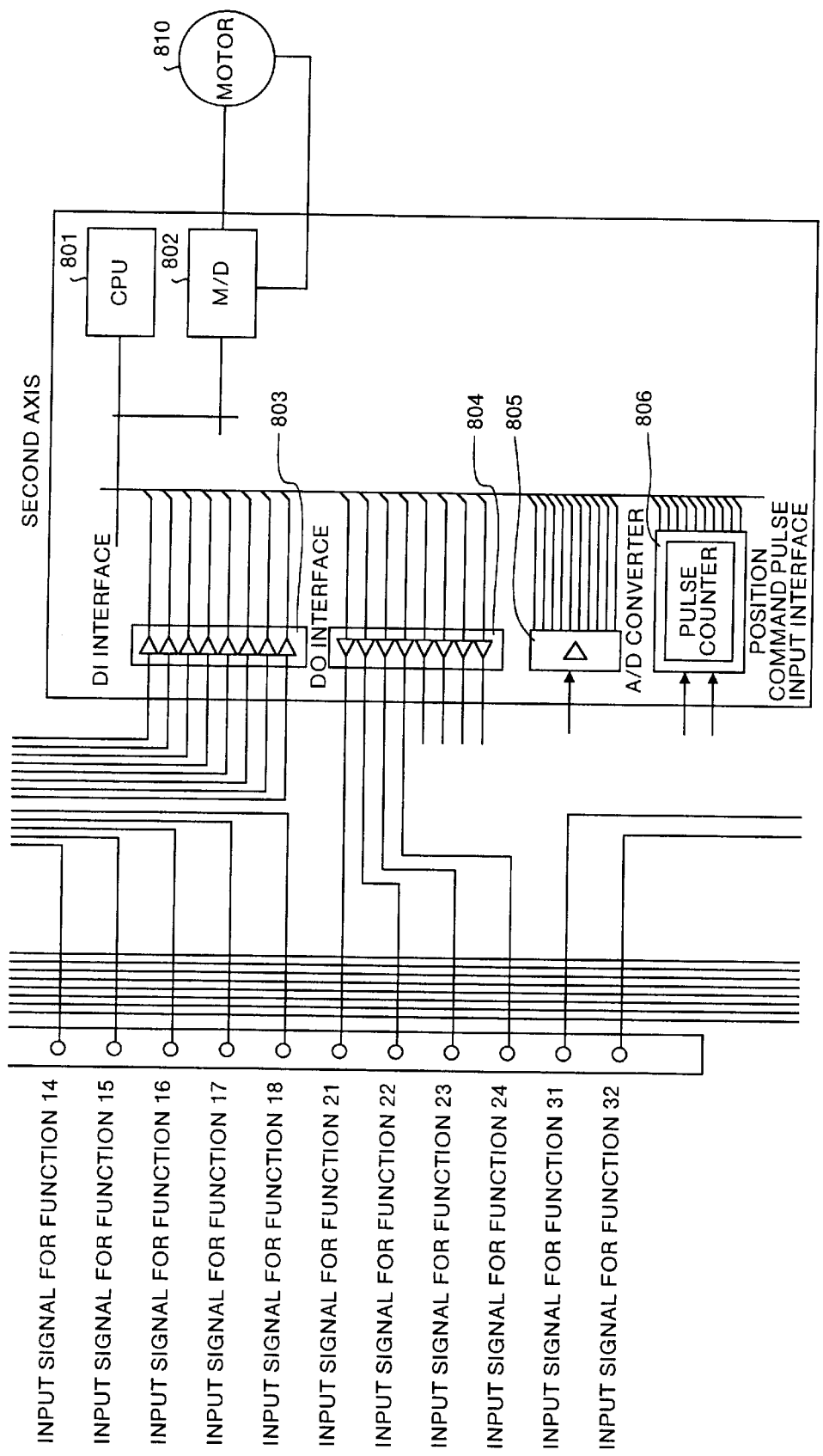
FIG. 22 CONTINUED (MIDDLE)

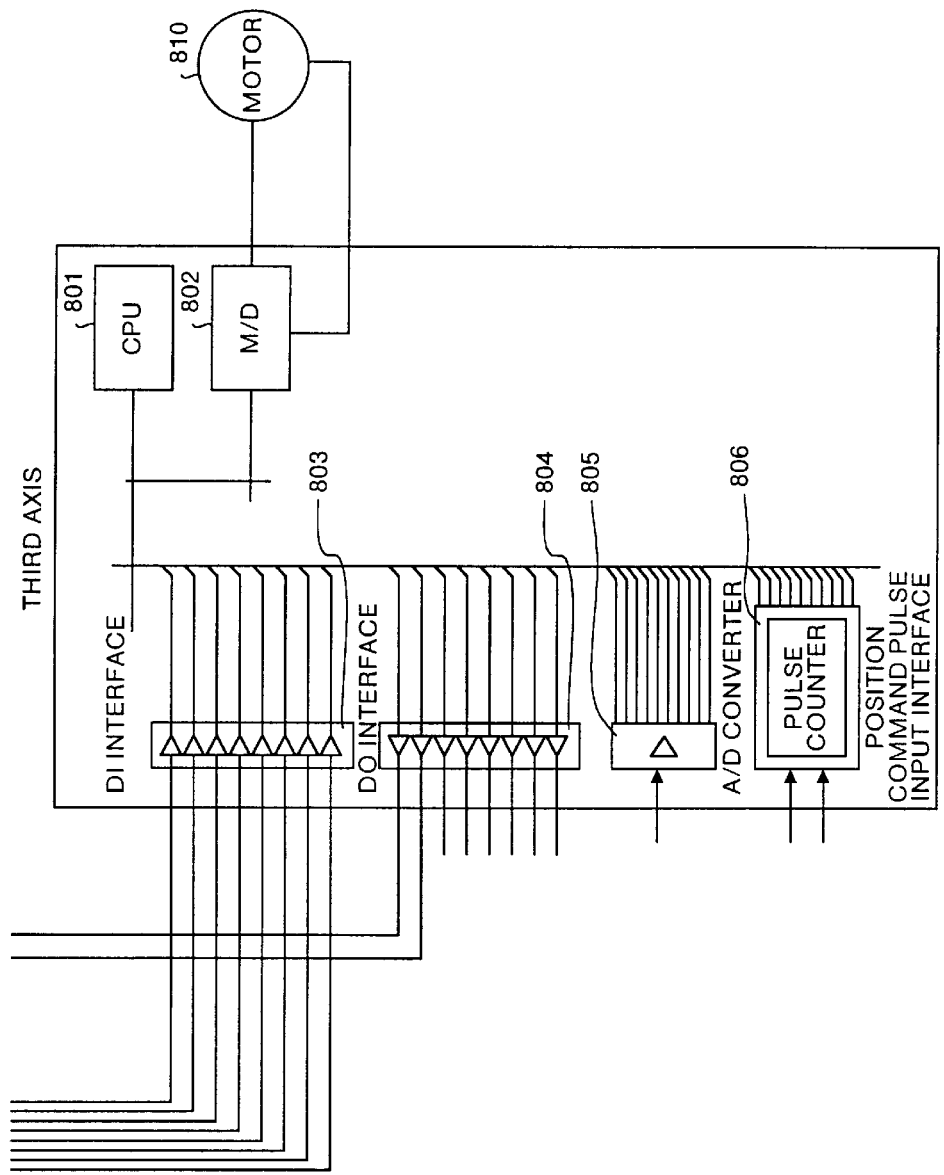
FIG. 22 CONTINUED (BOTTOM)

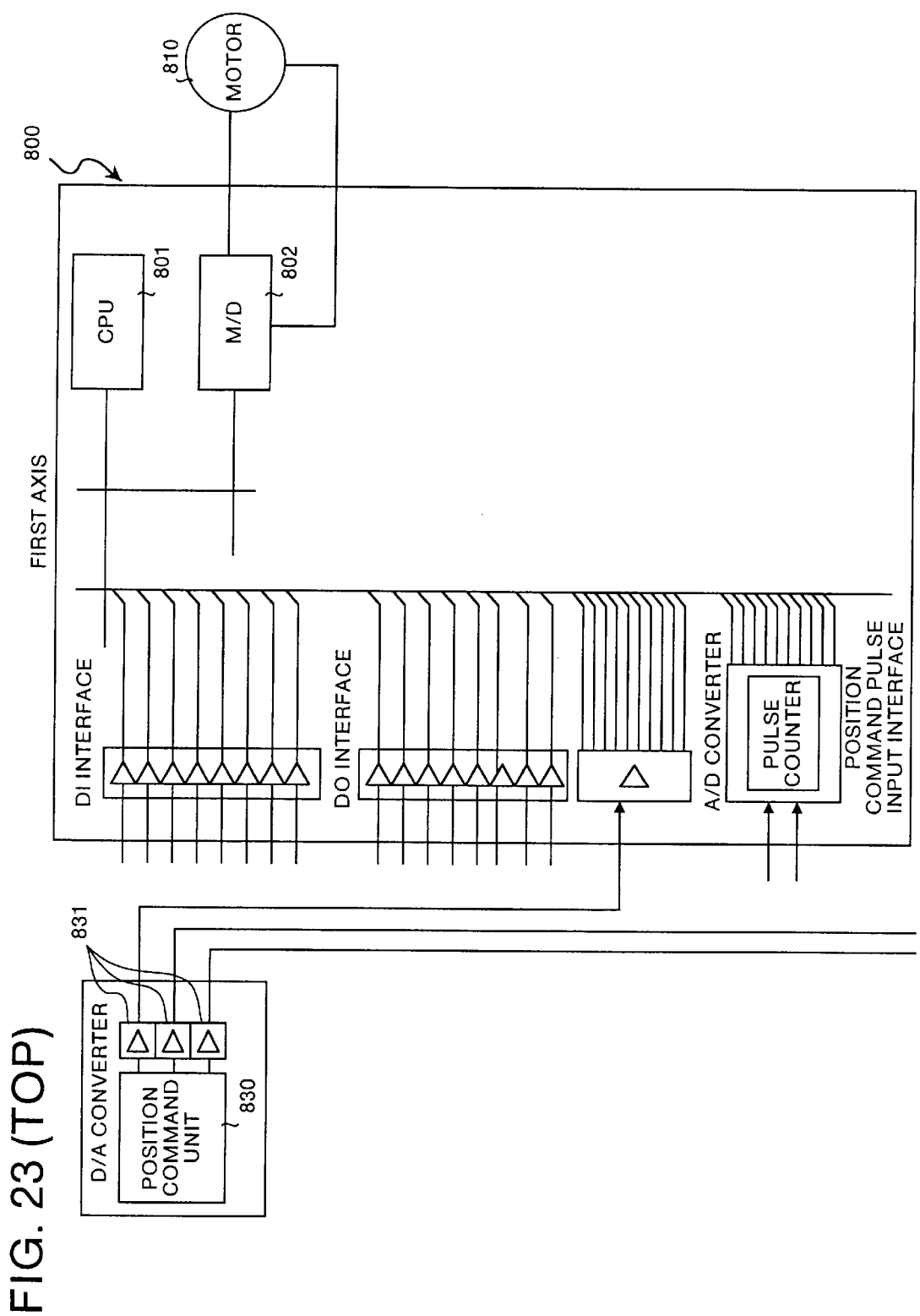
FIG. 23 (TOP)

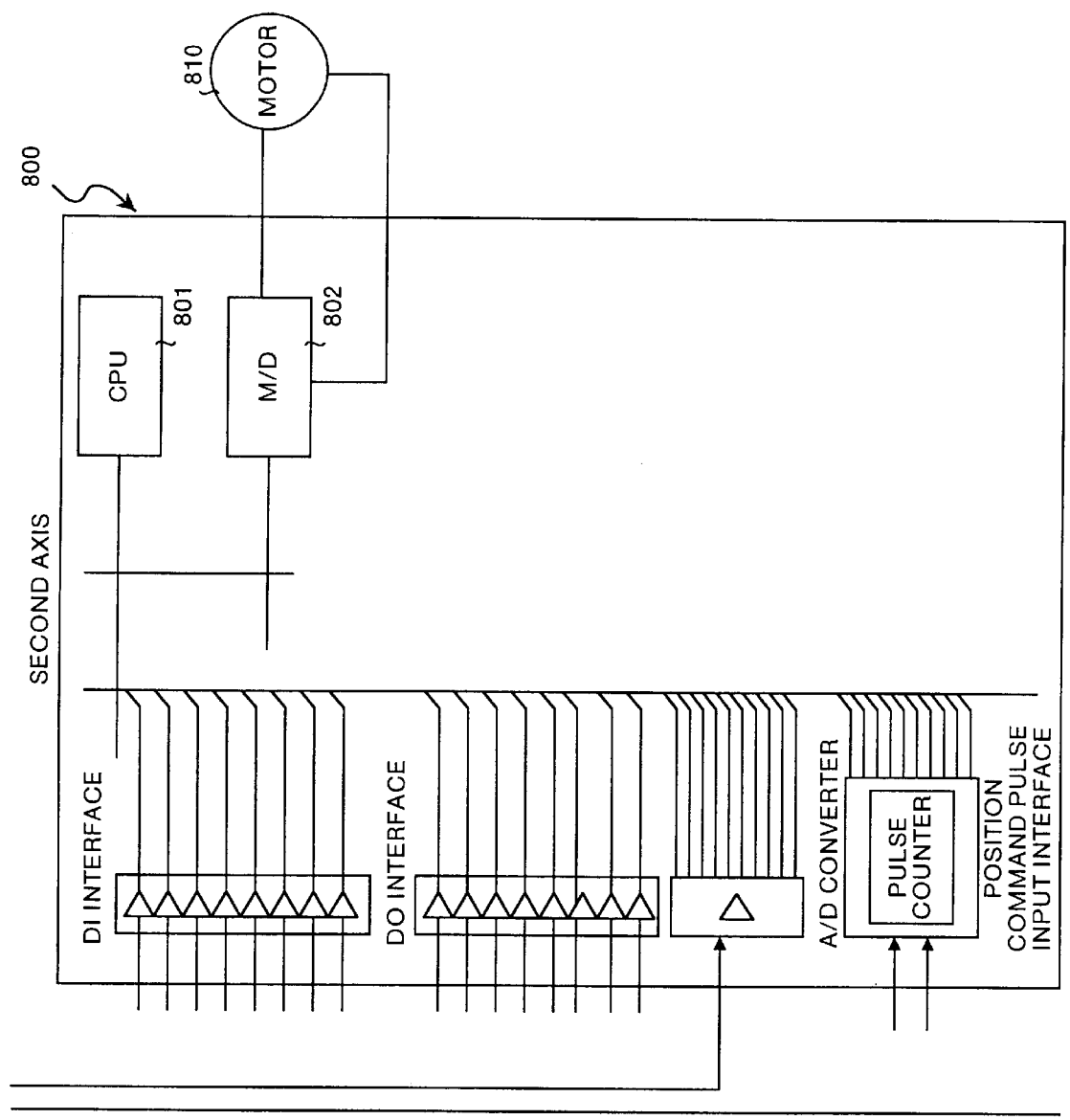
FIG. 23 CONTINUED (MIDDLE)

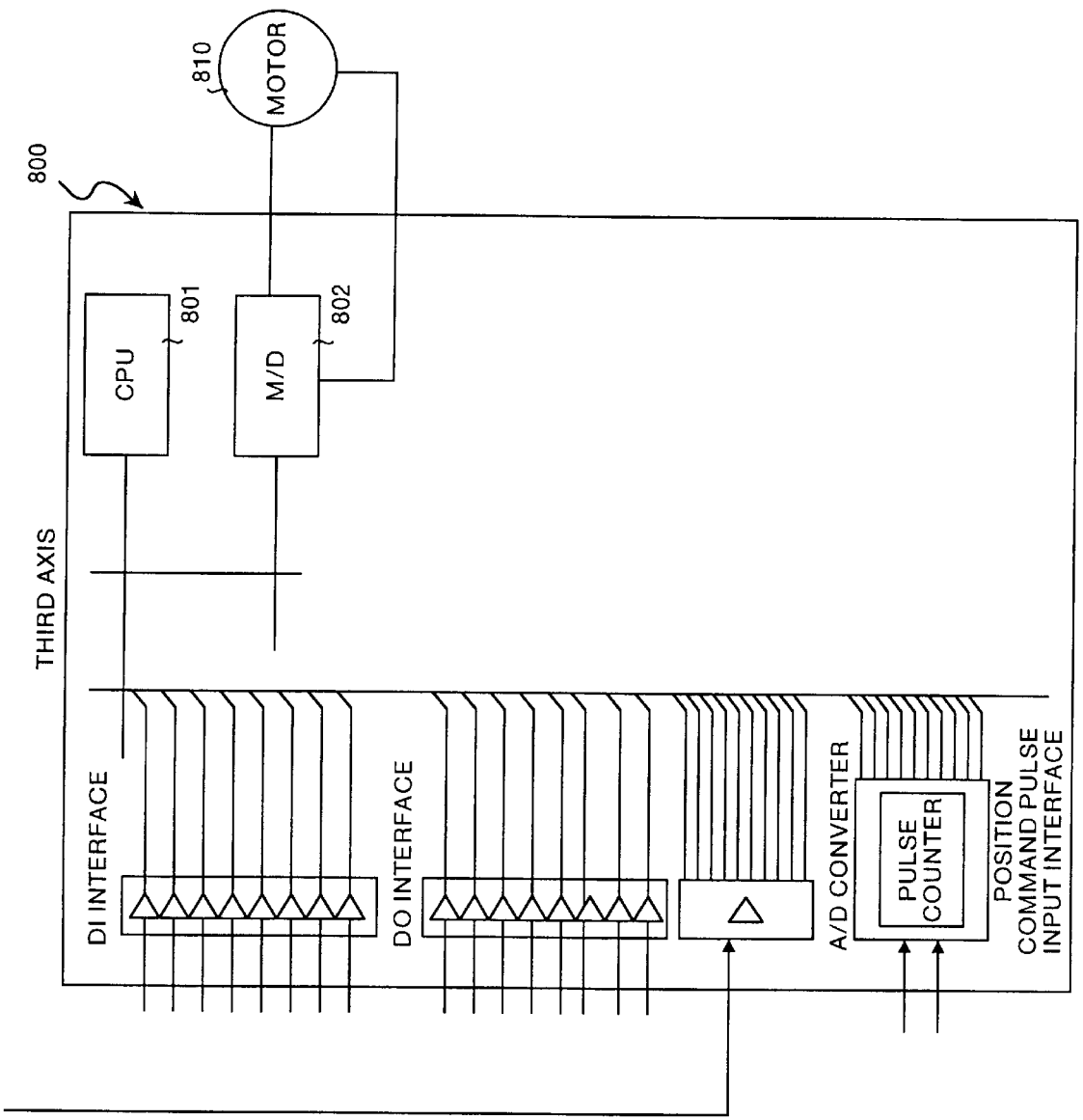
FIG. 23 CONTINUED (BOTTOM)

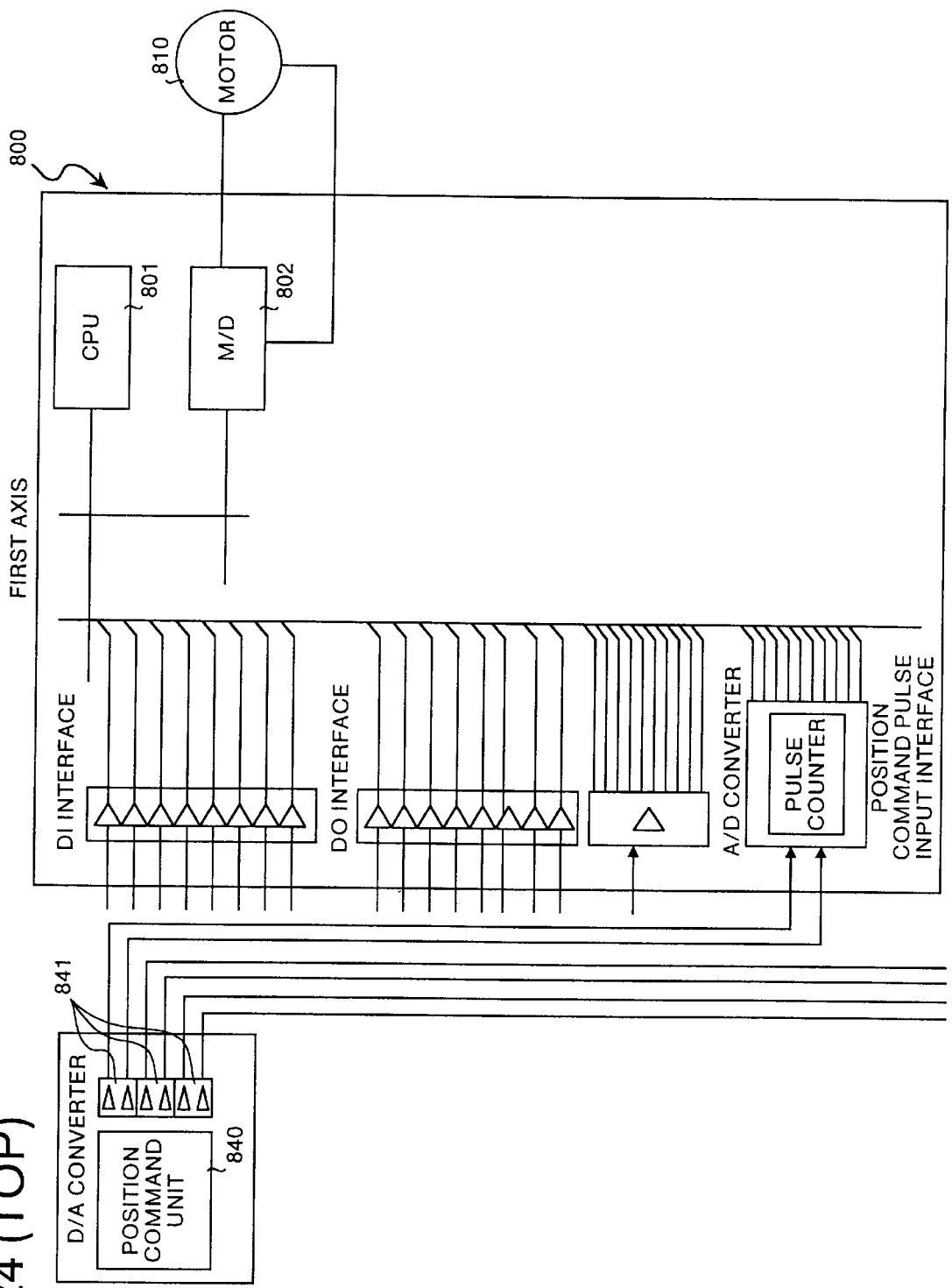
FIG. 24 (TOP)

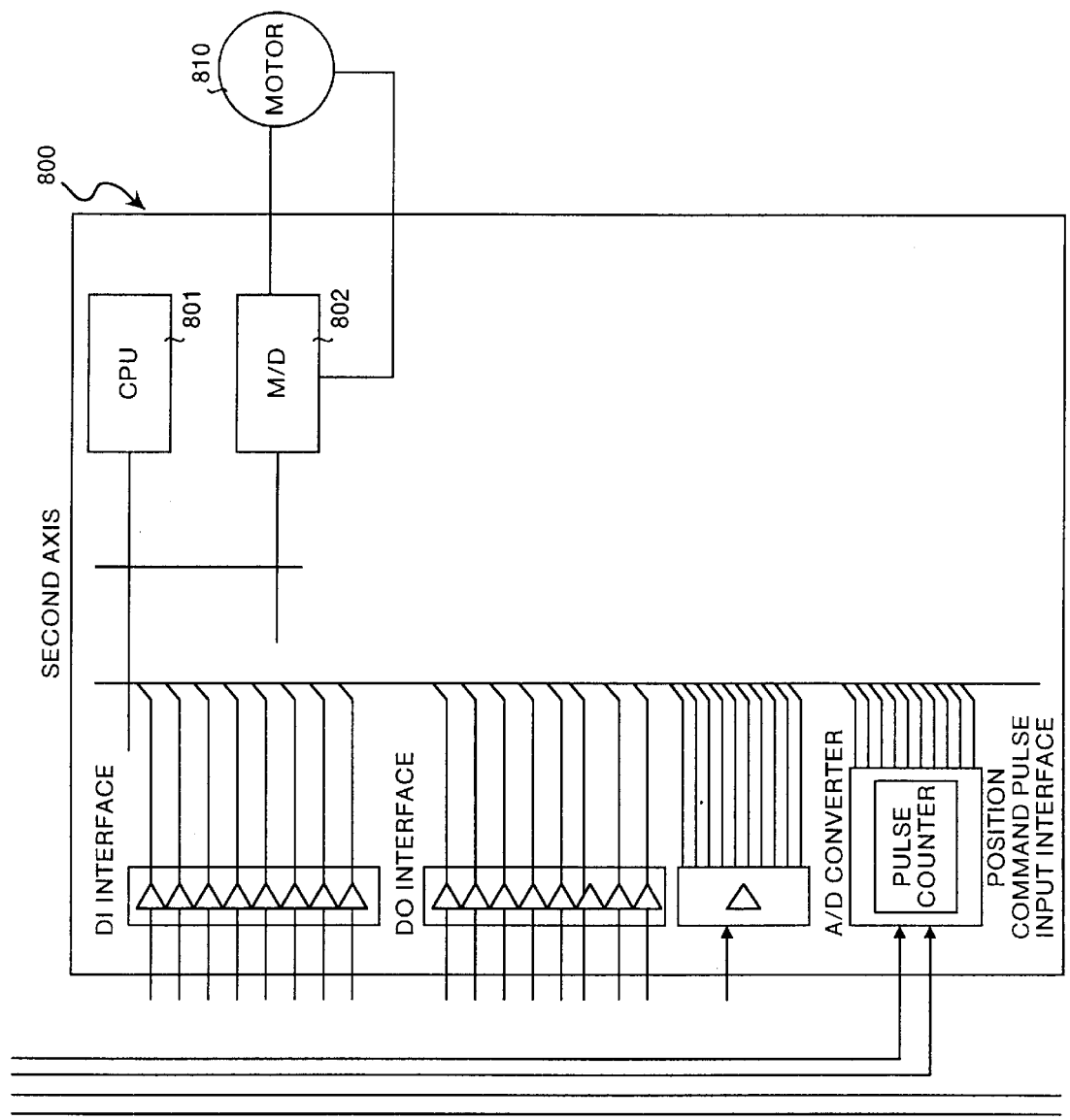
FIG. 24 CONTINUED (MIDDLE)

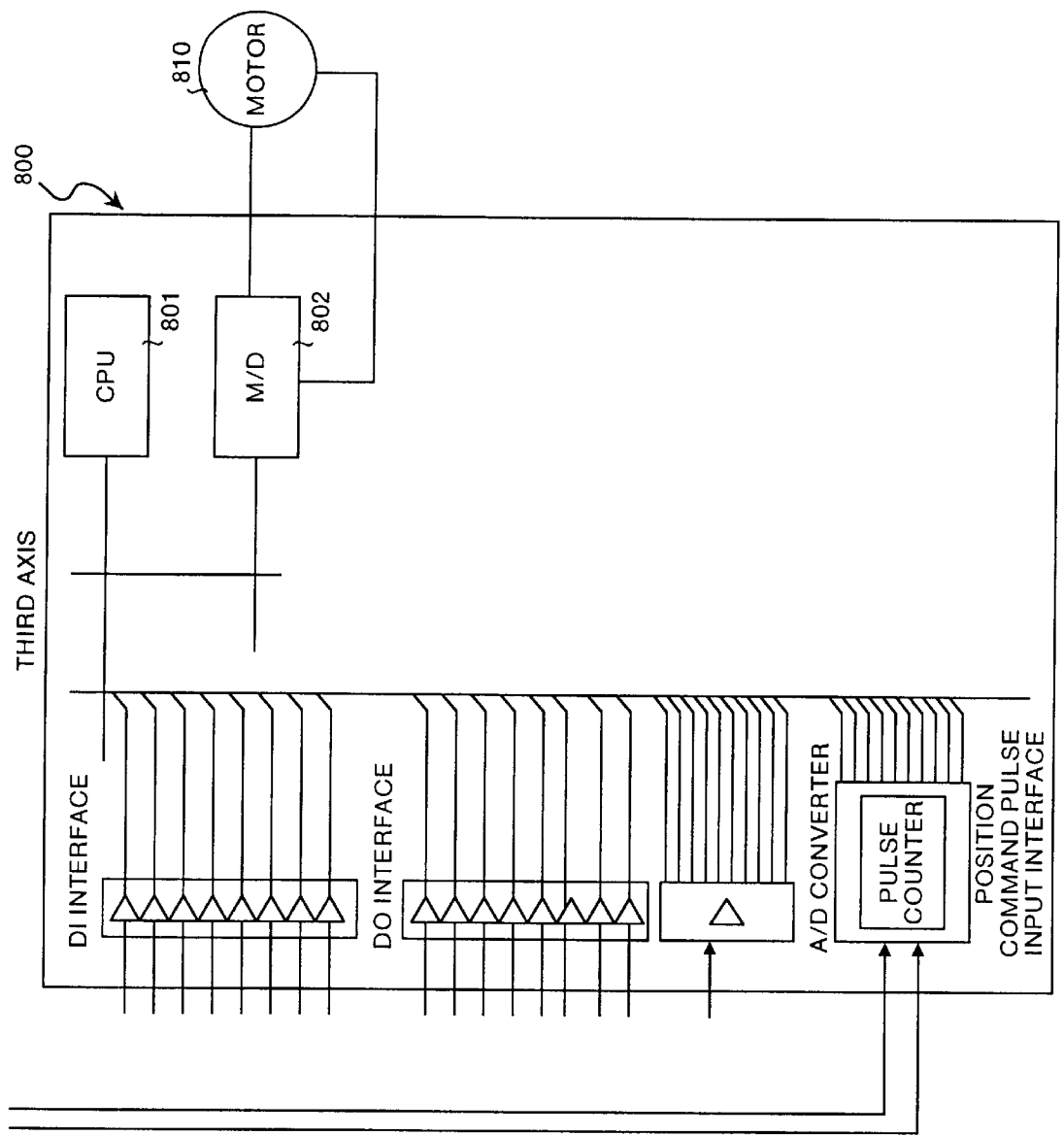
FIG. 24 CONTINUED (BOTTOM)

DRIVE CONTROL SYSTEM

TECHNICAL FIELD

The present invention relates to a drive control system. More particularly this invention relates to a drive control system for driving and controlling the plurality of servo motors or spindle motors in machine tools and industrial machines.

BACKGROUND ART

Drive control systems for driving and controlling the plurality of servo motors or spindle motors in machine tools and industrial machines are disclosed, for example, in Japanese Patent Application Laid-Open No. 3-245204 and Japanese Patent Application Laid-Open No. 4-290102.

FIG. 16 shows an outline of a prior art drive control system as disclosed in the above patent publications. This drive control system comprises one control unit 500, a plurality of servo amplifiers or spindle amplifiers (hereinafter called servo amplifiers) 510, and a plurality of remote input and output (remote IO) units 520, and the control unit (master) 500 is the host device, to which servo amplifiers (slaves) 510 with CPU and remote IO units 520 are connected with communication lines 600, 601 in two-way communication manner.

The control unit 500 includes the CPU (M/CPU) 501, a serial communication interface for servo amplifier 502, and a serial communication interface for IO unit 503. The serial communication interface for servo amplifier 502 and serial communication interface for IO unit 503 respectively incorporates transmission memories 502a, 503a, and reception memories 502b, 503b.

The servo amplifier 510 individually has a CPU (S/CPU) 511, a motor drive circuit (M/D) 512, and a serial interface 513 for communication with the control unit 500, and a servo motor 530 is connected thereto. The serial communication interface 513 is same as the serial communication interface such as serial communication interface 502, and includes a transmission memory 513a and a reception memory 513b.

The CPU 501 of the control unit 500 transmits command data or parameter to the servo amplifier 510 through the serial communication interface 502 by serial transmission, and the CPU 511 of the servo amplifier 510 receives the transmitted command data or parameter through the serial communication interface 513, and drives and controls the servo motor 530 by using the motor drive circuit 512.

The remote IO unit 520 includes a digital input interface (DI) 521, a digital output interface (DO) 522, and a serial communication interface 523 for communication with the control unit 500. The serial communication interface 523 is a same serial communication interface as the serial communication interface 503, and includes a transmission memory 523a and a reception memory 523b.

The remote IO unit 520 transmits data of the state of DI interface 521 to the control unit 500 through the serial communication interface 523, and the control unit 500 receives the transmitted digital output data through the serial communication interface 523, and produces digital output from the DO interface 522.

FIG. 17 shows a prior art of serial communication interface used in such drive control system. A transmission memory 700 and a reception memory 701 are composed of dual port RAMs, and are connected to an external address bus 702 and an external data bus 703 at one side. A CPU 501 (511) writes transmission data from an external bus interface 704 into the transmission memory 700.

Transmission function in the serial communication interface begins by starting up a transmission-reception controller 706 by a transmission start signal from a synchronous clock generator 705. The transmission-reception controller 706 writes the transmission address set value and transmission data length set value being set in a transmission-reception control register setting unit 707 into a transmission address counter 708, and transmits the sequentially counted-up transmission address to an address decoder 709, so that the data in the transmission memory 700 is sent into a transmission register 710 to be transmitted. In a redundancy code generator 711, from similar transmission data, a redundancy code is generated, and after sending out the final transmission data, the redundancy code is sent into the transmission register 710 to be transmitted.

Reception function begins when the data received in a reception register 712 is transferred to a start flag detector 713, and the transmission-reception controller 706 is started by a start signal generated by detection of start flag in reception data. The transmission-reception controller 706 writes the reception address set value in the transmission-reception control register setting unit 707 into a reception address counter 714, and counts up at every data reception. By transmitting the counted-up reception address to the address decoder 709, reception data is written into the reception memory 701.

A communication failure detector 715 compares the redundancy code added to the end of the reception data and the redundancy code generated from the reception data, and detects if the communication is finished normally. The result of detection is written in the communication abnormality status in the transmission-reception control register setting unit 707. The CPU 501 (511) reads this communication abnormality status, and uses for control if normal, and discards the reception data if abnormal.

FIG. 18 shows communication timing in the conventional drive control system, and FIG. 19 shows outline of communication data. In FIG. 19, (a) shows communication data to be transmitted from the control unit 500 to the servo amplifier 510, (b) shows communication data to be transmitted from the servo amplifier 510 to the control unit 500, (c) shows communication data to be transmitted from the control unit 500 to the remote IO unit 520, and (d) shows communication data to be transmitted from the remote IO unit 520 to the control unit 500.

The control unit 500 transmits data simultaneously to the servo amplifier 510 and remote IO unit 520 in synchronism with the clock T1. As shown in FIG. 19(a) and FIG. 19(c), a synchronous code is included in the data transmitted from the control unit 500 to the servo amplifier 510, and in the data transmitted to the remote IO unit 520, and the servo amplifier 510 and remote IO unit 520 detect the synchronous code from the reception data, and generate a clock synchronized with clock T1 in the control unit 500.

The servo amplifier 510 divides this clock, and transmits the data shown in FIG. 19(b) to the control unit 500 at the predetermined timing indicated by codes S1 to S5 in FIG. 18. The remote IO unit 520 also transmits the data shown in FIG. 19(d) to the control unit 500 at the predetermined timing indicated by codes R1 to R7 in FIG. 18.

The command data transmitted from the control unit 500 to the servo amplifier 510 is entirely transmitted to the servo amplifier 510, and the feedback data taken in by the servo amplifier 510 is individually transferred from each servo amplifier 510 to the control unit 500, and is managed totally in the control unit 500. Similarly, the input data of the remote IO unit 520 is transferred to the control unit 500, and is managed totally in the control unit 500.

Data TS1, TS2 to TSn, RS1, RS2 to RSn in the transmission memory 502a and reception memory 502b for servo amplifiers in the control unit 500 shown in FIG. 16 show the sharing relation of transmission and reception data, and the control unit 500 totally manages the transmission and reception data of all servo amplifiers 510. By contrast, the data managed in each servo amplifier 510 is the own individual data, and it is known the data managed in each servo amplifier 510 is different. Data DO1, DO2 to DOn, DI1, DI2 to DIn in the transmission memory 503a and reception memory 503b for remote IO unit of the control unit 500 show the sharing relation of transmission and reception data, and the control unit 500 totally manages the transmission and reception data of all remote IO units 520, but the transmission and reception data managed in each remote IO unit 520 is also different in each unit.

In this conventional drive control system, the transmission and reception data of the servo amplifiers 510 and remote IO units 520 are totally managed in the control unit 500, but the data managed in each servo amplifier 510 is the own individual data, and mutual feedback state is not known among servo amplifiers 510.

Besides, since the communication system is separated between the remote IO units 520 and servo amplifiers 510, the state of the remote IO units 520 cannot be read directly from the servo amplifiers 510, or feedback data cannot be sent out.

In the conventional drive control system, meanwhile, since the transmission timing is managed in time division as shown in FIG. 18, if the quantity of data to be transferred is small, an idle time occurs in the transmission route, and the communication efficiency is poor, or the quantity of data exceeding the assigned transmission time cannot be transferred. Still more, the transmission timing is limited by the number of time divisions due to the number of axes to be connected, and since the transmission timing is divided in time, the transmission timing cannot be changed, and a communication line must be newly extended in order to add the servo amplifiers by more than the number of predetermined time divisions.

In the drive control system, the communication system for remote IO unit is required to respond to the input and output function at high speed, and therefore, in the prior art, it was necessary to transmit and receive data for the total number of input and output points of all remote IO units connected in every period regardless of the transmission in a constant period and changes of input and output states. As a result, data is exchanged more than necessary, the total number of remote IO units is limited to a smaller number, and the communication period (communication period T1 in FIG. 18) becomes long, thereby deteriorating the response.

In the transmission data, high speed data necessary for motor control and low speed data such as parameter coexist, and the quantity of communication data increases, and the communication time per data is extended, and hence the number of time divisions is limited.

Further, to read the state between servo amplifiers 510, it is required to transmit data twice through the control unit, and delay time occurs, and the performance of the entire drive control system is lowered. Moreover, the CPU 501 of the control unit 500 requires processing of transfer program, and the load of the CPU 501 increases.

As shown in FIG. 20(a), when the servo amplifier 510 requests output to a certain remote IO unit 520 through the communication system, it requires a series of processes including preparation of request data of DO output in the servo amplifier, transmission of request data, reception processing and preparation of request data of DO output in the master (control unit), transmission of request data of DO output, and reception processing in remote IO unit, and delay time of about 3 times of communication period T1 occurs, and the response is poor.

Similarly, receiving the input of the remote IO unit 520, to start the motor actually by the servo amplifier 510, as shown in FIG. 20(b), it requires a series of processes including transmission of DI data in the IO unit 520, reception processing and start signal processing in the master (control unit), data transmission, and start signal reception in the servo amplifier 510, the IO unit 520 input DI (start signal) and delay time of about 4 times of communication period T1 occurs, and the response is poor.

Other prior art of drive control system includes a drive control system for multiple axes for sharing part or all of input data by a plurality of servo amplifiers without using host control unit, and issuing output signals from each servo amplifier.

This drive control system is explained by referring to FIG. 21 to FIG. 24. FIG. 22 to FIG. 24 show one drive control system, which is divided into three drawings in order to avoid complicated expression of wiring.

There are three servo amplifiers 800 for first axis, second axis, and third axis, and they are composed identically, each comprising a CPU 801, a motor drive circuit 802, a digital input interface 803, a digital output interface 804, an analog input interface (A/D) converter 805 for speed command, and a pulse train input interface 806 for position command, and a servo motor 810 with a rotary encoder is connected to each servo amplifier 800.

As shown in FIG. 21(a), (b), (c), input signals of functions 1 to 8 are assigned in the digital input interface 803 of the servo amplifiers 800 for all of first to third axes, output signals of functions 11 to 18 are assigned in the digital output interface 804 for first axis, output signals of functions 21 to 24 for second axis, and output data of functions 31 and 32 for third axis.

When the input and output signals are assigned in the input and output interfaces of servo amplifiers 800 in this manner, the wiring of the input and output signals becomes as shown in FIG. 22. As shown in FIG. 22, input signals of functions 1 to 8 are branched in three terminals in a relay terminal block 820, and wired to servo amplifiers 800 for first to third axes, and many wires are needed. Output signals for functions 11 to 18, functions 21 to 24, and functions 31 and 32 are also wired from the servo amplifiers 800 to the relay terminal block 820.

In the servo amplifier 800 for first axis, since output signals for functions 11 to 18 are used, there is no vacancy in the digital output interface 804, but in the servo amplifiers 800 for second axis and third axis, there is a vacancy in the digital output interfaces 804. However, as the output function, if desired to add an output signal for function 19 to the servo amplifier 800 for first axis, there is no extra room for addition. Similarly, as input function, input signal for function 9 cannot be added.

Thus, in the conventional drive control system, multiple wires are connected to the servo amplifiers 800, and the wiring include many connections, and wiring and maintenance works are complicated. It is also difficult to add input and output functions, and input and output interfaces having extra input and output points may be prepared in the servo amplifiers 800.

As shown in FIG. 23, in the wiring of analog speed command signals, each one of the servo amplifiers 800 for first axis to third axis requires wiring of analog speed command signals, and a speed command unit 830 requires analog output interfaces 831 for several axes, and similar wiring is required if operating the servo amplifier 800 of each axis by the same analog speed command. In the wiring shown in FIG. 23, if the first axis to third axis are synchronously controlled by the same command, in case synchronous control fails due to some trouble, fluctuations cannot be controlled in each axis, and synchronism may deviated.

As shown in FIG. 24, in the wiring of pulse train position command signals, each one of the servo amplifiers 800 for first axis to third axis requires wiring of pulse strain command signals, and a position command unit 840 requires pulse generators 841 for several axes, and similar wiring is required if operating by the same position command.

The invention is devised to solve these problems, and it is hence an object thereof to present a drive control system capable of driving and controlling with an excellent response without increasing the load of CPU of the host control unit, and moreover excellent in transmission efficiency, and capable of decreasing the communication data quantity of high speed synchronous communication, determining the data length freely regardless of the divided time, and curtailing the number of wiring connections, and further flexible in addition of input and output functions, and capable of realizing advanced synchronous operation and arbitrary synchronous operation without causing deviation in synchronism.

DISCLOSURE OF THE INVENTION

To achieve the object, the invention presents a drive control system having constituent devices such as control unit, servo amplifier, spindle amplifier, and input and output unit, with these constituent devices connected so as to communicate with each other, in which a memory is provided in each constituent device, the constituent devices are synchronized with each other, communication unit is provided for transferring memory data between arbitrary constituent devices, and the memory is shared between arbitrary constituent devices.

Therefore, since the memory can be shared in the drive control system, batch management of memories of control unit is not necessary, and the load of the control unit CPU is not increased, and time delay does not occur, the feedback state is mutually known among servo amplifiers, and the output request can be directly sent from the servo amplifier to the input and output unit, and the input state can be read immediately.

In the drive control system of the invention, the communication data is composed of a synchronous packet used for generating a clock transmitted in a specific period so that all constituent devices are synchronized therewith, an in-channel communication packet used for sharing the memory within a same group, an allout communication packet used for sharing the memory by all constituent devices, and a designated destination communication packet for communicating by designating the destination of transmission of parameter, etc.

Therefore, the idle time of transmission route is shortened and the transmission efficiency is enhanced, and the data requiring high speed synchronous communication is changed into a synchronous packet and an in-channel communication packet, while the low speed data is changed to a designated destination transmission, and hence the communication data quantity of high speed synchronous communication is decreased, and the number of axes to be connected is increased. At the same time, the data length can be determined arbitrarily regardless of the divided time.

In the drive control system of the invention, further, the control unit and servo amplifier has a communication memory in each channel, a transmitter transmits the in-channel communication packet including channel designated value, address, transmission data length and data to all constituent devices, and a receiver judges approval or rejection of reception by collating the channel designated value included in the communication packet and the channel set value set in the parameter in each servo amplifier, and writes the data of the communication packet of the collated channel in the communication memory in the memory.

Therefore, the communication in the channel is made in the same procedure as the allout communication, and the size of the memory can be set in an appropriate capacity in each channel.

Also in the drive control system of the invention, the control unit, servo amplifier and input and output unit have allout communication memories, a transmitter transmits an allout communication packet including the sender number, address, transmission data length, variable data length, previous data, and rewrite data to all constituent devices, and a receiver compares the received previous data and the data in the present allout communication memory, rewrites the data in the allout communication memory if matched, and stops writing into the allout communication memory if not matched.

Therefore, since the data can be transmitted by designating the address and data length, the memory common to the constituent devices of the drive control system can be managed, and instead of communicating data of all input points in all input and output units in every specific period as in the prior art, only the changed input and output data are communicated, so that the efficiency of transmission route is enhanced.

Also in the drive control system of the invention, a transmitter adds a redundancy code to the communication packet in every quantity of data suited to the size of the buffer of transmission and reception, and a receiver detects communication failure according to the redundancy code in every quantity of data suited to the size of the buffer of transmission and reception, and stops writing into the memory if abnormal.

Therefore, by adding the plurality of redundancy codes in the communication data, data exceeding the reception buffer can be received, and if communication failure occurs in the received data, breakdown of shared memory can be prevented.

Also in the drive control system of the invention, the waiting time of each communication following the synchronous packet is shortened depending on the priority order, and when a constituent device high in priority order starts transmission within waiting time, reception is started, and after completion of reception if other constituent device does not start transmission after lapse of a specified waiting time, transmission is started.

Therefore, the idle time of transmission route is shortened and the transmission efficiency is enhanced, and the data requiring high speed synchronous communication is changed into a synchronous packet and an in-channel communication packet, while the low speed data is changed to a designated destination transmission, and hence the communication data quantity of high speed synchronous communication is decreased, and the number of axes to be connected is increased.

Also in the drive control system of the invention, the memory storing the input data, output data, position command, and speed command is shared by the constituent devices.

Therefore, it is not necessary to connect wiring of signal lines of input data, output data, position command, and speed command repeatedly in every constituent device.

Also in the drive control system of the invention, the present position data of each axis is shared by the synchronous axis, and it is controlled to prevent deviation of synchronism by referring to the position data.

Therefore, advanced synchronous operation is realized by preventing deviation of synchronism relating to the position control.

Also in the drive control system of the invention, the present speed data of each axis is shared by the synchronous axis, and it is controlled to prevent deviation of synchronism by referring to the speed data.

Therefore, advanced synchronous operation is realized by preventing deviation of synchronism relating to the speed control.

Also in the drive control system of the invention, each servo amplifier has a regenerative resistor selectively set in conductive state by a regenerative transistor, the memory storing the regenerative load factor data of each axis, regenerative transistor state data, and bus voltage data is shared by each servo amplifier, and it is controlled to turn on the regenerative transistor of the servo amplifier smallest in the regenerative load factor data known from these data.

Therefore, the regenerative energy is consumed by the regenerative resistor of the servo amplifier smallest in the regenerative load factor data, so that concentration of regenerative load can be prevented.

BRIEF DESCRIPTION OF THE DRAWINGS

FIG. 1 is a block diagram showing an outline of a first embodiment of drive control system of the invention;

FIGS. 3(*a*) to (*d*) are explanatory diagrams showing communication packets used in the drive control system of the invention;

FIG. 4 is a timing chart showing communication timing in the drive control system of the invention;

FIG. 5 is an explanatory diagram showing conceptually the communication operation in the drive control system of the invention;

FIG. 6 is a block diagram showing an internal structure of serial communication interface used in the drive control system of the invention;

FIG. 7 is an explanatory diagram showing the operation of the drive control system of the invention;

FIG. 8 is a block diagram showing an outline of a second embodiment of drive control system of the invention;

FIG. 9 is an explanatory diagram showing the flow of data of input signal in the drive control system of the invention;

FIG. 10 is an explanatory diagram showing the flow of data of output signal in the drive control system of the invention;

FIG. 11 is an explanatory diagram showing the flow of data of analog speed command in the drive control system of the invention;

FIG. 12 is an explanatory diagram showing the flow of data of speed command in the drive control system of the invention;

FIGS. 13(*a*) and (*b*) are explanatory diagrams showing address map of shared memory and operation example of control unit of each axis in the drive control system of the invention;

FIG. 14 is a block diagram showing outline of drive control system of the invention;

FIG. 15 is a block diagram showing an outline of a third embodiment of drive control system of the invention;

FIGS. 20(*a*) and (*b*) are timing charts showing reception data of output data and motor start processing in the conventional drive control system;

FIG. 21 is a block diagram showing other prior art of drive control system; and FIG. 22 to FIG. 24 are block diagrams showing wiring examples of signal lines in conventional drive control system.

BEST MODE FOR CARRYING OUT THE INVENTION

Figure 2:
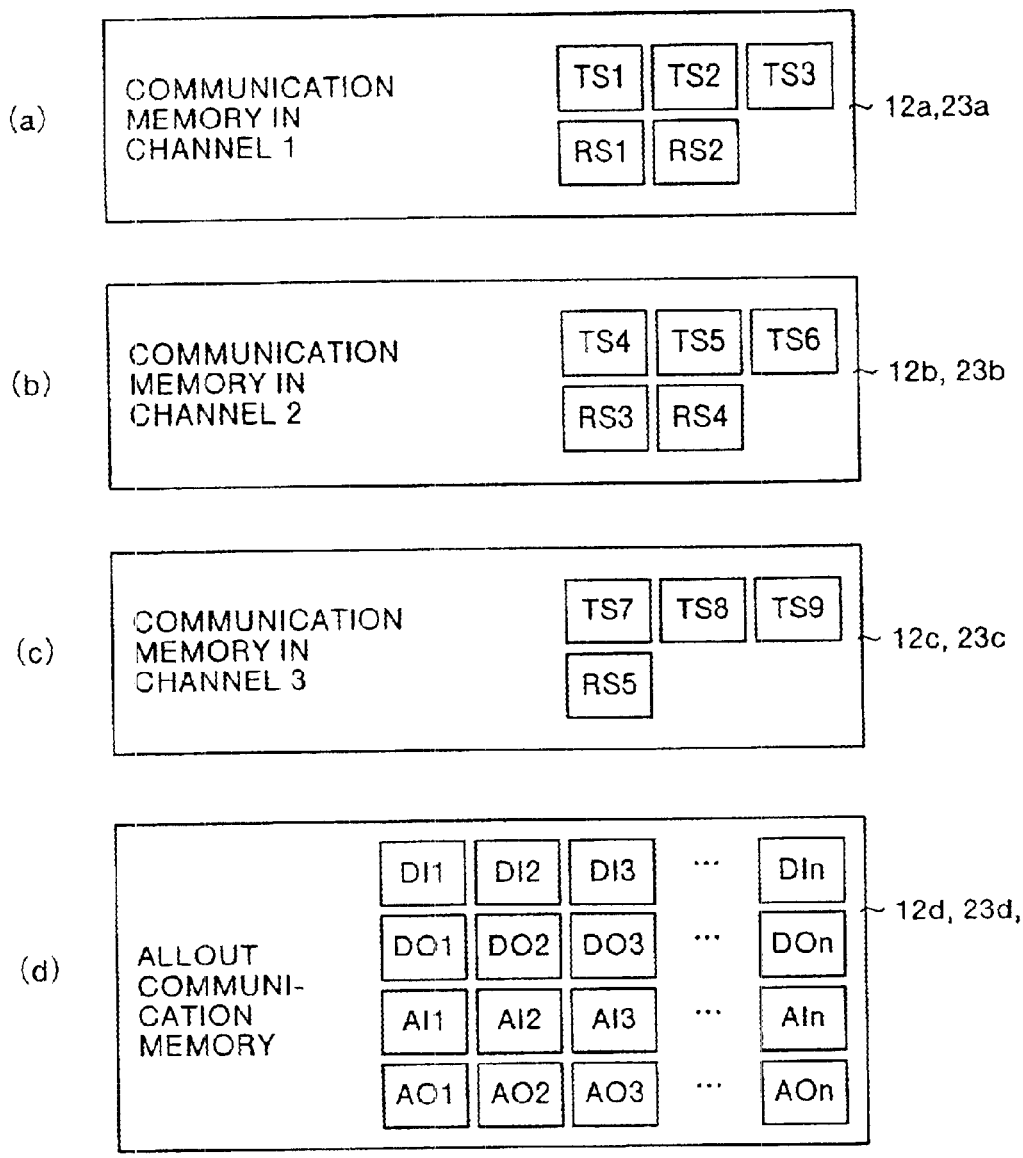
FIG. 2 is an explanatory diagram showing the content of shared memory in the drive control system of the invention.
Figure 16:
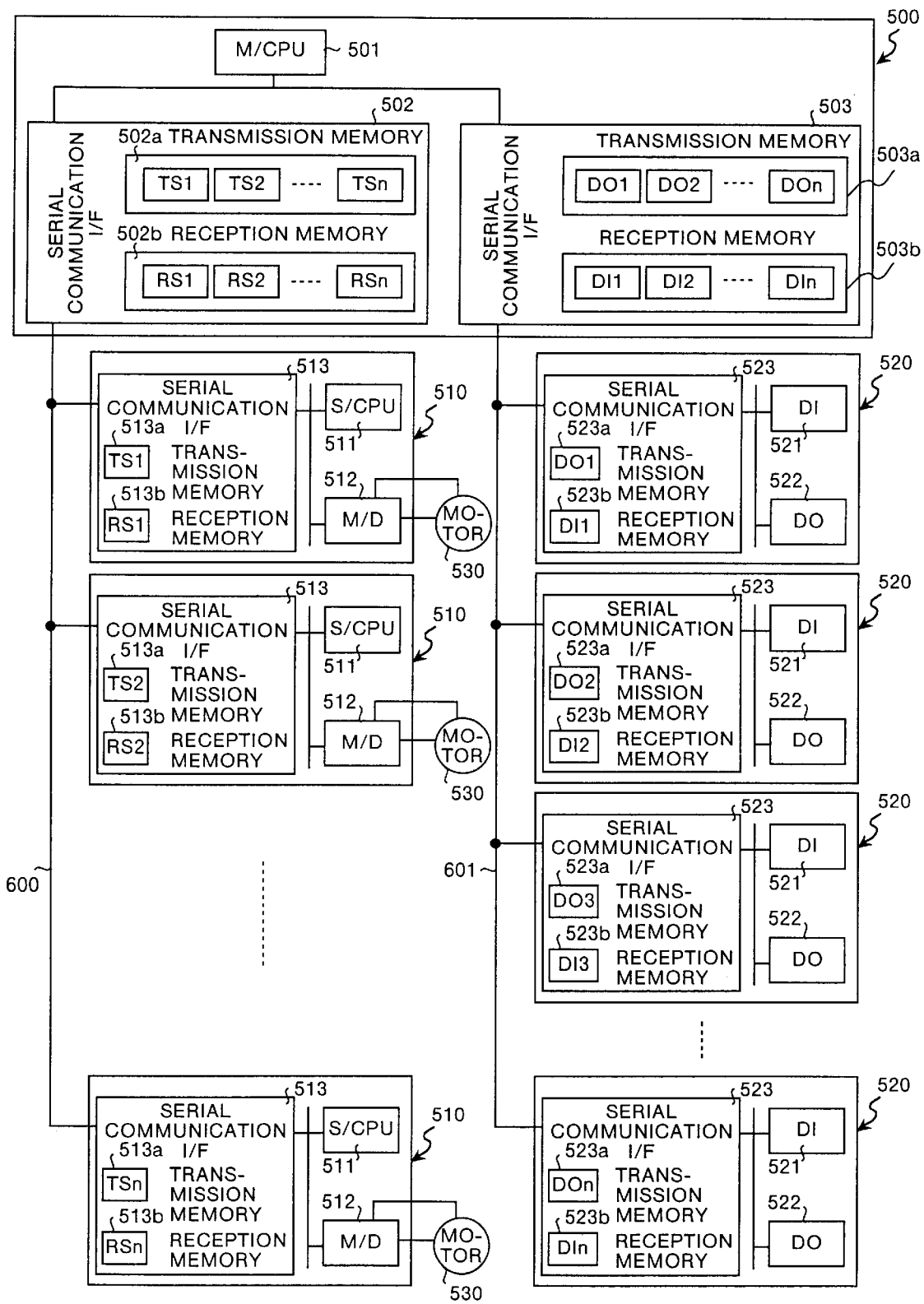
FIG. 16 is a block diagram showing a prior art of drive control system.
Figure 17:
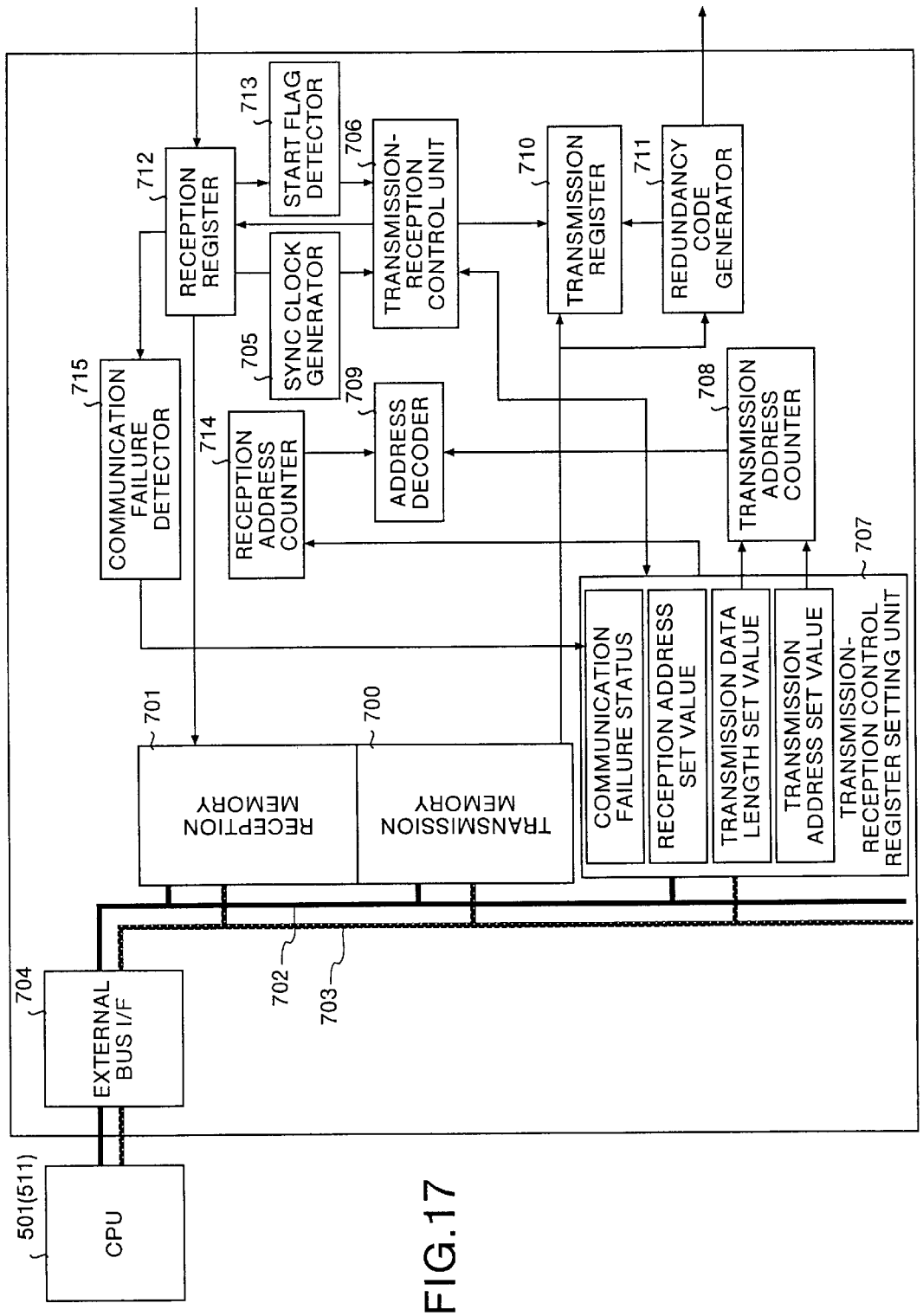
FIG. 17 is a block diagram showing an internal structure of serial communication interface in the conventional drive control system.
Figure 18:
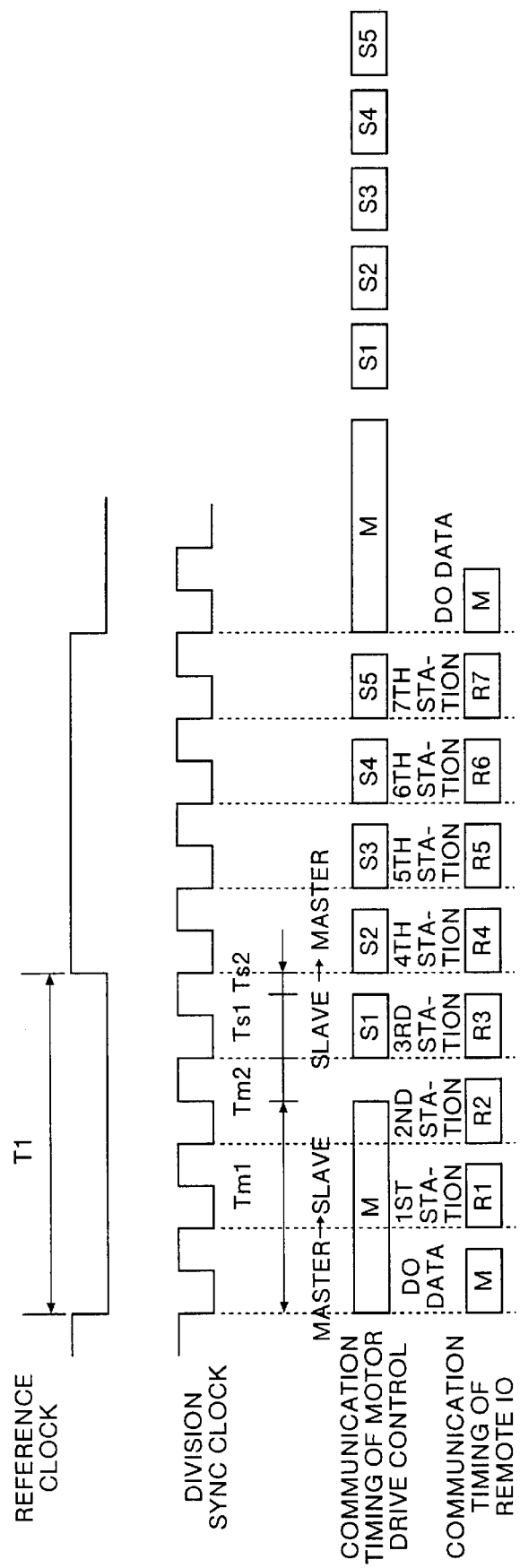
FIG. 18 is a timing chart showing communication timing in the conventional drive control system.
Figure 19:
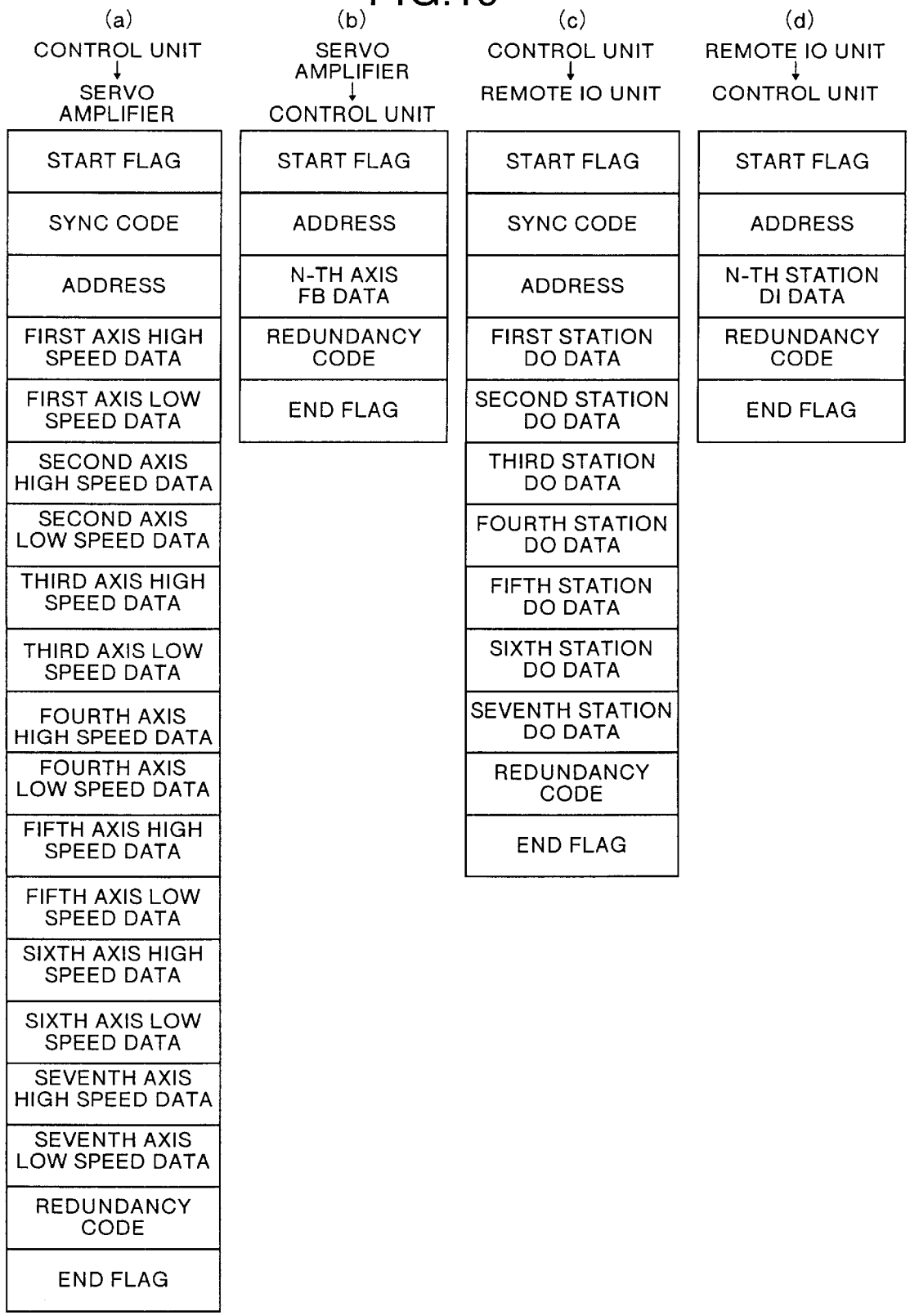
FIG. 19 is a format diagram of communication data in the conventional drive control system.

The invention is more specifically described below while referring to the accompanying drawings.

FIG. 1 shows an outline of a first embodiment of drive control system of the invention. This drive control system comprises one control unit (master) 10, a plurality of servo amplifiers (slaves) 20 with CPU, and a plurality of remote input and output units 30, and all these devices are connected by communication wires 50 to communicate in both ways and exist on a same communication system.

The control unit 10 includes a CPU (M/CPU) 11, and one serial communication interface 12 shared between the servo amplifiers 20 and remote input and output units 30, and the serial communication interface 12 incorporates a communication memory 12*a* in channel 1, a communication memory 12*b* in channel 2, a communication memory 12*c* in channel 3, an allout communication memory 12*d*, and a designated number communication memory 12*e*.

Each servo amplifier 20 includes a CPU (S/CPU) 21, a motor drive circuit (M/D) 22, and a serial communication interface 23 for communication with the control unit 10, and a servo motor 40 is connected thereto. The servo motor 40 is provided with a rotary encoder, and returns a feedback signal to the motor drive circuit 22.

In this embodiment, nine servo amplifiers 20 are divided in to three groups of three amplifiers each, and the groups are assigned with channels 1 to 3.

The serial communication interface 23 of the servo amplifiers 20 belonging to channel 1 incorporates a communication memory 23*a* in channel 1, an allout communication memory 23*d*, and a designated number communication memory 23e. The serial communication interface 23 of the servo amplifiers 20 belonging to channel 2 incorporates a communication memory 23b in channel 2, an allout communication memory 23d, and a designated number communication memory 23e. The serial communication interface 23 of the servo amplifiers 20 belonging to channel 3 incorporates a communication memory 23c in channel 3, an allout communication memory 23d, and a designated number communication memory 23e.

Each remote input and output unit 30 includes a digital input interface (DI) 31, a digital output interface (DO) 32, an analog input interface (AI) 33, an analog output interface (AO) 34, and a serial communication interface 35 for communication with the control unit 10. The serial communication interface 35 incorporates an allout communication memory 35a.

Communication memories in channels and allout communication memories incorporated in serial communication interfaces 12, 23, 35 of the devices are shared memories as seen from the CPU 11 and 21. As shown in FIGS. 2(a) to (c), the contents of communication memories 12a, 23a in channel 1 are composed of TS1, TS2, TS3, RS1, and RS2, and the data being read out by the CPU 11 of the control unit 10 from the communication memory 12a in channel 1 and the data being read out by the CPU 21 of the servo amplifier 20 from the communication memory 23a in channel 1 are identical, the contents of communication memories 12b, 23b in channel 2 are composed of TS4, TS5, TS6, RS3, and RS4, and the data being read out by the CPU 11 of the control unit 10 from the communication memory 12b in channel 2 and the data being read out by the CPU 21 of the servo amplifier 20 from the communication memory 23b in channel 2 are identical, and the contents of communication memories 12c, 23c in channel 3 are composed of TS7, TS8, TS9, and RS5, and the data being read out by the CPU 11 of the control unit 10 from the communication memory 12c in channel 3 and the data being read out by the CPU 21 of the servo amplifier 20 from the communication memory 23c in channel 3 are identical. Similarly, the contents of allout communication memories 12d, 23d, 35a of the control unit 10, servo amplifier 20, and remote input and output unit 30 are mutually identical data among all constituent devices of the control unit 10, servo amplifier 20, and remote input and output unit 30.

FIGS. 3(a) to (d) show types of communication packets used in the drive control system of the invention, and FIG. 4 shows the communication timing. There are four types of communication packets as shown in FIGS. 3(a) to (d), that is, synchronous packet, in-channel communication packet, allout communication packet, and designated destination communication (designated number communication) packet, and each packet has a mode designating unit and an sender number.

The synchronous packet shown in FIG. 3(a) is transmitted from the control unit 10 to all constituent devices in batch in synchronism with the reference clock shown in FIG. 4 as shown in FIG. 5(a). The synchronous packet includes a synchronous code, and receiving it, the serial communication interfaces 23 and 35 generate a synchronous clock on the basis thereof. The communication by the synchronous packet transmits, aside from the synchronous code, also command control data to each constituent device (position command, speed command, torque command, on/off command) at the same time.

FIG. 3(b) shows an example of in-channel communication packet, and the in-channel communication packet is composed of channel number, beginning address in channel, data length, data, and redundancy code, and the communication in channel is executed as shown in FIG. 5(b), in which data is mutually transferred between the servo amplifiers 20 belonging to channels 1 to 3, and the control unit 10, and shared memories are formed in the channel. The data to be transmitted by the communication in channel includes feedback data of each axis. In the conceptual diagram of communication shown in FIG. 5(b), the sender is shown to designate the destination, but actually the communication packet is transmitted to all constituent devices, and it is processed so as not to receive the reception data at the receiving side by the mode data in the communication packet and the channel.

FIG. 3(c) shows an example of allout transmission packet, and the allout transmission packet is composed of beginning address of address common to all constituent devices, data length, data length to be changed, previous data before change, rewrite data, and redundancy code, and as shown in FIG. 5(c), the allout communication is transmitted from the sender to all constituent devices, and receiving this communication mode, each constituent device rewrites the designated address by the designated data length. The data to be transmitted by the allout communication includes I/O data and others.

FIG. 3(d) shows an example of designated destination communication packet, and the designated destination communication packet is composed of destination number, beginning address of destination, data length, data, and redundancy code, and as shown in FIG. 5(d), the designated destination communication is done from the sender to the constituent device at the destination so as to transfer data between two arbitrary constituent devices. The data is composed of communication packet comprising conventional low speed data for the portion of a specific period, and parameter, program and other data are transmitted.

FIG. 6 shows an internal structure of serial communication interface 12 provided in the control unit 10. The communication memory 12a in channel 1, communication memory 12b in channel 2, communication memory 12c in channel 3, allout communication memory 12d, and designated number communication memory 12e incorporated in the serial communication interface 12 are composed of dual port RAMs, and are connected to an external address bus 61 and an external data bus 62 at one side. The CPU 11 writes data from an external bus interface 63 into the memory.

The serial communication interface 12 comprises a transmission-reception controller 64, a reception register 65, a reception buffer 66, a mode detector 67 for detecting the mode from the mode data in the communication packet, a channel detector 68 for detecting the channel designated value in the communication packet, a beginning address detector 69, a data length detection data separator 70, a communication failure detector 71 for detecting communication abnormality from the redundancy code added to the communication packet, a synchronous clock generator 72, a channel selector 73 for judging whether or not to write reception data into the memory by collating the channel designated value and the received channel designated value, and prohibiting writing of data of other than designated channel, a reception address counter 74, address decoders 75a, 75b, 75c for each channel, an allout communication address decoder 76, a previous data comparator 77, and reception control register setting unit 78 for storing the channel designated value set by parameter. The previous data comparator 77 compares the received previous data and the present data in the allout communication memory 12d, and the data in the allout communication memory 12*d* is written if matched, and writing into the allout communication memory 12*d* is prohibited if not matched.

The serial communication interface 12 further comprises a transmission control register setting unit 79, a transmission address counter 80, a transmission packet generator 81, a transmission buffer 82, a transmission waiting timer 83, and a transmission register 84. The reception packet generator 81 includes a mode provider 81*a*, a channel provider 81*b*, an address provider 81*c*, a data length provider 81*d*, and a redundancy code provider 81*e*.

The transmission packet generator 81 can add the redundancy code in every data quantity suited to the size of the buffer of transmission and reception, and at the reception side, in the communication failure detector 71, communication failure is detected by the redundancy code in every data quantity suited to the size of the buffer of transmission and reception, and if abnormal, writing into the memory is stopped, and if the communication packet quantity is less than the buffer size, communication failure is detected depending on the data length in the communication packet, and if abnormal, writing into the memory can be stopped.

The transmission control register setting unit 79 sets the transmission waiting time individually in each constituent device, shortens the waiting time of the packet following the synchronous packet according to the priority order, and starts reception when a constituent device high in priority order starts transmission within the waiting time, or starts transmission when other constituent device does not start transmission after a specified waiting time.

The serial communication interface 23 of the servo amplifier 20 is composed almost same as the serial communication interface 12 of the control unit 10, except that it has as many in-channel communication memories as the number of channels connected and also possesses a synchronous clock generator 72.

In such serial communication interfaces 12, 23, the reception data is put into the reception buffer 66 through the reception register 65. The mode detector 67 selects the type of communication packet on the basis of the beginning data of the reception buffer 66.

Mode 0 means a synchronous packet, and the synchronous clock generator 72 generates a clock synchronized with the synchronous code.

The channel detector 68 detects the channel from the reception data, and depending on the channel set value stored in the reception control register setting unit 78, the channel selector 73 judges whether or not to write the received channel into the memory, and starts up the pertinent channel address decoders 75*a* to 75*c* when receiving.

The beginning address detector 69 detects the beginning address from the reception data, sets in the reception address counter 74, counts up sequentially by the portion of the data length detected in the data length detection data separator 70, and stores the data separated in the data length detection data separator 70 into the in-channel communication memories 12*a* to 12*c* designated in the channel address decoders 75*a* to 75*c*.

The communication failure detector 71 compares the redundancy code in the reception data and the redundancy code generated from the reception data, and when matched, it is permitted to write the reception data in the in-channel communication memories 12*a* to 12*c*, but if the redundancy codes are not matched, writing is prohibited to prevent breakdown of the in-channel communication memories.

When mode 1 is detected by the mode detector 67, the reception data is an in-channel communication packet, and the reception operation is same as in mode 0 except that there is no effect on the synchronous clock generator 72.

When mode 2 is detected by the mode detector 67, the reception data is an allout communication packet, and the detected value of the beginning address detector 69 is written into the allout communication address decoder 76, and the previously received data the data stored at the address designated by the allout communication address decoder 76 are compared in the previous data comparator 77, and the received rewrite data is written into the allout communication memory 12*d* if matched, and received data is discarded if not matched.

When mode 3 is detected by the mode detector 39, the reception data is a designated destination communication packet, and if the destination is the receiving station, the reception data is stored in the designated number communication memory 12*e*.

The transmission function is explained. The transmission function is controlled by the set value set in the transmission control register setting unit 79, and when mode 0 is set, in synchronism with the synchronous clock, channel address decoders 75*a* to 75*c* of the channels designated by the channel set value are started, and by the instruction of the transmission address counter 80 storing the address set value, the values of the in-channel communication memories 12*a* to 12*c* are read out, and after adding the mode, channel, address, data length, and redundancy code by the transmission packet generator 81, the transmission packets are sent into the transmission buffer 82, and are sequentially outputted from the transmission register 84.

In the case of transmission of modes 1, 2, 3, after completion of reception of mode 0, waiting for the transmission waiting time set value set in the transmission control register setting unit 79 by the transmission waiting timer 83, if there is no reception data within the waiting time, transmission control of the transmission-reception controller 64 is started, and the data of the transmission buffer 82 is outputted from the transmission register 84. Generation of transmission data is same as in the case of mode 0.

FIG. 7 is a diagram explaining the operation of the reception function, in which channel 1 is set, for example, in the reception control register setting unit 78.

First, receiving the in-channel communication packet, channel designation 1 is read from the reception data. The channel designated value herein coincides with the channel set value of the reception control register setting unit 78, and after confirming there is no communication failure, writing into the memory is permitted, and specified data length is written into the designated address. Reception data includes channel designation 2, but it is different from the channel set value of the reception control register setting unit 78, and hence its writing is prohibited.

Successively, when the allout communication packet 1 and allout communication packet 2 are consecutive, and rewrite request occurs at a same address, the operation is as follows. The data is read from the designated shared memory address of the allout communication packet 1, and is compared with the previously received data. When matched, rewrite data is stored in the designated address, and processing is completed.

Next, receiving the allout communication packet 2, when the same address is designated, since the data has been already written, the result of comparison is not matched. Accordingly, writing is not permitted, and received data is discarded. As a result, the data in the previously received allout communication packet 1 is protected.

In the foregoing embodiment, there is only one reception control register setting unit 78, but by using the plurality of reception control register setting units 78, the number of channels that can be received simultaneously can be increased. Similarly, by using the plurality of transmission control register setting units 79, the plurality of modes can be transmitted sequentially, or by setting a plurality of channels, addresses or data length in the transmission control register setting unit 79, the plurality of data regions of the plurality of channels can be transmitted simultaneously to the same transmission packet.

FIG. 8 shows a second embodiment of drive control system of the invention. This drive control system has three servo amplifiers 100 for first axis, second axis, and third axis connected at the same level so as to communicate in two ways by communication wires 200, and exist on a same communication system.

Three servo amplifiers 100 for first axis, second axis, and third axis are identical in structure, each comprising a CPU 101, a motor drive circuit 102, a digital input interface 103, a digital output interface 104, an analog input interface (A/D converter) for speed command 105, a pulse train input interface for position command 106, and a serial communication interface 107, and a servo motor 150 with rotary encoder is connected to each servo amplifier 100.

The serial communication interface 107 of the servo amplifier 100 for each axis incorporates, as shared memories, an in-channel communication memory 107a, an allout communication memory 107b, and a designated number communication memory 107c. The content of the in-channel communication memory 107a in the servo amplifier 100 for each axis is composed of input data, output data, and pulse train commands for speed command and position command of each axis belonging to same channel.

The CPU 101 of the servo amplifier 100 for each axis writes the input data and pulse train commands for speed command and position command entered in the digital input interface 103, analog input interface for speed command 105, and pulse train interface 106 for position command of the own axis, into specified positions of the in-channel communication memory 107a of the own axis, outputs the output data to the digital output interface 104, and also writes into the specified position of the in-channel communication memory 107a of the own axis.

When the input data, output data, and pulse train commands for speed command and position command are written into the in-channel communication memory 107a, and the data contents are updated, the serial communication interface 107 transmits the new contents to the servo amplifier 100 for other axis belonging to the same channel. When the servo amplifier 100 for other axis receives the updated data in the serial communication interface 107, the serial communication interface 107 writes the updated data into the specified position of the in-channel communication memory 107a.

As a result, in each axis, the data being red out from the in-channel communication memory 107a is identical.

In the drive control system having such configuration, same as in the prior art shown in FIGS. 21(a) to (c), wiring of signal wires is as shown in FIG. 9 and FIG. 10 when assigning input signals of functions 1 to 8 for all of first axis to third axis, output data of functions 11 to 18 for first axis, output data of functions 21 to 24 for second axis, and output data of functions 31 and 32 for third axis.

In this case, input signals for functions 1 to 8 are wired only to the servo amplifier 100 for first axis, and wiring is not necessary in the servo amplifiers 100 for second axis and third axis. Output signals for functions 11 to 15 are wired to the servo amplifier 100 for first axis, output signals for functions 16 to 18 and functions 21 and 22 are wired to the servo amplifier 100 for second axis, and output signals for functions 23, 24, 31, and 32 are wired to the servo amplifier 100 for third axis.

FIG. 9 shows the flow of data of input signals for functions 1 to 8. The CPU 101 for first axis reads the content (input data for functions 1 to 8) of the digital input interface 103, and writes into the in-channel communication memory 107a of the own station. The data in the in-channel communication memory 107a is automatically written into the in-channel communication memories 107a for second axis and third axis through the serial communication interface 107. As a result, the CPU 101 for second axis and third axis reads out the content of the in-channel communication memory 107a of the own machine (own station), and it can be used in the control of the own axis.

Thus, wiring of input signals for functions 1 to 8 for the servo amplifiers 100 for second axis and third axis can be omitted.

FIG. 10 shows the flow of data of output signals for functions 11 to 18, functions 21 to 24, and functions 31 and 32.

The CPU 101 for first axis writes contents of output signals of functions 11 to 15 into the in-channel communication memory 107a of the own station as data for output signal of first axis, and writes contents of output signals of functions 16 to 18 into the in-channel communication memory 107a of the own station as data for output signal of second axis. In consequence, the data at the address corresponding to the data for first axis output signal in the in-channel communication memory 107a is read out, and written into the digital output interface 104 of first axis, and a signal is outputted. The data in the in-channel communication memory 107a is automatically written into the in-channel communication memories 107a for second axis and third axis through the serial communication interface 107.

The CPU 101 for second axis writes contents of output signals of functions 21 and 22 into the in-channel communication memory 107a of the own station as data for output signal of second axis, and writes contents of output signals of functions 23 and 24 into the in-channel communication memory 107a of the own station as data for output signal of third axis. In consequence, the data at the address corresponding to the data for second axis output signal in the in-channel communication memory 107a is read out, and written into the digital output interface 104 of second axis, and a signal is outputted. The data in the in-channel communication memory 107a is automatically written into the in-channel communication memories 107a for first axis and third axis through the serial communication interface 107.

The CPU 101 for third axis writes contents of output signals of functions 31 and 32 into the in-channel communication memory 107a of the own station as data for output signal of third axis, reads out the data at the address corresponding to the data for third axis output signal, writes into the digital output interface 104 of third axis, and outputs a signal. The data in the in-channel communication memory 107a is automatically written into the in-channel communication memories 107a for first axis and second axis through the serial communication interface 107.

By such serial communication, from the viewpoint of the entire system, the digital output interfaces 104 of servo amplifiers 100 for the axes can be used comprehensively without border of axes, and part of output signal for first axis can be outputted from the digital output interface 104 for second axis, or the output signal for second axis can be outputted from the digital output interface 104 for third axis.

Since the interface for digital output can be distributed to each axis, the number of interfaces for digital output mounted on each axis can be decreased. According to a similar concept, the interface for digital input can be distributed in each axis, and the number of interfaces for digital input mounted on each axis can be also decreased.

Moreover, since the input interface can be re-distributed, if desired to connect an input signal of function 9 additionally, it may be wired to the servo amplifier 100 for second axis or third axis where an extra input interface is available, and similarly when adding an output function of function 19, it is realized by connecting to the servo amplifier 100 for third axis.

FIG. 11 shows wiring of signal wires of analog speed command. FIG. 11 is an example of operation of each axis by using a same analog speed command, in which only by wiring the signal wire of analog speed command to the servo amplifier 100 for first axis from a speed command unit 300 and an analog output interface 301, the CPU 101 for first axis reads out the speed command data of the analog input interface for speed command 105, and writes the data into the in-channel communication memory 107a. The data in the in-channel communication memory 107a is automatically written into the in-channel communication memories 107a for second axis and third axis through the serial communication interface 107. As a result, the CPU 101 of each servo amplifier 100 for first axis to third axis reads out the address of the analog speed command of first axis written in the in-channel communication memory 107a, and uses it in motor control, so that synchronous operation of the first axis to third axis is realized.

Besides, by preliminarily setting the shared memories as shown in FIG. 13, the present speed data of each axis can be shared by the synchronized three axes, so that deviation in synchronism can be prevented.

As mentioned above, by using shared memories among axes, the number of wiring connections is decreased in the case of synchronous operation by using analog speed command, and deviation in synchronism is prevented, and an advanced synchronous operation is realized.

FIG. 12 shows wiring of signal wires of position command (pulse train command). FIG. 12 is an example of operation of each axis by using a same pulse train command, in which only by wiring the signal wire of pulse train command to the servo amplifier 100 for first axis from a position command unit 310 and a pulse generator 311, the CPU 101 for first axis reads out the position command data of the pulse train input interface for position command 106, and writes the data into the in-channel communication memory 107a. The data in the in-channel communication memory 107a is automatically written into the in-channel communication memories 107a for second axis and third axis through the serial communication interface 107.

As a result, the CPU 101 of each servo amplifier 100 for first axis to third axis reads out the address of the position command of first axis written in the in-channel communication memory 107a, and uses it in motor control, so that synchronous operation of the first axis to third axis is realized. Besides, by preliminarily setting the shared memories as shown in FIG. 13, the present position data of each axis can be shared by the synchronized three axes, so that deviation in synchronism can be prevented.

Various examples of use of shared memories held by the servo amplifiers 100 for axes are explained by referring to FIGS. 13(a) and (b). FIG. 13(a) shows an example of address map of shared memories, and FIG. 13(b) shows an example of operation of control unit of each axis.

The shared memories hold the mapping of data on each axis, including not only position command data, speed command data, torque command data, present position data, and present speed data, but also control information in each servo amplifier such as bus voltage data, regenerative load factor data, effective load factor data, and status data. Further, digital input signal data, digital output signal data, analog input data, and analog output data of input and output units are also disposed on the shared memories.

In example 1 of use of shared memory, a case of using in synchronous operation of first axis and second axis is explained. The entered command of pulse train input interface of first axis is always updated as the data at the address of the first axis pulse train input data 1, and the first axis and second axis control the motor by using the data as position command. On the second axis, the present position data of the first axis is always monitored, and if the first axis fails to follow up the position command of the first axis pulse train input data 1 due to some cause, by controlling so as to operate according to the present position data of the first axis, deviation in synchronism can be prevented.

In example 2 of use of shared memory, a fourth axis is a servo amplifier incorporating a position command generator for executing position control by generating a position command alone, and a case of causing the third axis to follow up the fourth axis is explained. The fourth axis generates a position command in the position command generator, and periodically writes into the address of the fourth axis position command data of the shared memory. The third axis executes position control by using this position command data, so that the third axis and fourth axis are operated simultaneously. In such control, hitherto, the fourth axis must have a function for issuing a pulse train command, and the pulse train command is accompanied by time delay for the processing period for operation of pulse output function, but by using the shared memory, such time delay does not occur.

In example 3 of use of shared memory, sharing of bus voltage of first axis to fourth axis is explained. Usually, as shown in FIG. 14, the servo amplifier 100 has a diode 110, a capacitor 111, and an inverter 112 as the power control unit. When a servo motor 150 slows down, a counter electromotive force (regenerative energy) is generated, and the capacitor 111 is charged, and the bus voltage climbs up. The CPU 101 monitors the bus voltage through a bus voltage detecting circuit 113, and turns on a regenerative transistor 115 through a regenerative transistor control circuit 114 so as not to exceed the withstand voltage of the capacitor 111, and the bus voltage is lowered by consuming regenerative energy by a regenerative resistor 116.

The regenerative resistor 116 is designed to consume regenerative energy by heat exchange, and is accompanied by heat generation and temperature rise, and therefore the CPU 101 manages the regenerative load factor and controls so that the regenerative resistor 116 may not generate heat over the specified temperature. Heat exchange by the regenerative resistor 116 is basically loss of energy, and hence heat exchange by the regenerative resistor 116 must be kept as small as possible.

To decrease heat generation of the regenerative resistor 116 and suppress energy loss, it is possible by increasing the capacity of the capacitor 111, but increase of capacity of the capacitor 111 is limited due to the capacity of the servo amplifier.

Accordingly, as shown in FIG. 14, it is attempted to increase the capacity of the capacitor on the whole by connecting buses 120 of the plurality of servo amplifiers 100. However, since each servo amplifier 100 individually controls the regenerative transistor 115, the regenerative load may be concentrated on a certain servo amplifier 100 due to detection error of bus voltage among devices or deviation in processing timing.

By adding regenerative load factor data, regenerative transistor status data, and bus voltage data of each axis to the shared memory incorporated in the serial communication interface 107 of each servo amplifier 100, the servo amplifier 100 of each axis detects the entire regenerative load factor, and by turning on the regenerative transistor 115 of the servo amplifier 100 smallest in the regenerative load factor data, and concentration of regenerative load is prevented, and the effect of the capacitor capacity by connection of bus voltage of the plurality of servo amplifiers is obtained, thereby decreasing heat generation of the regenerative resistor 116 and suppressing energy loss.

FIG. 15 shows a third embodiment of drive control system of the invention. In this drive control system, three servo amplifiers 400 for first axis, second axis, and third axis, and input and output units 410 are connected so as to communicate in two ways by means of communication wires 200, and exist on a same communication system.

Three servo amplifiers 400 for first axis, second axis, and third axis are identical in structure, each comprising a CPU 401, a motor drive circuit 402, and a serial communication interface 403, and a servo motor with rotary encoder (not shown) is connected to each servo amplifier 400.

The serial communication interface 403 of the servo amplifier 400 for each axis incorporates, as shared memories, an in-channel communication memory 403a, an allout communication memory 403b, and a designated number communication memory 403c. The content of the in-channel communication memory 403a in the servo amplifier 400 for each axis is composed of input data, output data, and pulse train commands for speed command and position command of each axis belonging to same channel.

The input and output unit 410 includes a CPU (RIO.CPU) 411, a digital input interface 413, a digital output interface 414, an analog input interface for speed command 415, and a pulse train interface for position command 416, and a serial communication interface 417.

The serial communication interface 417 of the input and output unit 410 incorporates, as shared memories, an in-channel communication memory 417a, an allout communication memory 417b, and a designated number communication memory 417c, same as the serial communication interface 403 of the servo amplifier 400. The content of the in-channel communication memory 417a is same as that of the in-channel communication memory 403a, being composed of input data, output data, and pulse train commands for speed command and position command of each axis belonging to a same channel.

In this drive control system, all of input signal wire, output signal wire, analog speed command signal wire and pulse train command signal wire are connected to the digital input interface 413, digital output interface 414, analog input interface for speed command 415, and pulse train interface for position command 416 of the input and output unit 410.

The CPU 411 of the input and output unit 410 writes the input data and pulse train commands for speed command and position command entered in the digital input interface 413, analog input interface for speed command 415, and pulse train interface for position command 416, in specified positions of the in-channel communication memory 417a. As the input data and pulse train commands for speed command and position command are entered in the in-channel communication memory 417a, and the data contents are updated, the serial communication interface 417 transmits them to the servo amplifier 400 belonging to the same channel. When the servo amplifier 400 receives the updated data in the serial communication interface 403, the serial communication interface 403 writes the updated data into specified position of the in-channel communication memory 403a of the own axis.

The CPU 401 of the servo amplifier 400 for each axis writes the output data into specified position of the in-channel communication memory 407a of the own axis, and this output data is written into the in-channel communication memory 403a of the servo amplifier 400 of other station and in-channel communication memory 403a of the input and output unit 410 by means of the serial communication interface 403. The input and output unit 410 outputs the output data written in the in-channel communication memory 403a from the digital output interface 414.

In this embodiment, it is enough to connect the signal wires to the input and output unit 410, and wiring is easier, and the same effects and actions as in the second embodiment are obtained.

INDUSTRIAL APPLICABILITY

The invention is used as the drive control system for speed control and position control by a plurality of servo motors or spindle motors in machine tools and other industrial machines.

What is claimed is:

1. A drive control system having constituent devices connected so as to communicate with each other,
   wherein a memory is provided in each of the constituent devices, the constituent devices of the drive control system are synchronized with each other, a communication unit is provided for transferring memory data between selected constituent devices of the drive control system, and at least one of said memory that is provided in each of the constituent devices of the drive control system, is shared simultaneously between said selected constituent devices of the drive control system.

2. A drive control system having constituent devices connected so as to communicate with each other,
   wherein a memory is provided in each of the constituent devices, the constituent devices are synchronized with each other, a communication unit is provided for transferring memory data between selected constituent devices, and at least one of said memory that is provided in each of the constituent devices, is shared simultaneously between said selected constituent devices,
   wherein communication data comprises a synchronous packet used for generating a clock transmitted in a specific method period so that all constituent devices are synchronized therewith, an in-channel communication packet used for sharing said at least one of said memory within a same group, an allout communication packet used for sharing said at least one of said memory between all constituent devices, and a designated destination communication packet for communicating by designating the destination of transmission of a parameter.

3. The drive control system of claim 2, comprising a control unit and a servo amplifier, wherein each of the control unit and servo amplifier has a communication memory in each channel, a transmitter transmits the in-channel communication packet including a channel designated value, an address, a transmission data length and data to all constituent devices, and a receiver judges approval or rejection of reception by collating the channel designated value included in the communication packet and a channel set value set in a parameter in each servo amplifier, and writes the data of the communication packet of the collated channel in the communication memory.

4. A drive control system having constituent devices connected so as to communicate with each other, wherein a memory is provided in each of the constituent devices, the constituent devices are synchronized with each other, a communication unit is provided for transferring memory data between selected constituent devices, and at least one of said memory that is provided in each of the constituent devices, is shared simultaneously between said selected constituent devices, said drive control system comprising a control unit, a servo amplifier, and an input and output unit, each having allout communication memories, wherein a transmitter transmits an allout communication packet including a sender number, an address, a transmission data length, a variable data length, previous data, and rewrite data to all constituent devices, a receiver compares the received previous data and the data in the present allout communication memory, the data in the allout communication memory is rewritten, if matched, and writing into the allout communication memory is stopped, if not matched.

5. The drive control system of claim 2, wherein a transmitter adds a redundancy code to the communication packet in every quantity of data that is based on the size of a buffer, and a receiver detects communication failure according to the redundancy code in every quantity of data that is based on the size of the buffer, and writing into said at least one of said memory is stopped, if abnormal.

6. The drive control system of claim 2, wherein a waiting time of each communication following the synchronous packet is shortened depending on a priority order, and when a constituent device high in priority order starts transmission within the waiting time, reception is started, and after completion of reception, if another constituent device does not start transmission after lapse of a specified waiting time, transmission is started.

7. A drive control system having constituent devices connected so as to communicate with each other, wherein a memory is provided in each of the constituent devices, the constituent devices are synchronized with each other, a communication unit is provided for transferring memory data between selected constituent devices, and at least one of said memory that is provided in each of the constituent devices, is shared simultaneously between said selected constituent devices, wherein said at least one of said memory stores input data, output data, position command, and speed command, is shared by the constituent devices.

8. The drive control system of claim 7, wherein present position data of each axis is shared by a synchronous axis, and the synchronous axis is controlled to prevent deviation of synchronism by referring to the position data.

9. The drive control system of claim 7, wherein present speed data of each axis is shared by a synchronous axis, and the synchronous axis is controlled to prevent deviation of synchronism by referring to the speed data.

10. The drive control system of claim 3, wherein the servo amplifier has a regenerative resistor selectively set in conductive state by a regenerative transistor, said at least one of said memory storing regenerative load factor data of each axis, regenerative transistor state data, and bus voltage data that is shared by the servo amplifier, and the bus voltage data is controlled to turn on the regenerative transistor of the servo amplifier smallest in the regenerative load factor data known from these data.

11. The drive control system of claim 1, wherein said constituent devices comprise at least one of a control unit, a servo amplifier, a spindle amplifier, and an input/output unit.

12. A drive control system having a plurality of constituent devices connected so as to communicate with each other, wherein a memory and a communication unit are provided in each of the constituent devices of the drive control system, the constituent devices of the drive control system are synchronized with each other, the communication unit transfers memory data between at least two of the constituent devices of the drive control system so that identical memory data are simultaneously stored in the memory in said at least two of the constituent devices of the drive control system, thereby enabling the memory provided in said at least two of the constituent devices of the drive control system to be used as shared memories.

* * * * *